US008238570B2

(12) United States Patent
Johnson, Jr. et al.

(10) Patent No.: US 8,238,570 B2
(45) Date of Patent: Aug. 7, 2012

(54) PERSONAL ACOUSTIC DEVICE POSITION DETERMINATION

(75) Inventors: Edwin C. Johnson, Jr., Hopkinton, MA (US); Benjamin D. Burge, Shaker Heights, OH (US)

(73) Assignee: Bose Corporation, Framingham, MA (US)

( * ) Notice: Subject to any disclaimer, the term of this patent is extended or adjusted under 35 U.S.C. 154(b) by 363 days.

(21) Appl. No.: 12/748,410

(22) Filed: Mar. 27, 2010

(65) Prior Publication Data

US 2010/0246847 A1 Sep. 30, 2010

Related U.S. Application Data

(63) Continuation-in-part of application No. 12/413,740, filed on Mar. 30, 2009.

(51) Int. Cl.
*H04R 1/10* (2006.01)
*H04R 5/02* (2006.01)
*H04B 1/00* (2006.01)

(52) U.S. Cl. .............................. 381/74; 381/311; 381/86

(58) Field of Classification Search .................... 381/74, 381/306, 309, 310, 311, 86
See application file for complete search history.

(56) References Cited

U.S. PATENT DOCUMENTS

| | | | |
|---|---|---|---|
| 4,955,729 | A | 9/1990 | Marx |
| 5,144,678 | A | 9/1992 | Lenz |
| 5,577,511 | A | 11/1996 | Killion |
| 5,708,725 | A | 1/1998 | Ito |
| 6,118,878 | A | 9/2000 | Jones |
| 6,163,610 | A | 12/2000 | Bartlett et al. |
| 6,532,294 | B1 | 3/2003 | Rudell |
| 6,542,436 | B1 | 4/2003 | Myllyla |
| 6,567,524 | B1 | 5/2003 | Svean et al. |
| 6,639,987 | B2 | 10/2003 | McIntosh |
| 6,687,377 | B2 | 2/2004 | Voix et al. |
| 6,704,428 | B1 | 3/2004 | Wurtz |
| 6,763,116 | B2 | 7/2004 | Barthel et al. |
| 7,039,195 | B1 | 5/2006 | Svean et al. |
| 7,406,179 | B2 | 7/2008 | Ryan |
| 7,418,103 | B2 | 8/2008 | Sargaison |
| 7,433,481 | B2 | 10/2008 | Armstrong et al. |
| 7,450,730 | B2 | 11/2008 | Berg et al. |
| 7,522,739 | B2 | 4/2009 | Rass et al. |

(Continued)

FOREIGN PATENT DOCUMENTS

DE 102007013719 A1 9/2008

(Continued)

OTHER PUBLICATIONS

International Search Report and Written Opinion dated Jun. 16, 2009 for PCT/US2009/035826.

(Continued)

*Primary Examiner* — Devona Faulk
*Assistant Examiner* — David Ton

(57) ABSTRACT

Apparatus and method for determining an operating state of a personal acoustic device by receiving signal from first and second movement sensors indicating movement detected by each, wherein the first movement sensor is disposed on a portion of the personal acoustic device structured to be worn on a user's head to enable the first movement sensors to detect movements of a user's head when the personal acoustic device is in position on the user's head such that a casing of the personal acoustic device is adjacent an ear of the user, and wherein the second movement sensor is disposed on a portion of the personal acoustic device structure to not be worn on a user's head.

17 Claims, 22 Drawing Sheets

U.S. PATENT DOCUMENTS

| | | | |
|---|---|---|---|
| 7,639,827 | B2 | 12/2009 | Bachler |
| 7,783,057 | B2 | 8/2010 | Park |
| 7,925,029 | B2 | 4/2011 | Hollemans et al. |
| 2002/0076057 | A1 | 6/2002 | Voix |
| 2003/0161479 | A1 | 8/2003 | Yang et al. |
| 2006/0013079 | A1 | 1/2006 | Rekimoto |
| 2006/0029234 | A1 | 2/2006 | Sargaison |
| 2006/0045304 | A1* | 3/2006 | Lee et al. ...................... 381/384 |
| 2006/0215847 | A1 | 9/2006 | Hollemans et al. |
| 2007/0076897 | A1 | 4/2007 | Philipp |
| 2007/0160255 | A1 | 7/2007 | Cheng et al. |
| 2007/0274530 | A1 | 11/2007 | Buil et al. |
| 2007/0297618 | A1 | 12/2007 | Nurmi et al. |
| 2007/0297634 | A1 | 12/2007 | Hansson |
| 2008/0192942 | A1 | 8/2008 | Yamkovoy et al. |
| 2008/0260176 | A1 | 10/2008 | Hollemans et al. |
| 2009/0154720 | A1 | 6/2009 | Oki |
| 2009/0268936 | A1 | 10/2009 | Goldberg et al. |
| 2010/0054518 | A1* | 3/2010 | Goldin .......................... 381/370 |
| 2010/0128887 | A1 | 5/2010 | Lee et al. |
| 2010/0183183 | A1* | 7/2010 | Bae et al. ...................... 381/374 |
| 2010/0246847 | A1 | 9/2010 | Johnson, Jr. et al. |
| 2011/0144779 | A1 | 6/2011 | Janse et al. |
| 2011/0293129 | A1* | 12/2011 | Dillen et al. .................. 381/370 |
| 2012/0002822 | A1* | 1/2012 | Peissig et al. ................... 381/74 |

FOREIGN PATENT DOCUMENTS

| | | | |
|---|---|---|---|
| EP | 0363056 | A2 | 4/1990 |
| EP | 1059635 | A2 | 12/2000 |
| EP | 1465454 | A2 | 10/2004 |
| JP | 07298383 | A | 11/1995 |
| WO | 2007/049255 | | 5/2007 |
| WO | 2007/110807 | | 10/2007 |
| WO | 2007/141769 | A2 | 12/2007 |
| WO | 2008096125 | A2 | 8/2008 |

OTHER PUBLICATIONS

International Preliminary Report on Patentability dated Jun. 1, 2010 for PCT/US2009/035826.

Invitation to Pay Additional Fees dated May 26, 2010 for PCT/US10/029031.

International Search Report and Written Opinion dated Aug. 10, 2010 for PCT/US2010/029031.

EP Examination report dated Mar. 15, 2011 for EP Appln. No. 09719786.7.

* cited by examiner

PERSONAL ACOUSTIC DEVICE POSITION DETERMINATION

CROSS-REFERENCE TO RELATED APPLICATION

The present application is a continuation-in-part of application Ser. No. 12/413,740 filed Mar. 30, 2009 by Benjamin D. Burge, Daniel M. Gauger and Hal P. Greenberger, the disclosure of which is incorporated herein by reference.

TECHNICAL FIELD

This disclosure relates to the determination of the positioning of at least one earpiece of a personal acoustic device relative to an ear of a user to acoustically output a sound to that ear and/or to alter an environmental sound reaching that ear.

BACKGROUND

It has become commonplace for those who either listen to electronically provided audio (e.g., audio from a CD player, a radio or a MP3 player), those who simply seek to be acoustically isolated from unwanted or possibly harmful sounds in a given environment, and those engaging in two-way communications to employ personal acoustic devices (i.e., devices structured to be positioned in the vicinity of at least one of a user's ears) to perform these functions. For those who employ headphones or headset forms of personal acoustic devices to listen to electronically provided audio, it has become commonplace for that audio to be provided with at least two audio channels (e.g., stereo audio with left and right channels) to be separately acoustically output with separate earpieces to each ear. Further, recent developments in digital signal processing (DSP) technology have enabled such provision of audio with various forms of surround sound involving multiple audio channels. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, it has become commonplace to combine ANR with other audio functions in headphones, headsets, earphones, earbuds, and wireless headsets (also known as "earsets").

Yet, despite these many advances, issues of user safety and ease of use of many personal acoustic devices remain unresolved. More specifically, controls mounted upon or otherwise connected to a personal acoustic device that are normally operated by a user upon either positioning the personal acoustic device in the vicinity of one or both ears or removing it therefrom (e.g., a power switch) are often undesirably cumbersome to use. The cumbersome nature of controls of a personal acoustic device often arises from the need to minimize the size and weight of such personal acoustic devices by minimizing the physical size of such controls. Also, controls of other devices with which a personal acoustic device interacts are often inconveniently located relative to the personal acoustic device and/or a user. Further, regardless of whether such controls are in some way carried by the personal acoustic device, itself, or by another device with which the personal acoustic device interacts, it is commonplace for users to forget to operate such controls when they do position the acoustic device in the vicinity of one or both ears or remove it therefrom.

Various enhancements in safety and/or ease of use may be realized through the provision of an automated ability to determine the positioning of a personal acoustic device relative to one or both of the user's ears.

SUMMARY

A apparatus and method for determining an operating state of an earpiece of a personal acoustic device and/or the entirety of the personal acoustic device by analyzing signals output by at least an inner microphone disposed within a cavity of a casing of the earpiece and an outer microphone disposed on the personal acoustic device in a manner acoustically coupling it to the environment outside the casing of the earpiece.

In one aspect, a method entails analyzing an inner signal output by an inner microphone disposed within a cavity of a casing of an earpiece of a personal acoustic device and an outer signal output by an outer microphone disposed on the personal acoustic device so as to be acoustically coupled to an environment external to the casing of the earpiece, and determining an operating state of the earpiece based on the analyzing of the inner and outer signals.

Implementations may include, and are not limited to, one or more of the following features. Determining the operating state of the earpiece may entail determining whether the earpiece is in an operating state of being positioned in the vicinity of an ear of a user such that the cavity is acoustically coupled to an ear canal, or is in an operating state of not being positioned in the vicinity of an ear of the user such that the cavity is acoustically coupled to the environment external to the casing. Analyzing the inner and outer signals may entail comparing a signal level of the inner signal within a selected range of frequencies to a signal level of the outer signal within the selected range of frequencies, and determining the operating state of the earpiece may entail determining that the earpiece is in the operating state of being positioned in the vicinity of an ear at least partly in response to detecting that the difference between the signal levels of the inner signal and the outer signal within the selected range of frequencies is within a maximum degree of difference specified by a difference threshold setting. The method may further entail imposing a transfer function on the outer signal that modifies a sound represented by the outer signal in a manner substantially similar to the manner in which a sound propagating from the environment external to the casing to the cavity is modified at a time when the earpiece is in the operating state of being positioned in the vicinity of an ear, and the transfer function may be based at least partly on the manner in which ANR provided by the personal acoustic device modifies a sound propagating from the environment external to the casing to the cavity.

Analyzing the inner and outer signals may entail analyzing a difference between a first transfer function representing the manner in which a sound emanating from an acoustic noise source in the environment external to the casing changes as it propagates from the noise source to the inner microphone within the cavity and a second transfer function representing the manner in which the sound changes as it propagates from the noise source to the outer microphone by deriving a third transfer function that is at least indicative of the difference between the first and second transfer functions. Determining the operating state of the earpiece may entail either determining that the difference between the third transfer function and one of a first stored transfer function corresponding to the operating state of being positioned in the vicinity of an ear and a second stored transfer function corresponding to the operating state of not being positioned in the vicinity of an ear is within a maximum degree of difference specified by a difference threshold setting, or may entail determining that at least one characteristic of the third transfer function is closer to a corresponding characteristic of one of a first stored transfer function corresponding to the operating state of being positioned in the vicinity of an ear and a second stored transfer function corresponding to the operating state of not being positioned in the vicinity of an ear than to the other. The method may further entail acoustically outputting electronically provided audio into the cavity through an acoustic driver at least partly disposed within the cavity, monitoring a signal level of the outer signal, deriving a fourth transfer function representing the manner in which the electronically provided audio acoustically output by the acoustic driver changes as it propagates from the acoustic driver to the inner microphone, and determining the operating state of the earpiece based, at least in part, on analyzing a characteristic of the fourth transfer function. Further, determining the operating state of the earpiece may be based on either analyzing a difference between the inner signal and outer signal or analyzing a characteristic of the fourth transfer function, depending on at least one of whether the signal level of the outer signal at least meets a minimum level setting and whether electronically provided audio is currently being acoustically output into the cavity.

The method may further entail determining that a change in operating state of the earpiece has occurred and determining that the entirety of the personal acoustic device has changed operating states among at least an operating state of being positioned on or about the user's head and an operating state of not being positioned on or about the user's head. The method may further entail determining that a change in operating state of the earpiece has occurred, and taking an action in response to determining that a change in operating state of the earpiece has occurred. Further, the taken action may be one of altering provision of power to a portion of the personal acoustic device; altering provision of ANR by the personal acoustic device; signaling another device with which the personal acoustic device is in communication with an indication of the current operating state of at least the earpiece of the personal acoustic device; muting a communications microphone of the personal acoustic device; and rerouting audio to be acoustically output by an acoustic driver of the earpiece to being acoustically output by another acoustic driver of another earpiece of the personal acoustic device.

In one aspect, a personal acoustic device comprises a first earpiece having a first casing; a first inner microphone disposed within a first cavity of the first casing and outputting a first inner signal representative of sounds detected by the first inner microphone; a first outer microphone disposed on the personal acoustic device so as to be acoustically coupled to an environment external to the first casing and outputting a first outer signal representative of sounds detected by the first outer microphone; and a control circuit coupled to the first inner microphone and to the first outer microphone to receive the first inner signal and the first outer signal, to analyze a difference between the first inner signal and the first outer signal, and to determine an operating state of the first earpiece based, at least in part, on analyzing the difference between the first inner signal and the first outer signal.

Implementations may include, and are not limited to, one or more of the following features. The control circuit may determine the operating state of the earpiece by at least determining whether the earpiece is in an operating state of being positioned in the vicinity of an ear of a user such that the first cavity is acoustically coupled to an ear canal, or in an operating state of not being positioned in the vicinity of an ear of the user such that the first cavity is acoustically coupled to the environment external to the first casing. The first earpiece may be in the form of an in-ear earphone, an on-ear earcup, an over-the-ear earcup, or an earset. The personal acoustic device may be listening headphones, noise reduction headphones, a two-way communications headset, earphones, earbuds, a two-way communications earset, ear protectors, a hat incorporating earpieces, and a helmet incorporating earpieces. The personal acoustic device may incorporate a communications microphone disposed on the personal acoustic device so as to detect speech sounds of the user, or the first outer microphone may be a communications microphone.

The personal acoustic device may further incorporate a second earpiece having a second casing and a second inner microphone disposed within a second cavity of the second casing and outputting a second inner signal representative of sounds detected by the second inner microphone. Also, the personal acoustic device may further incorporate a second outer microphone disposed on the personal acoustic device so as to be acoustically coupled to an environment external to the second casing and outputting a second outer signal representative of sounds detected by the second outer microphone. Further, the control circuit may be further coupled to the second inner microphone and to the second outer microphone to receive the second inner signal and the second outer signal, to analyze a difference between the second inner signal and the second outer signal, and to determine an operating state of the second earpiece based, at least in part, on analyzing the difference between the second inner signal and the second outer signal. Alternatively, the control circuit is further coupled to the second inner microphone to receive the second inner signal, to analyze a difference between the second inner signal and the first outer signal, and to determine the state of the second earpiece between the state of being positioned in the vicinity of the other ear of the user such that the second cavity is acoustically coupled to an ear canal and the state of not being positioned in the vicinity of the other ear of the user such that the second cavity is acoustically coupled to the environment external to the second casing based, at least in part, on the analyzing of a difference between the second inner signal and the first outer signal.

The personal acoustic device may further incorporate a power source providing power to a component of the personal acoustic device and coupled to the control circuit, wherein the control circuit signals the power source to alter its provision of power to the component in response to the control circuit determining that a change in operating state of at least the first earpiece has occurred. The personal acoustic device may further incorporate an ANR circuit enabling the personal acoustic device to provide ANR and coupled to the control circuit, wherein the control circuit signals the ANR circuit to alter its provision of ANR in response to the control circuit determining that a change in operating state of at least the first earpiece has occurred. The personal acoustic device may further incorporate an interface enabling the personal acoustic device to communicate with another device and coupled to the control circuit, wherein the control circuit operates the interface to signal the other device with an indication that a change in operating state of at least the first earpiece has occurred in response to the control circuit determining that a change in operating state of at least the first earpiece has occurred. The personal acoustic device may further incorporate an audio controller coupled to the control circuit, wherein the control circuit, in response to determining that a change in operating state of at least the first earpiece has occurred, operates the audio controller to take an action selected from the group of actions consisting of muting audio detected by a communications microphone of the personal acoustic device, and rerouting audio to be acoustically output by a first acoustic driver of the first earpiece to being acoustically output by a second acoustic driver of a second earpiece of the personal acoustic device.

In one aspect, an apparatus comprises a first microphone disposed within a cavity of a casing of an earpiece of a personal acoustic device to detect an acoustic signal and to output a first signal representing the acoustic signal as detected by the first microphone; a second microphone disposed on the personal acoustic device so as to be acoustically coupled to the environment external to the casing of the earpiece to detect the acoustic signal and to output a second signal representing the acoustic signal as detected by the second microphone; an adaptive filter to filter one of the first and second signals, wherein the adaptive filter adapts filter coefficients according to an adaptation algorithm selected to reduce signal power of an error signal; a differential summer to subtract the one of the first and second signals from the other of the first and second signals to derive the error signal; a storage in which is stored predetermined adaptive filter parameters representative of a known operating state of the personal acoustic device; and a controller for comparing adaptive filter parameters derived by the adaptive filter through the adaptation algorithm to the predetermined adaptive filter parameters stored in the storage.

Implementations may include, and are not limited to, one or more of the following features. The adaptive filter parameters derived by the adaptive filter may be the filter coefficients adapted by the adaptive filter, or may represent a frequency response of the adaptive filter corresponding to the filter coefficients adapted by the adaptive filter.

Apparatus and method for determining an operating state of a personal acoustic device by receiving signal from first and second movement sensors indicating movement detected by each, wherein the first movement sensor is disposed on a portion of the personal acoustic device structured to be worn on a user's head to enable the first movement sensors to detect movements of a user's head when the personal acoustic device is in position on the user's head such that a casing of the personal acoustic device is adjacent an ear of the user, and wherein the second movement sensor is disposed on a portion of the personal acoustic device structure to not be worn on a user's head.

In another aspect, a method of controlling a personal acoustic device includes receiving a first signal from a first movement sensor, wherein the first movement sensor is disposed on a first portion of the personal acoustic device structured to be worn on a head of a user to enable the first movement sensor to detect movements of the user's head at a time when the personal acoustic device is in position on the user's head such that a casing of the personal acoustic device is adjacent an ear of the user, and wherein the first signal indicates a detected movement of the first portion; receiving a second signal from a second movement sensor, wherein the second movement sensor is disposed on a second portion of the personal acoustic device structured to not be worn on the user's head to provide a reference against which to compare the movements detected by the first movement sensor, and wherein the second signal indicates a detected movement of the second portion; distinguishing a differential mode movement between the detected movement of the first portion and the detected movement of the second portion from a common mode movement; analyzing a characteristic of the differential mode movement to determine whether the differential mode movement indicates a movement of the user's head relative to the reference caused by the user; and determining that the personal acoustic device is in position on the user's head in response to determining that the differential mode movement indicates a movement of the user's head relative to the reference caused by the user.

Implementations may include, and are not limited to, one or more of the following features. The method may further include determining that the personal acoustic device is not in position on the user's head in response to there being no differential mode movements determined to indicate a movement of the user's head relative to the reference caused by the user for a predetermined period of time. The method may further include analyzing the detected movement of the first portion and the detected movement of the second portion over a recurring interval of time to derive differences in orientation between the first and second movement sensors, and employing the derived differences in orientation between the first and second movement sensors to create a transform by which indications of detected movement of one of the first and second portions are altered to align the orientations of indications of detected movement of the first and second portions in preparation for other analysis. Also, the method may further include monitoring the transform for an instance of a change in the transform arising from a change in an orientation in one of the first and second movement sensors to detect movement.

The first movement sensor may be a first gyroscope; the second movement sensor may be a second gyroscope; receiving a first signal from the first movement sensor indicating a detected movement of the first portion may include receiving the first signal from the first gyroscope wherein the first signal indicates a first detected rotational movement; and receiving a second signal from the second movement sensor indicating a detected movement of the second portion may include receiving the second signal from the second gyroscope wherein the second signal indicates a second detected rotational movement. Analyzing a characteristic of the differential mode movement may include comparing an extent of rotation of the differential mode movement to a predetermined minimum extent of rotation during a predetermined sampling period to determine whether the differential mode movement indicates a movement of the user's head relative to the reference caused by the user.

Further, analyzing a characteristic of the differential mode movement may include comparing the characteristic of the differential mode movement to a predetermined maximum value for that characteristic to determine whether the differential mode movement is humanly possible such that the differential mode movement indicates a movement of the user's head relative to the reference caused by the user; and the characteristic may be selected from a group consisting of an extent of rotation of the differential mode movement, a speed of rotation of the differential mode movement, an acceleration in rotation of the differential mode movement, a rate of change in acceleration in rotation of the differential mode movement, and a frequency of repetition of the differential mode movement. The method may further include immediately determining that the personal acoustic device is not in position on the user's head in response to the characteristic of the differential mode movement exceeding the predetermined maximum value for that characteristic.

The first movement sensor may be a first accelerometer; the second movement sensor may be a second accelerometer; receiving a first signal from the first movement sensor indicating a detected movement of the first portion may include receiving the first signal from the first accelerometer wherein the first signal indicates a first detected acceleration; receiving a second signal from the second movement sensor indicating a detected movement of the second portion may include receiving the second signal from the second accelerometer wherein the second signal indicates a second detected acceleration; and distinguishing a differential mode movement between the detected movements of the first and second portions from a common mode movement may include distinguishing a differential mode acceleration between the first and second detected accelerations from a common mode acceleration.

Further, analyzing a characteristic of the differential mode movement may include comparing the characteristic of the differential mode acceleration to a predetermined maximum value for that characteristic to determine whether the differential mode acceleration indicates a movement of the user's head that is humanly possible such that the differential mode acceleration indicates a movement of the user's head relative to the reference caused by the user; and the characteristic may be selected from a group consisting of a magnitude of the differential mode acceleration, a rate of change in the differential mode acceleration, and a frequency of repetition in the differential mode acceleration. The method may further include immediately determining that the personal acoustic device is not in position on the user's head in response to the characteristic of the differential mode acceleration exceeding the predetermined maximum value for that characteristic.

Further, the method may further include analyzing a characteristic of the common mode movement by comparing the characteristic of the common mode acceleration to a predetermined maximum value for that characteristic, the characteristic being selected from a group consisting of a magnitude of the common mode acceleration, a rate of change in the common mode acceleration, and a frequency of repetition in the common mode acceleration; and immediately determining that the personal acoustic device is not in position on the user's head in response to the characteristic of the common mode acceleration exceeding the predetermined maximum value for that characteristic. The method may further include immediately determining that the personal acoustic device is in position on the user's head in response to the characteristic of the common mode acceleration not exceeding the predetermined maximum value for that characteristic, wherein the characteristic is the frequency of repetition in the common mode acceleration, and wherein the frequency of repetition in the common mode acceleration is a frequency indicative of repetitive human muscle movement.

In another aspect, a personal acoustic device includes a first casing structured to be positioned adjacent an ear of a user, a second casing structured to be positioned away from both ears of the user, a first movement sensor disposed on a portion of the personal acoustic device that includes the first casing and that is structured to be worn on the user's head to enable the first movement sensor to detect movements of the user's head at a time when the personal acoustic device is in position on the user's head such that the first casing is adjacent an ear of the user, a second movement sensor disposed on the second casing to provide a reference against which to compare movements detected by the first movement detector, and a control circuit coupled to the first and second movement sensors. Further the control circuit is structured to receive a first signal from the first movement sensor indicating a detected movement of the portion, receive a second signal from the second movement sensor indicating a detected movement of the second casing, distinguish a differential mode movement between the detected movement of the portion and the detected movement of the second casing from a common mode movement, analyze a characteristic of the differential mode movement to determine whether the differential mode movement indicates a movement of the user's head relative to the reference caused by the user, and determine that the personal acoustic device is in position on the user's head in response to determining that the differential mode movement indicates a movement of the user's head relative to the reference caused by the user.

Implementations may include, and are not limited to, one or more of the following features. The control circuit may be further structured to determine that the personal acoustic device is not in position on the user's head in response to there being no differential mode movements determined to indicate a movement of the user's head relative to the reference caused by the user for a predetermined period of time. The personal acoustic device may further include a cable having a first end that is coupled to the first portion and along which the second casing is disposed, and a connector coupled to a second end of the cable to couple the personal acoustic device to an intercom system of a vehicle such that the reference comprises the location of the second casing along the length of the cable at times when the connector is coupled to the intercom system. The personal acoustic device may further include a connector disposed on the second casing to couple the personal acoustic device to an intercom system of a vehicle; wherein the control circuit is further structured to receive an indication of whether the connector is coupled to an intercom system of a vehicle, and alter a manner in which the control circuit determines that the personal acoustic device is in position on the user's head in response to the indication of whether the connector is coupled to an intercom system.

The control circuit may be further structured to analyze the detected movement of the portion and the detected movement of the second casing over a recurring interval of time to derive differences in orientation between the first and second movement sensors, and employ the derived differences in orientation between the first and second movement sensors to create a transform by which indications of detected movement of one of the portion and the second casing are altered to align the orientations of indications of detected movement of the portion and the second casing in preparation for other analysis. Also, the control circuit may be further structured to monitor the transform for an instance of a change in the transform arising from a change in an orientation in one of the first and second movement sensors to detect movement.

The personal acoustic device may further include a connector disposed on the second casing to couple the personal acoustic device to an intercom system of a vehicle such that the reference comprises the vehicle at times when the connector is coupled to the intercom system. Also, the personal acoustic device may further include a cable coupling the portion and the second casing, and conveying an audio signal between the portion and the second casing, or the portion and the second casing may be coupled through wireless linkage by which an audio signal is conveyed between the portion and the second casing.

The first movement sensor may be a first gyroscope, the second movement sensor may be a second gyroscope, the first signal may indicate a first detected rotational movement of the portion, and the second signal may indicate a second detected rotational movement of the second casing. The control circuit being structured to analyze a characteristic of the differential mode movement may include the control circuit being structured to compare an extent of rotation of the differential mode movement to a predetermined minimum extent of rotation during a predetermined sampling period to determine whether the differential mode movement indicates a movement of the user's head relative to the reference caused by the user. The control circuit being structured to analyze a characteristic of the differential mode movement may include the control circuit being structured to compare the characteristic of the differential mode movement to a predetermined maximum value for that characteristic to determine whether the differential mode movement indicates a movement of the user's head that is humanly possible such that the differential mode movement indicates a movement of the user's head relative to the reference caused by the user; and the characteristic may be selected from a group consisting of an extent of rotation of the differential mode movement, a speed of rotation of the differential mode movement, an acceleration in rotation of the differential mode movement, a rate of change in acceleration in rotation of differential mode movement, and a frequency of repetition of the differential mode movement. Also, the control circuit may be further structured to immediately determine that the personal acoustic device is not in position on the user's head in response to the characteristic of the differential mode movement exceeding the predetermined maximum value for that characteristic.

The first movement sensor may be a first accelerometer, the second movement sensor may be a second accelerometer, the first signal may indicate a first detected acceleration of the portion, the second signal may indicate a second detected acceleration of the second casing, and the control circuit being structured to distinguish a differential mode movement between the detected movement of the portion and the detected movement of the second casing from a common mode movement may include the control circuit being structured to distinguish a differential mode acceleration between the first and second detected accelerations from a common mode acceleration. The control circuit being structured to analyze a characteristic of the differential mode movement may include the control circuit being structured to compare the characteristic of the differential mode acceleration to a predetermined maximum value for that characteristic to determine whether the differential mode acceleration indicates a movement of the user's head that is humanly possible such that the differential mode acceleration indicates a movement of the user's head relative to the reference caused by the user; and the characteristic may be selected from a group consisting of a magnitude of the differential mode acceleration, a rate of change in the differential mode acceleration, and a frequency of repetition in the differential mode acceleration. Also, the control circuit may be further structured to immediately determine that the personal acoustic device is not in position on the user's head in response to the characteristic of the differential mode acceleration exceeding the predetermined maximum value for that characteristic.

Further, the control circuit may be further structured to analyze a characteristic of the common mode movement by comparing a characteristic of the common mode acceleration to a predetermined maximum value for that characteristic, the characteristic being selected from a group consisting of a magnitude of the common mode acceleration, a rate of change in the common mode acceleration, and a frequency of repetition in the common mode acceleration; and immediately determine that the personal acoustic device is not in position on the user's head in response to the characteristic of the common mode acceleration exceeding the predetermined maximum value for that characteristic. The control circuit may be further structured to immediately determine that the personal acoustic device is in position on the user's head in response to the characteristic of the common mode acceleration not exceeding the predetermined maximum value for that characteristic, wherein the characteristic is the frequency of repetition in the common mode acceleration, and wherein the frequency of repetition in the common mode acceleration is a frequency indicative of repetitive human muscle movement.

Other features and advantages of the invention will be apparent from the description and claims that follow.

DETAILED DESCRIPTION

What is disclosed and what is claimed herein is intended to be applicable to a wide variety of personal acoustic devices, i.e., devices that are structured to be used in a manner in which at least a portion of the devices is positioned in the vicinity of at least one of the user's ears, and that either acoustically output sound to that at least one ear or manipulate an environmental sound reaching that at least one ear. It should be noted that although various specific implementations of personal acoustic devices, such as listening headphones, noise reduction headphones, two-way communications headsets, earphones, earbuds, wireless headsets (also known as "earsets") and ear protectors are presented with some degree of detail, such presentations of specific implementations are intended to facilitate understanding through examples, and should not be taken as limiting either the scope of disclosure or the scope of claim coverage.

It is intended that what is disclosed and what is claimed herein is applicable to personal acoustic devices that provide active noise reduction (ANR), passive noise reduction (PNR), or a combination of both. It is intended that what is disclosed and what is claimed herein is applicable to personal acoustic devices that provide two-way communications, provide only acoustic output of electronically provided audio (including so-called "one-way communications"), or no output of audio, at all, be it communications audio or otherwise. It is intended that what is disclosed and what is claimed herein is applicable to personal acoustic devices that are wirelessly connected to other devices, that are connected to other devices through electrically and/or optically conductive cabling, or that are not connected to any other device, at all. It is intended that what is disclosed and what is claimed herein is applicable to personal acoustic devices having physical configurations structured to be worn in the vicinity of either one or both ears of a user, including and not limited to, headphones with either one or two earpieces, over-the-head headphones, behind-the-neck headphones, headsets with communications microphones (e.g., boom microphones), wireless headsets (earsets), single earphones or pairs of earphones, as well as hats or helmets incorporating earpieces to enable audio communication and/or to enable ear protection. Still other implementations of personal acoustic devices to which what is disclosed and what is claimed herein is applicable will be apparent to those skilled in the art.

Figure 1A:
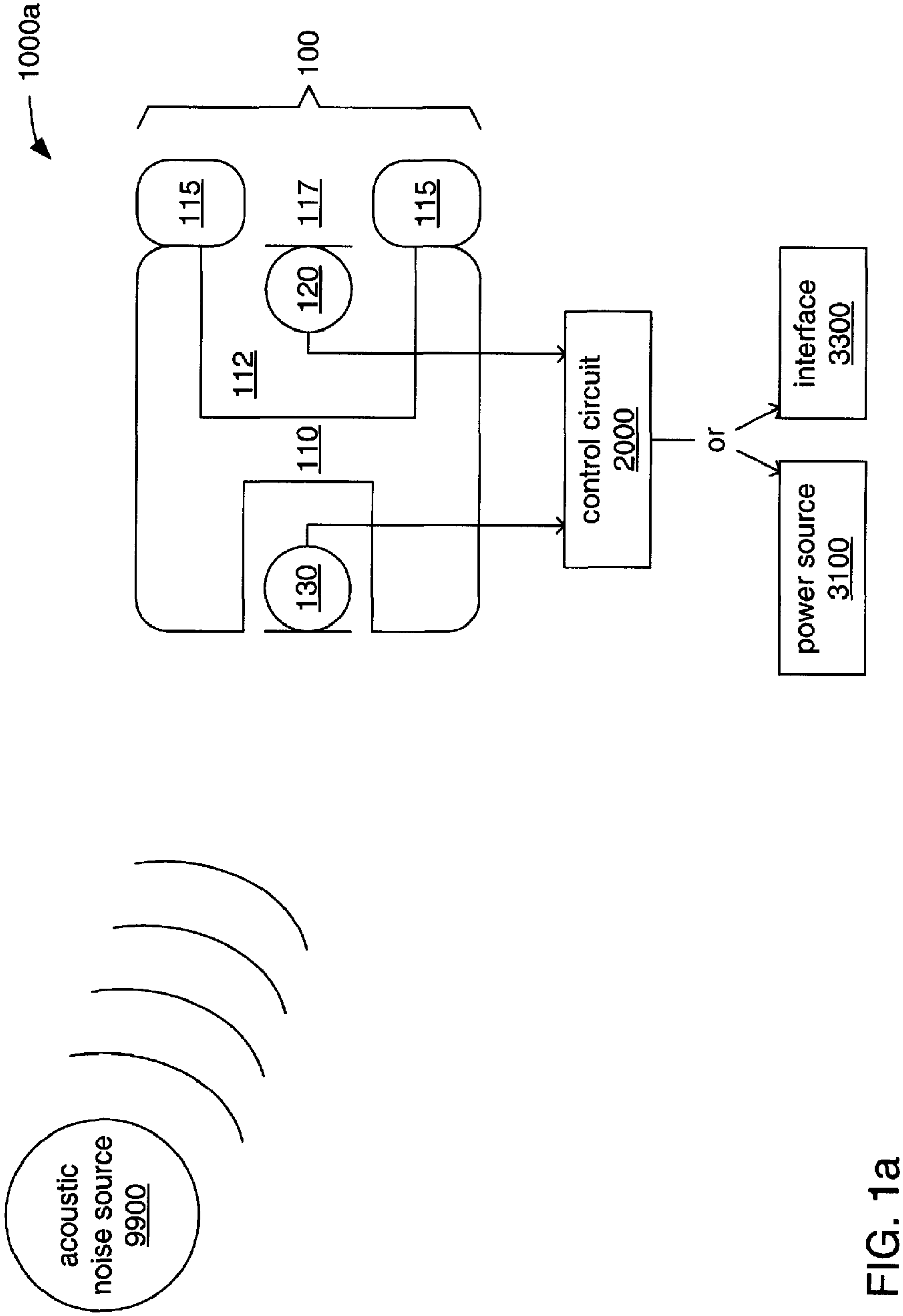
FIGS. 1*a* and 1*b* are block diagrams of portions of possible implementations of personal acoustic devices.
Figure 1B:
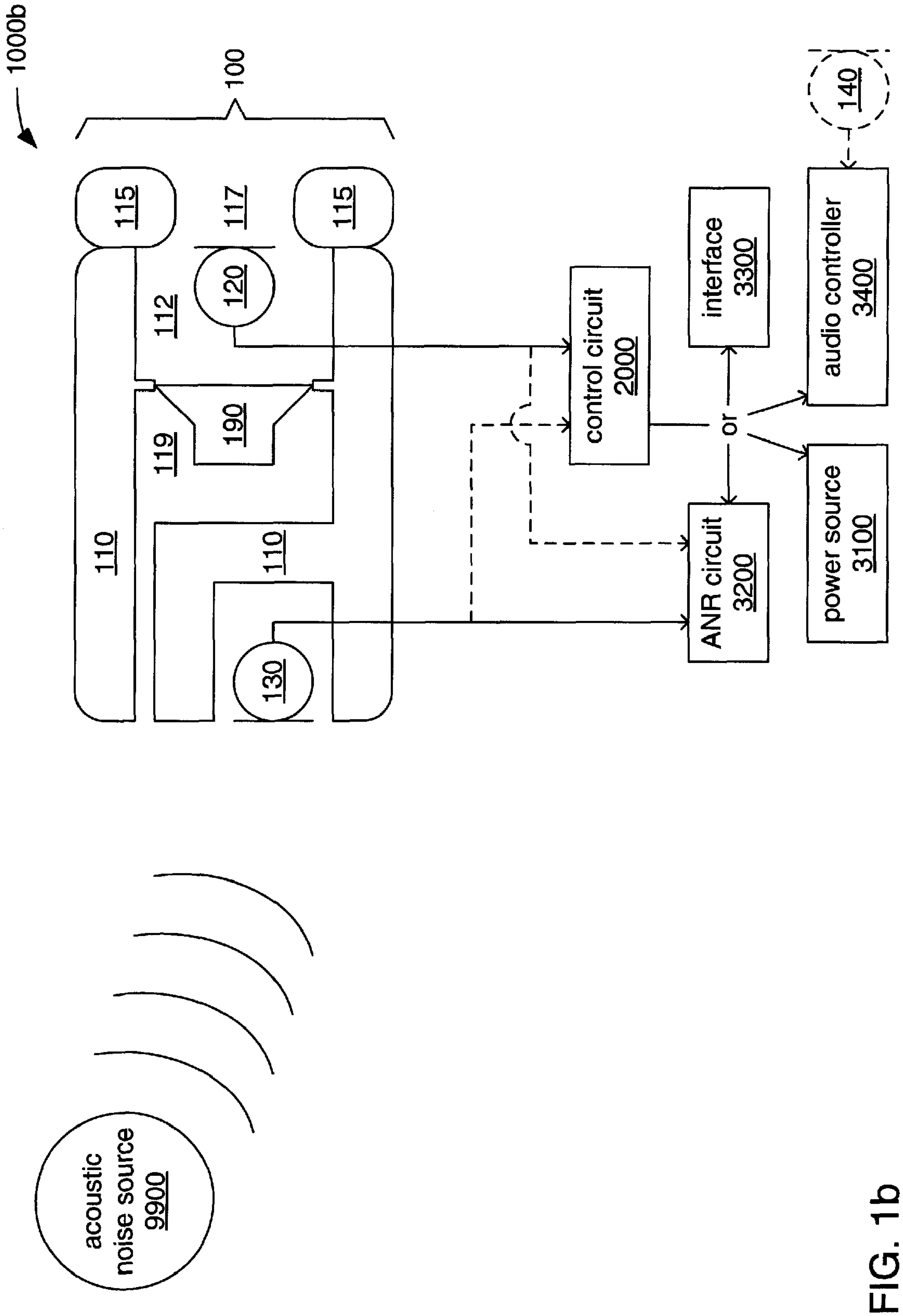

FIGS. 1*a* and 1*b* provide block diagrams of at least a portion of two possible implementations of personal acoustic devices 1000*a* and 1000*b*, respectively. As will be explained in greater detail, recurring analyses are made of sounds detected by different microphones to determine the current operating state of one or more earpieces a personal acoustic device (such as either of the personal acoustic devices 1000*a* or 1000*b*), where the possible operating states of each earpiece are: 1) being positioned in the vicinity of an ear, and 2) not being positioned in the vicinity of an ear. Through such recurring analyses of the current operating state of one or more earpieces, further determinations of whether or not a change in operating state of one or more earpieces has occurred. Through determining the current operating state and/or through determining whether there has been a change in operating state of one or more earpieces, the current operating state and/or whether there has been a change in operating state of the entirety of a personal acoustic device are is determined, where the possible operating states of a personal acoustic drive are: 1) being fully positioned on or about a user's head, 2) being partially positioned on or about the user's head, and 3) not being in position on or about the user's head, at all. These analyses rely on the presence of environmental noise sounds that are detectable by the different microphones, including and not limited to, the sound of the wind, rustling leaves, air blowing through vents, footsteps, breathing, clothes rubbing against skin, running water, structural creaking, animal vocalizations, etc. For purposes of the discussion to follow, the acoustic noise source 9900 depicted in FIGS. 1*a* and 1*b* represents a source of environmental noise sounds.

As will also be explained in greater detail, each of the personal acoustic devices 1000*a* and 1000*b* may have any of a number of physical configurations. FIGS. 2*a* through 2*d* depict possible physical configurations that may be employed by either of the personal acoustic devices 1000*a* and 1000*b*. Some of these depicted physical configurations incorporate a single earpiece 100 to engage only one of the user's ears, and others incorporate a pair of earpieces 100 to engage both of the user's ears. However, it should be noted that for the sake of simplicity of discussion, only a single earpiece 100 is depicted and described in relation to each of FIGS. 1*a* and 1*b*. Each of the personal acoustic devices 1000*a* and 1000*b* incorporates at least one control circuit 2000 that compares sounds detected by different microphones, and that takes any of a variety of possible actions in response to determining that an earpiece 100 and/or the entirety of the personal acoustic device 1000*a* or 1000*b* is in a particular operating state, and/or in response to determining that a particular change in operating state has occurred. FIGS. 3*a* through 3*f* depict possible electrical architectures that may be adopted by the control circuit 2000.

As depicted in FIG. 1*a*, each earpiece 100 of the personal acoustic device 1000*a* incorporates a casing 110 defining a cavity 112 in which at least an inner microphone 120 is disposed. Further, the casing 110 carries an ear coupling 115 that surrounds an opening to the cavity 112. A passage 117 is formed through the ear coupling 115 and communicates with the opening to the cavity 112. In some implementations, an acoustically transparent screen, grill or other form of perforated panel (not shown) may be positioned in or near the passage 117 in a manner that obscures the inner microphone 120 from view either for aesthetic reasons or to protect the microphone 120 from damage. The casing 110 also carries an outer microphone 130 disposed on the casing 110 in a manner that is acoustically coupled to the environment external to the casing 110.

When the earpiece 100 is correctly positioned in the vicinity of a user's ear, the ear coupling 115 of that earpiece 100 is caused to engage portions of that ear and/or portions of the user's head adjacent that ear, and the passage 117 is positioned to face the entrance to the ear canal of that ear. As a result, the cavity 112 and the passage 117 are acoustically coupled to the ear canal. Also as a result, at least some degree of acoustic seal is formed between the ear coupling 115 and the portions of the ear and/or the head of the user that the ear coupling 115 engages. This acoustic seal acoustically isolates the now acoustically coupled cavity 112, passage 117 and ear canal from the environment external to the casing 110 and the user's head, at least to some degree. This enables the casing 110, the ear coupling 115 and portions of the ear and/or the user's head to cooperate to provide some degree of passive noise reduction (PNR). As a result, a sound emitted from the acoustic noise source 9900 at a location external to the casing 110 is attenuated to at least some degree before reaching the cavity 112, the passage 117 and the ear canal.

However, when the earpiece 100 is removed from the vicinity of a user's ear user such that the ear coupling 115 is no longer engaged by portions of that ear and/or of the user's head, both the cavity 112 and the passage 117 are acoustically coupled to the environment external to the casing 110. This reduces the ability of the earpiece 100 to provide PNR, which allows a sound emitted from the acoustic noise source 9900 to reach the cavity 112 and the passage 117 with less attenuation. As those skilled in the art will readily recognize, the recessed nature of the cavity 112 may continue to provide at least some degree of attenuation (in one or more frequency ranges) of a sound from the acoustic noise source 9900 entering into the cavity 112, but the degree of attenuation is still less than when the earpiece is correctly positioned in the vicinity of an ear.

Therefore, as the earpiece 100 changes operating states between being positioned in the vicinity of an ear and not being so positioned, the placement of the inner microphone 120 within the cavity 112 enables the inner microphone 120 to provide a signal reflecting the resulting differences in attenuation as the inner microphone 120 detects a sound emanating from the acoustic noise source 9900. Further, the placement of the outer microphone 130 on or within the casing 110 in a manner acoustically coupled to the environment external to the casing 110 enables the outer microphone 130 to detect the same sound from the acoustic noise source 9900 without the changing attenuation encountered by the inner microphone 120. Therefore, the outer microphone 130 is able to provide a reference signal representing the same sound substantially unchanged by changes in the operating state of the earpiece 100.

The control circuit 2000 receives both of these microphone output signals, and as will be described in greater detail, employs one or more techniques to examine differences between at least these signals in order to determine whether the earpiece 100 is in the operating state of being positioned in the vicinity of an ear, or is in the operating state of not being positioned in the vicinity of an ear. Where the personal acoustic device 1000*a* incorporates only one earpiece 100, determining the operating state of the earpiece 100 may be equivalent to determining whether the entirety of the personal acoustic device 1000*a* is in the operating state of being positioned on or about the user's head, or is in the operating state of not being so positioned. The determination of the operating state of the earpiece 100 and/or of the entirety of the personal acoustic device 1000*a* by the control circuit 2000 enables the control circuit 2000 to further determine when a change in operating state has occurred. As will also be described in greater detail, various actions may be taken by the control circuit 2000 in response to determining that a change in operating state of the earpiece 100 and/or the entirety of the personal acoustic device 1000*a* has occurred.

However, where the personal acoustic device 1000*a* incorporates two earpieces 100, separate examinations of differences between signals provided by the inner microphone 120 and the outer microphone 130 of each of the two earpieces 100 may enable more complex determinations of the operating state of the entirety of the personal acoustic device 1000*a*. In some implementations, the control circuit 2000 may be configured such that determining that at least one of the earpieces 100 is positioned in the vicinity of an ear leads to a determination that the entirety of the personal acoustic device 1000*a* is in the operating state of being positioned on or about a user's head. In such implementations, as long as the control circuit 2000 continues to determine that one of the earpieces 100 is in the operating state of being positioned in the vicinity of an ear, any determination that a change in operating state of the other of the earpieces 100 has occurred will not alter the determination that the personal acoustic device 1000*a* is in the operating state of being positioned on or about a user's head. In other implementations, the control circuit 2000 may be configured such that a determination that either of the earpieces 100 is in the operating state of not being positioned in the vicinity of an ear leads to a determination that the entirety of the personal acoustic device 1000*a* is in the operating state of not being positioned on or about a user's head. In still other implementations, only one of the two earpieces 100 incorporates the inner microphone 120 and the outer microphone 130, and the control circuit 2000 is configured such that determining whether this one earpiece 100 is in the operating state of being positioned in the vicinity of an ear, or not, leads to a determination of whether the entirety of the personal acoustic device 1000*a* is in the operating state of being positioned on or about a user's head, or not.

As depicted in FIG. 1*b*, the personal acoustic device 1000*b* is substantially similar to the personal acoustic device 1000*a*, but with the difference that the earpiece 100 of the personal acoustic device 1000*b* additionally incorporates at least an acoustic driver 190. In some implementations (and as depicted in FIG. 1*b*), the acoustic driver 190 is positioned within the casing 110 in a manner in which at least a portion of the acoustic driver 190 partially defines the cavity 112 along with portions of the casing 110. This manner of positioning the acoustic driver 190 creates another cavity 119 within the casing 110 that is separated from the cavity 112 by the acoustic driver 190. As will be explained in greater detail, in some implementations, the acoustic driver 190 is employed to acoustically output electronically provided audio received from other devices (not shown), and/or to acoustically output internally generated sounds, including ANR anti-noise sounds.

In some variations, the cavity 119 may be coupled to the environment external to the casing 110 via one or more acoustic ports (only one of which is shown), each tuned by their dimensions to a selected range of audible frequencies to enhance characteristics of the acoustic output of sounds by the acoustic driver 190 in a manner readily recognizable to those skilled in the art. Also, in some variations, one or more tuned ports (not shown) may couple the cavities 112 and 119, and/or may couple the cavity 112 to the environment external to the casing 110. Although not specifically depicted, acoustically transparent screens, grills or other forms of perforated or fibrous structures may be positioned within one or more of such ports to prevent passage of debris or other contaminants therethrough, and/or to provide some level of acoustical resistance.

As is also depicted in FIG. 1*b*, the personal acoustic device 1000*b* may further differ from the personal acoustic device 1000*a* by further incorporating a communications microphone 140 to enable two-way communications by detecting sounds in the vicinity of a user's mouth. Therefore, the communications microphone 140 is able to provide a signal representing a sound from the vicinity of the user's mouth as detected by the communications microphone 140. As will be described in greater detail, signals representing various sounds, including sounds detected by the communications microphone 140 and sounds to be acoustically output by the acoustic driver 190, may be altered in one or more ways under the control of the control circuit 2000. Although the communications microphone 140 is depicted as being a separate and distinct microphone from the outer microphone 130, it should also be noted that in some implementations, the outer microphone 130 and the communications microphone 140 may be one and the same microphone. Thus, in some implementations, a single microphone may be employed both in supporting two-way communications and in determining the operating state of the earpiece 100 and/or of the entirety of the personal acoustic device 1000*b*.

Since the personal acoustic device 1000*b* incorporates the acoustic driver 190 while the personal acoustic device 1000*a* does not, implementations of the personal acoustic device 1000*b* are possible in which ANR functionality is provided. As those skilled in the art will readily recognize, the formation of the earlier described acoustic seal at times when the earpiece 100 is positioned in the vicinity of an ear makes the provision of ANR easier and more effective. Acoustically coupling the cavity 112 and the passage 117 to the environment external to the casing 110, as occurs when the earpiece 100 is not so positioned, decreases the effectiveness of both feedback-based and feedforward-based ANR. Therefore, regardless of whether implementations of the personal acoustic device 1000*b* provide ANR, or not, the degree of attenuation of environmental noise sounds as detected by the inner microphone 120 continues to be greater when the earpiece 100 is positioned in the vicinity of an ear than when the earpiece 100 is not so positioned. Thus, analyses of the signals output by the inner microphone 120 and the outer microphone 130 by the control circuit 2000 may still be used to determine whether changes in the operating state of an earpiece 100 and/or of the entirety of the personal acoustic device 1000*b* have occurred, regardless of whether or not ANR is provided.

The control circuit 2000 in either of the personal acoustic devices 1000*a* and 1000*b* may take any of a number of actions in response to determining that a single earpiece 100 and/or the entirety of the personal acoustic device 1000*a* or 1000*b* is currently in a particular operating state and/or in response to determining that a change in operating state of a single earpiece 100 and/or of the entirety of the personal acoustic device 1000*a* or 1000*b* has occurred. The exact nature of the actions taken may depend on the functions performed by the personal acoustic device 1000*a* or 1000*b*, and/or whether the personal acoustic device 1000*a* or 1000*b* has one or two of the earpieces 100. In support of the control circuit 2000 taking such actions, each of the personal acoustic devices 1000*a* and 1000*b* may further incorporate one or more of a power source 3100 controllable by the control circuit 2000, an ANR circuit 3200 controllable by the control circuit 2000, an interface 3300 and an audio controller 3400 controllable by the control circuit 2000. It should be noted that for the sake of simplicity of depiction and discussion, interconnections between the acoustic driver 190 and either of the ANR circuit 3200 and the audio controller 3400 have been intentionally omitted. Interconnections to convey signals representing ANR anti-noise sounds and/or electronically provided audio to the acoustic driver 190 for being acoustically output are depicted and described in considerable detail, elsewhere.

Where either of the personal acoustic devices 1000*a* and 1000*b* incorporates a power source 3100 having limited capacity to provide power (e.g., a battery), the control circuit 2000 may signal the power source 3100 to turn on, turn off or otherwise alter its provision of power in response to determining that a particular operating state is the current operating state and/or that a change in operating state has occurred. Additionally and/or alternatively, where either of the personal acoustic devices 1000*a* and 1000*b* incorporates an ANR circuit 3200 to provide ANR functionality, the control circuit 2000 may similarly signal the ANR circuit 3200 to turn on, turn off or otherwise alter its provision of ANR. By way of example, where the personal acoustic device 1000*b* is a pair of headphones employing the acoustic driver 190 of each the earpieces 100 to providing ANR and/or acoustic output of audio from an audio source (not shown), the control circuit 2000 may operate the power source 3100 to save power by reducing or entirely turning off the provision of power to other components of the personal acoustic device 1000*b* in response to determining that there has been a change in operating state of the personal acoustic device 1000*b* from being positioned on or about the user's head to no longer being so positioned. Alternatively and/or additionally, the control circuit 2000 may operate the power source 3100 to save power in response to determining that the entirety of the personal acoustic device 1000*b* has been in the state of not being positioned on or about a user's head for at least a predetermined period of time. In some variations, the control circuit 2000 may also operate the power source 3100 to again provide power to other components of the acoustic device 1000*b* in response to determining that there has been a change in operating state of the personal acoustic device 1000*b* to again being positioned on or about the head of the user. Among the other components to which the provision of power by the power source 3100 may be altered may be the ANR circuit 3200. Alternatively, the control circuit 2000 may directly signal the ANR circuit 3200 to reduce, cease and/or resume its provision of ANR.

Where either of the personal acoustic devices 1000*a* and 1000*b* incorporates a interface 3300 capable of signaling another device (not shown) to control an interaction with that other device to perform a function, the control circuit 2000 may operate the interface 3300 to signal the other device to turn on, turn off, or otherwise alter the interaction in response to determining that a change in operating state has occurred. By way of example, where the personal acoustic device 1000*b* is a pair of headphones providing acoustic output of audio from the other device (e.g., a CD or MP3 audio file player, a cell phone, etc.), the control circuit 2000 may operate the interface 3300 to signal the other device to pause the playback of recorded audio through the personal acoustic device 1000*b* in response to determining that there has been a change in operating state of the personal acoustic device 1000*b* from being positioned on or about the user's head to no longer being so positioned. In some variations, the control circuit 2000 may also operate the interface 3300 to signal the other device to resume such playback in response to determining that there has been another change in operating state such that the personal acoustic device 1000*b* is once again positioned on or about the user's head. This may be deemed to be a desirable convenience feature for the user, allowing the user's enjoyment of an audio recording to be automatically paused and resumed in response to instances where the user momentarily removes the personal acoustic device 1000*b* from their head to talk with someone in their presence. By way of another example, where the personal acoustic device 1000*a* is a pair of ear protectors meant to be used with another device that produces potentially injurious sound levels during operation (e.g., a piece of construction, mining or manufacturing machinery), the control circuit 2000 may operate the interface 3300 to signal the other device as to whether or not the personal acoustic device 1000*a* is currently in the operating state of being positioned on or about the user's head. This may be done as part of a safety feature of the other device in which operation of the other device is automatically prevented unless there is an indication received from the personal acoustic device 1000*a* that the operating state of the personal acoustic device 1000*a* has changed to the personal acoustic device 1000*a* being positioned on or about the user's head, and/or that the personal acoustic device 1000*a* is currently in the state of being positioned on or about the user's head such that its earpieces 100 are able to provide protection to the user's hearing during operation of the other device.

Where either of the personal acoustic devices 1000*a* and 1000*b* incorporates an audio controller 3400 capable of modifying signals representing sounds that are acoustically output and/or detected, the control circuit 2000 may signal the audio controller 3400 to reroute, mute or otherwise alter sounds represented by one or more signals. By way of example, where the personal acoustic device 1000*b* is a pair of headphones providing acoustic output of audio from another device, the control circuit 2000 may signal the audio controller 3400 to reroute a signal representing sound being acoustically output by the acoustic driver 190 of one of the earpieces 100 to the acoustic driver 190 of the other of the earpieces 100 in response to determining that the one of the earpieces 100 has changed and is no longer in the operating state of being positioned in the vicinity of an ear, but that the other of the earpieces 100 still is (i.e., in response to determining that the entirety of the personal acoustic device 1000*a* or 1000*b* is in the state of being partially in place on or about the head of a user). A user may deem it desirable to have both left and right audio channels of stereo audio momentarily directed to whichever one of the earpieces 100 that is still in the operating state of positioned in the vicinity of one of the user's ears as the user momentarily changes the state of the other of the earpieces 100 by momentarily pulling the other of the earpieces 100 away from the other ear to momentarily talk with someone in their presence. By way of another example, where the personal acoustic device 1000*b* is a headset that further incorporates the communications microphone 140 to support two-way communications, the control circuit 2000 may signal the audio controller 3400 to mute whatever sounds are detected by the communications microphone 140 to enhance user privacy in response to determining that the personal acoustic device 1000*b* is not in the state of being positioned on or about the user's head, and to cease to mute that signal in response to determining that the personal acoustic device 1000*b* is once again in the state of being so positioned.

It should be noted that where either of the personal acoustic devices 1000*a* and 1000*b* interact with another device to signal the other device to control the interaction with that other device, to receive a signal representing sounds from the other device, and/or to transmit a signal representing sounds to the other device, any of a variety of technologies to enable such signaling may be employed. More specifically, the interface 3300 may employ any of a variety of wireless technologies (e.g., infrared, radio frequency, etc.) to signal the other device, or may signal the other device via a cable incorporating electrical and/or optical conductors that is coupled to the other device. Similarly, the exchange of signals representing sounds with another device may employ any of a variety of cable-based or wireless technologies.

It should be noted that the electronic components of either of the personal acoustic devices 1000*a* and 1000*b* may be at least partially disposed within the casing 110 of at least one earpiece 100. Alternatively, the electronic components may be at least partially disposed within another casing that is coupled to at least one earpiece 100 of the personal acoustic device 1000*a* or 1000*b* through a wired and/or wireless connection. More specifically, the casing 110 of at least one earpiece 100 may carry one or more of the control circuit 2000, the power source 3100, the ANR circuit 3200, the interface 3300, and/or the audio controller 3400, as well as other electronic components that may be coupled to any of the inner microphone 120, the outer microphone 130, the communications microphone 140 (where present) and/or the acoustic driver 190 (where present). Further, in implementations having more than one of the earpieces 100, wired and/or wireless connections may be employed to enable signaling between electronic components disposed among the two casings 110. Still further, although the outer microphone 130 is depicted and discussed as being disposed on the casing 110, and although this may be deemed desirable in implementations where the outer microphone 130 also serves to provide input to the ANR circuit 3200 (where present), other implementations are possible in which the outer microphone 130 is disposed on another portion of either of the personal acoustic devices 1000*a* and 1000*b*.

FIGS. 2*a* through 2*d* depict various possible physical configurations that may be adopted by either of the personal acoustic devices 1000*a* and 1000*b* of FIGS. 1*a* and 1*b*, respectively. As previously discussed, different implementations of either of the personal acoustic devices 1000*a* and 1000*b* may have either one or two earpieces 100, and are structured to be positioned on or near a user's head in a manner that enables each earpiece 100 to be positioned in the vicinity of an ear.

Figure 2A:
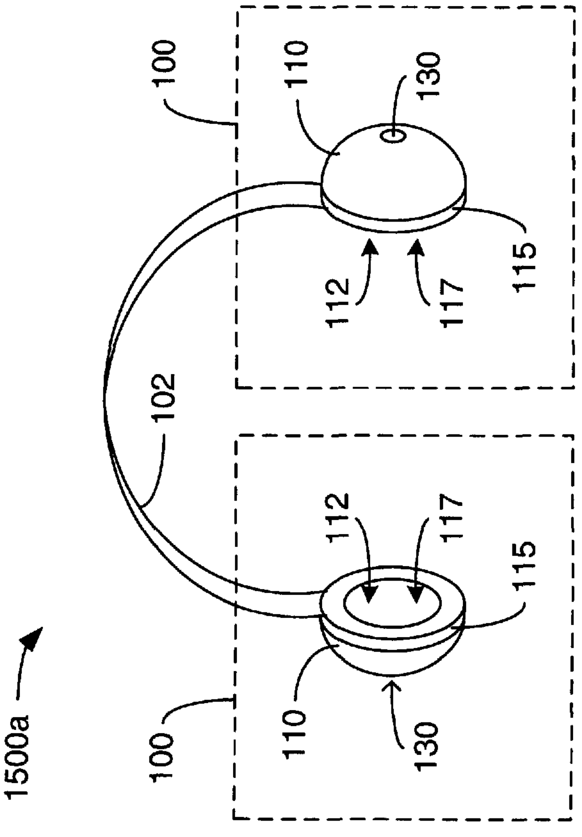
FIGS. 2*a* through 2*d* depict possible physical configurations of personal acoustic devices having either one or two earpieces.

FIG. 2*a* depicts an "over-the-head" physical configuration 1500*a* that incorporates a pair of earpieces 100 that are each in the form of an earcup, and that are connected by a headband 102 structured to be worn over the head of a user. However, and although not specifically depicted, an alternate variant of the physical configuration 1500*a* may incorporate only one of the earpieces 100 connected to the headband 102. Another alternate variant may replace the headband 102 with a different band structured to be worn around the back of the head and/or the back of the neck of a user.

In the physical configuration 1500*a*, each of the earpieces 100 may be either an "on-ear" or an "over-the-ear" form of earcup, depending on their size relative to the pinna of a typical human ear. As previously discussed, each earpiece 100 has the casing 110 in which the cavity 112 is formed, and the casing 110 carries the ear coupling 115. In this physical configuration, the ear coupling is in the form of a flexible cushion (possibly ring-shaped) that surrounds the periphery of the opening into the cavity 112 and that has the passage 117 formed therethrough that communicates with the cavity 112.

Where the earpieces 100 are structured to be worn as over-the-ear earcups, the casing 110 and the ear coupling 115 cooperate to substantially surround the pinna of an ear of a user. Thus, when such a variant of the personal acoustic device 1000*a* is correctly positioned, the headband 102 and the casing 110 cooperate to press the ear coupling 115 against portions of a side of the user's head surrounding the pinna of an ear such that the pinna is substantially hidden from view. Where the earpieces 100 are structured to be worn as on-ear earcups, the casing 110 and ear coupling 115 cooperate to overlie peripheral portions of a pinna that surround the entrance of an associated ear canal. Thus, when correctly positioned, the headband 102 and the casing 110 cooperate to press the ear coupling 115 against peripheral portions of the pinna in a manner that likely leaves portions of the periphery of the pinna visible. The pressing of the flexible material of the ear coupling 115 against either peripheral portions of a pinna or portions of a head surrounding a pinna serves both to acoustically couple the ear canal with the cavity 112 through the passage 117, and to form the previously discussed acoustic seal to enable the provision of PNR.

Figure 2B:
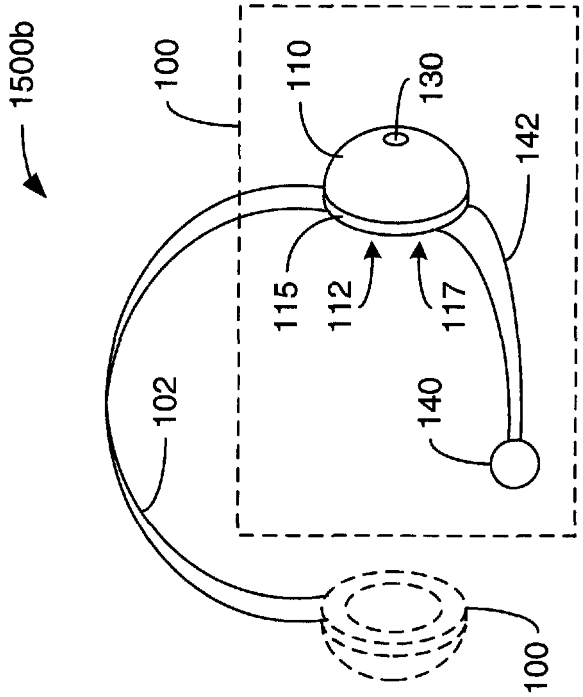

FIG. 2*b* depicts another over-the-head physical configuration 1500*b* that is substantially similar to the physical configuration 1500*a*, but in which one of the earpieces 100 additionally incorporates a communications microphone 140 connected to the casing 110 via a microphone boom 142. When this particular one of the earpieces 100 is correctly positioned in the vicinity of a user's ear, the microphone boom 142 extends generally alongside a portion of a cheek of the user to position the communications microphone 140 closer to the mouth of the user to detect speech sounds acoustically output from the user's mouth. However, and although not specifically depicted, an alternative variant of the physical configuration 1500*b* is possible in which the communications microphone 140 is more directly disposed on the casing 110, and the microphone boom 142 is a hollow tube that opens on one end in the vicinity of the user's mouth and on the other end in the vicinity of the communications microphone 140 to convey sounds through the tube from the vicinity of the user's mouth to the communications microphone 140.

FIG. 2*b* also depicts the other of the earpieces 100 with broken lines to make clear that still another variant of the physical configuration 1500*b* is possible that incorporates only the one of the earpieces 100 that incorporates the communications microphone 140. In such another variant, the headband 102 would still be present and would continue to be worn over the head of the user.

As previously discussed, the control circuit 2000 and/or other electronic components may be at least partly disposed either within a casing 110 of an earpiece 100, or may be at least partly disposed in another casing (not shown). With regard to the physical configurations 1500*a* and 1500*b* of FIGS. 1*a* and 1*b*, respectively, such another casing may incorporated into the headband 102 or into a different form of band connected to at least one earpiece 100. Further, although each of the physical configurations 1500*a* and 1500*b* depict the provision of individual ones of the outer microphone 130 disposed on each casing 110 of each earpiece 100, alternate variants of these physical configurations are possible in which a single outer microphone 130 is disposed elsewhere, including and not limited to, on the headband 102 or on the boom 142. In such variants having two of the earpieces 100, the signal output by a single such outer microphone 130 may be separately compared to each of the signals output by separate ones of the inner microphones 120 that are separately disposed within the separate cavities 112 of each of the two earpieces 100.

Figure 2D:
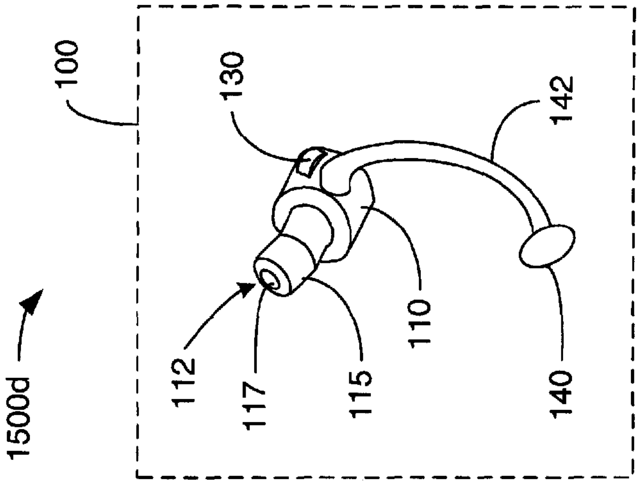
Figure 2C:
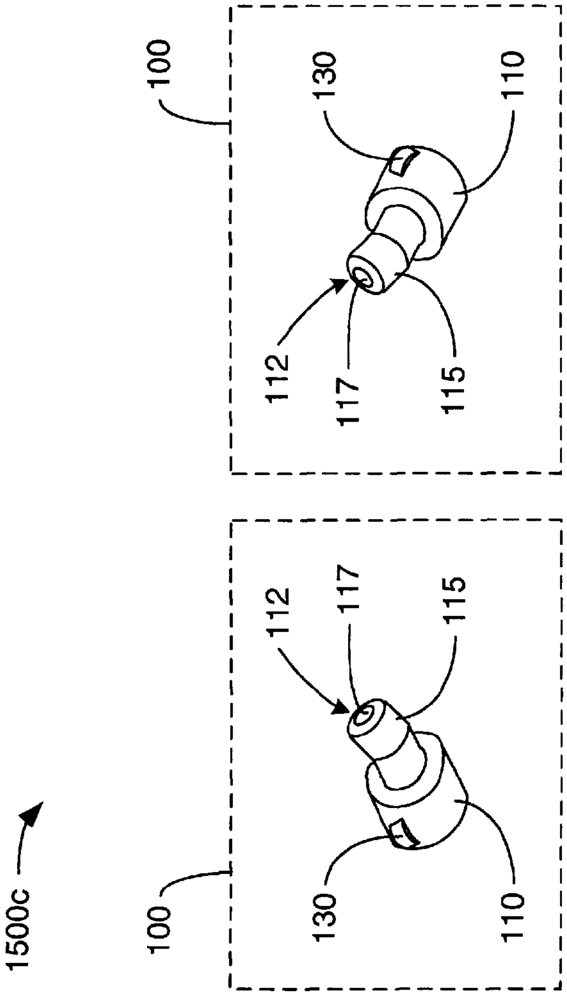

FIG. 2*c* depicts an "in-ear" physical configuration 1500*c* that incorporates a pair of earpieces 100 that are each in the form of an in-ear earphone, and that may or may not be connected by a cord and/or by electrically or optically conductive cabling (not shown). However, and although not specifically depicted, an alternate variant of the physical configuration 1500*c* may incorporate only one of the earpieces 100.

As previously discussed, each of the earpieces 100 has the casing 110 in which the open cavity 112 is formed, and that carries the ear coupling 115. In this physical configuration, the ear coupling 115 is in the form of a substantially hollow tube-like shape defining the passage 117 that communicates with the cavity 112. In some implementations, the ear coupling 115 is formed of a material distinct from the casing 110 (possibly a material that is more flexible than that from which the casing 110 is formed), and in other implementations, the ear coupling 115 is formed integrally with the casing 110.

Portions of the casing 110 and/or of the ear coupling 115 cooperate to engage portions of the concha and/or the ear canal of a user's ear to enable the casing 110 to rest in the vicinity of the entrance of the ear canal in an orientation that acoustically couples the cavity 112 with the ear canal through the passage 117. Thus, when the earpiece 100 is properly positioned, the entrance to the ear canal is substantially "plugged" to create the previously discussed acoustic seal to enable the provision of PNR.

FIG. 2*d* depicts another in-ear physical configuration 1500*d* that is substantially similar to the physical configuration 1500*c*, but in which one of the earpieces 100 is in the form of a single-ear headset (sometimes also called an "earset") that additionally incorporates a communications microphone 140 disposed on the casing 110. When this earpiece 100 is correctly positioned in the vicinity of a user's ear, the communications microphone 140 is generally oriented towards the vicinity of the mouth of the user in a manner chosen to detect speech sounds produced by the user. However, and although not specifically depicted, an alternative variant of the physical configuration 1500*d* is possible in which sounds from the vicinity of the user's mouth are conveyed to the communications microphone 140 through a tube (not shown), or in which the communications microphone 140 is disposed on a microphone boom 142 connected to the casing 110 and positioning the communications microphone 140 in the vicinity of the user's mouth.

Although not specifically depicted in FIG. 2*d*, the depicted earpiece 100 of the physical configuration 1500*d* having the communications microphone 140 may or may not be accompanied by another earpiece having the form of an in-ear earphone (such as one of the earpieces 100 depicted in FIG. 2*c*) that may or may not be connected to the earpiece 100 depicted in FIG. 2*d* via a cord or conductive cabling (also not shown).

Referring again to both of the physical configurations 1500*b* and 1500*d*, as previously discussed, implementations of the personal acoustic device 1000*b* supporting two-way communications are possible in which the communications microphone 140 and the outer microphone 130 are one and the same microphone. To enable two-way communications, this single microphone is preferably positioned at the end of the boom 142 or otherwise disposed on a casing 110 in a manner enabling detection of a user's speech sounds. Further, in variants of such implementations having a pair of the earpieces 100, the single microphone may serve the functions of all three of the communications microphone 140 and both of the outer microphones 130.

FIGS. 3*a* through 3*f* depict possible electrical architectures that may be employed by the control circuit 2000 in implementations of either of the personal acoustic devices 1000*a* and 1000*b*. As in the case of FIGS. 1*a-b*, although possible implementations of the personal acoustic devices 1000*a* and 1000*b* may have either a single earpiece 100 or a pair of the earpieces 100, electrical architectures associated with only one earpiece 100 are depicted and described in relation to each of FIGS. 3*a-f* for the sake of simplicity and ease of understanding. In implementations having a pair of the earpieces 100, at least a portion of any of the electrical architectures discussed in relation to any of FIGS. 3*a-f* and/or portions of their components may be duplicated between the two earpieces 100 such that the control circuit 2000 is able to receive and analyze signals from the inner microphones 120 and the outer microphones 130 of two earpieces 100. Further, these electrical architectures are presented in somewhat simplified form in which minor components (e.g., microphone preamplifiers, audio amplifiers, analog-to-digital converters, digital-to-analog converters, etc.) are intentionally not depicted for the sake of clarity and ease of understanding.

As previously discussed with regard to FIGS. 1*a-b*, the placement of the inner microphone 120 within the cavity 112 of an earpiece 100 of either of the personal acoustic devices 1000*a* or 1000*b* enables detection of how environmental sounds external to the casing 110 (represented by the sounds emanating from the acoustic noise source 9900) are subjected to at least some degree of attenuation before being detected by the inner microphone 120. Also, this attenuation may be at least partly a result of ANR functionality being provided. Further, the degree of this attenuation changes depending on whether the earpiece 100 is positioned in the vicinity of an ear, or not. To put this another way, a sound propagating from the acoustic noise source 9900 to the location of the inner microphone 120 within the cavity 112 is subjected to different transfer functions that each impose a different degree of attenuation depending on whether the earpiece 100 is positioned in the vicinity of an ear, or not.

As also previously discussed, the outer microphone 130 is carried by the casing 110 of the earpiece 100 in a manner that remains acoustically coupled to the environment external to the casing 110 regardless of whether the earpiece 100 is in the operating state of being positioned in the vicinity of an ear, or not. To put this another way, a sound propagating from the acoustic noise source 9900 to the outer microphone 130 is subjected to a relatively stable transfer function that attenuates the sound in a manner that is relatively stable, even as the transfer functions to which the same sound is subjected as it propagates from the acoustic noise source 9900 to the inner microphone 120 change with a change in operating state of the earpiece 100.

In each of these electrical architectures, the control circuit 2000 employs the signals output by the inner microphone 120 and the outer microphone 130 in analyses to determine whether an earpiece 100 is in the operating state of being positioned in the vicinity of an ear, or not. The signal output by the outer microphone 130 is used as a reference against which the signal output by the inner microphone 120 is compared, and differences between these signals caused by differences in the transfer functions to which a sound is subjected in reaching each of the outer microphone 130 and the inner microphone 120 are analyzed to determine if those differences are consistent with the earpiece being so positioned, or not.

However, and as will be explained in greater detail, the signals output by one or both of the inner microphone 120 and/or the outer microphone 130 may also be employed for other purposes, including and not limited to various forms of feedback-based and feedforward-based ANR. Further, in at least some of these electrical architectures, the control circuit 2000 may employ various techniques to compensate for the effects of PNR and/or ANR on the detection of sound by the inner microphone 120.

Figure 3A:
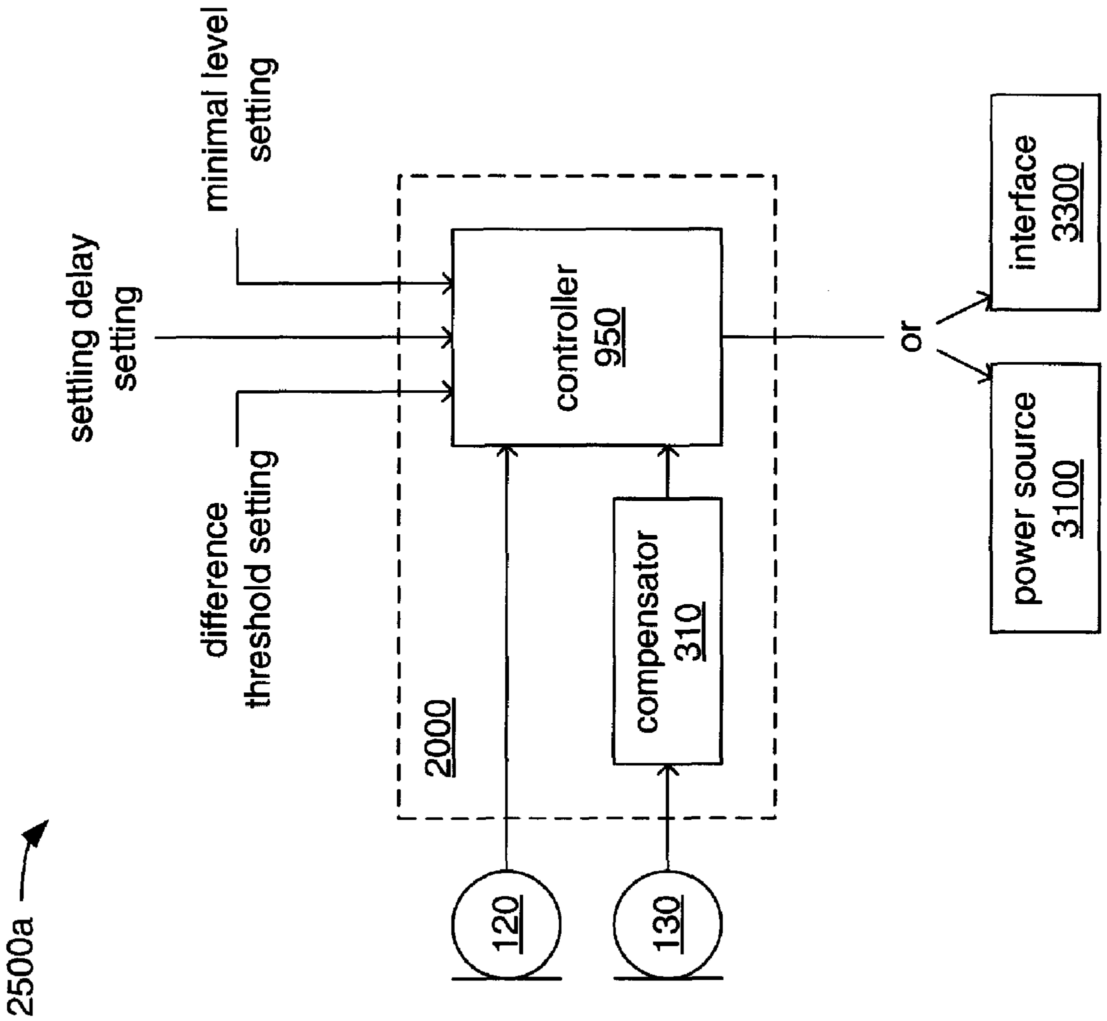
FIGS. 3*a* through 3*f* depict portions of possible electrical architectures of personal acoustic devices in which comparisons are made between signals provided by an inner microphone and an outer microphone.

FIG. 3*a* depicts a possible electrical architecture 2500*a* of the control circuit 2000 usable in either of the personal acoustic devices 1000*a* and 1000*b* where at least PNR is provided. In employing the electrical architecture 2500*a*, the control circuit 2000 incorporates a compensator 310 and a controller 950, which are interconnected to analyze a difference in signal levels of the signals received from the inner microphone 120 and the outer microphone 130.

The inner microphone 120 detects the possibly more attenuated form of a sound emanating from the acoustic noise source 9900 present within the cavity 112, and outputs a signal representative of this sound to the controller 950. The outer microphone 130 detects the same sound emanating from the acoustic noise source 9900 at a location external to the cavity 112, and outputs a signal representative this sound to the compensator 310. The compensator 310 subjects the signal from the outer microphone 130 to a transfer function selected to alter the sound represented by the signal in a manner substantially similar to the transfer function to which the sound emanating from the acoustic noise source 9900 is subjected as it reaches the inner microphone 120 at a time when the earpiece 100 is positioned in the vicinity of an ear. The compensator 310 then provides the resulting altered signal to the controller 950, and the controller 950 analyzes signal level differences between the signals received from the inner microphone 120 and the compensator 310. In analyzing the received signals, the controller 950 may be provided with one or more of a difference threshold setting, a settling delay setting and a minimum level setting.

In analyzing the signal levels of the two received signals, the controller 950 may employ bandpass filters or other types of filters to limit the analysis of signal levels to a selected range of audible frequencies. As those skilled in the art will readily recognize, the choice of a range of frequencies (or of multiple ranges of frequencies) must be at least partly based on the range(s) of frequencies in which environmental noise sounds are expected to occur and/or range(s) of frequencies in which changes in attenuation of sounds entering the cavity 112 as a result of changes in operating state are more easily detected, given various acoustic characteristics of the cavity 112, the passage 117 and/or the acoustic seal that is able to be formed. By way of example, the range of frequencies may be selected to be approximately 100 Hz to 500 Hz in recognition of findings that many common environmental noise sounds have acoustic energy within this frequency range. By way of another example, the range of frequencies may be selected to be approximately 400 Hz to 600 Hz in recognition of findings that changes in PNR provided by at least some variants of over-the-ear physical configurations as a result of changes in operating state are most easily detected in such a range of frequencies. However, as those skilled in the art will readily recognize, other ranges of frequencies may be selected, multiple discontiguous ranges of frequencies may be selected, and any selection of a range of frequencies may be for any of a variety of reasons.

Subjecting the signal output by the outer microphone 130 to being altered by the transfer function of the compensator 310 enables the controller 950 to determine that the earpiece 100 is in the operating state of being positioned in the vicinity of an ear when it detects that the signal levels of the signals received from the inner microphone 120 and the compensator within the selected range(s) of frequencies are similar to the degree specified by the difference threshold setting. Otherwise, the earpiece 100 is determined to not be in the operating state of being so positioned. In an alternative implementation, the compensator 310 subjects the signal from the outer microphone 130 to a transfer function selected to alter the sound represented by the signal in a manner substantially similar to the transfer function to which the sound emanating from the acoustic noise source 9900 is subjected as it reaches the inner microphone 120 at a time when the earpiece 100 is in the operating state of not positioned in the vicinity of an ear. In such an alternative implementation, the controller 950 determines that the earpiece 100 is not positioned in the vicinity of an ear when it detects that the signal levels of the signals received from the inner microphone 120 and the compensator 310 within the selected range(s) of frequencies are similar to the degree specified by the difference threshold setting. Otherwise, the earpiece 100 is determined to be in the operating state of being positioned in the vicinity of an ear.

In still other alternative implementations, the signal output by the outer microphone 130 may be provided to the controller 950 without being subjected to a transfer function, and instead, an alternate compensator may be interposed between the inner microphone 120 and the controller 950. Such an alternate compensator would subject the signal output by the inner microphone 120 to a transfer function selected to alter the sound represented by the signal in a manner that substantially reverses the transfer function to which the sound emanating from the acoustic noise source 9900 is subjected as it reaches the inner microphone 120, either at a time when the earpiece 100 is in the operating state of being positioned in the vicinity of an ear, or at a time when the earpiece is not in the operating state of being so positioned. The controller 950 then determines whether the earpiece 100 is so positioned, or not, based on detecting whether or not the signal levels within the selected range(s) of frequencies are similar to the degree specified by the difference threshold setting.

However, in yet another alternative implementation, the signals output by each of the inner microphone 120 and the outer microphone 130 are provided to the controller 950 without such alteration by compensators. In such an implementation, one or more difference threshold settings may specify two different degrees of difference in signal levels, where one is consistent with the earpiece 100 being in the operating state of being positioned in the vicinity of an ear, and the other is consistent with the earpiece 100 being in the operating state of not being so positioned. The controller then detects whether the difference in signal level between the two received signals within the selected range(s) of frequencies is closer to one of the specified degrees of difference, or the other, to determine whether or not the earpiece is positioned in the vicinity of an ear. In determining the degree of similarity of signal levels between signals, the controller 950 may employ any of a variety of comparison algorithms. In some implementations, the difference threshold setting(s) provided to the controller 950 may indicate the degree of difference in terms of a percentage or an amount in decibels.

As previously discussed, determining the current operating state of an earpiece 100 and/or of the entirety of the personal acoustic device 1000*a* or 1000*b* is a necessary step to determining whether or not a change in the operating state has occurred. To put this another way, the controller 2000 determines that a change in operating state has occurred by first determining that an earpiece 100 and/or the entirety of the personal acoustic device 1000*a* or 1000*b* was earlier in one operating state, and then determining that the same earpiece 100 and/or the entirety of the personal acoustic device 1000*a* or 1000*b* is currently in another operating state.

In response to determining that the earpiece 100 and/or the entirety of the personal acoustic device 1000*a* or 1000*b* is currently in a particular operating state, and/or in response to determining that a change in state of an earpiece 100 and/or of the entirety of the personal acoustic device 1000*a* or 1000*b* has occurred, it is the controller 950 of the control circuit 2000 that takes action, such as signaling the power source 3100, the ANR circuit 3200, the interface 3300, the audio controller 3400, and/or other components, as previously described. However, as will be understood by those skilled in the art, spurious movements or other acts of a user that generate spurious sounds and/or momentarily move an earpiece 100 relative to an ear may be detected by one or both of the inner microphone 120 and the outer microphone 130, and may result in false determinations of a change in operating state of an earpiece 100. This may result in false determinations that a change in operating state of the entirety of the personal acoustic device 1000*a* or 1000*b* has occurred, and/or the controller 950 taking unnecessary actions. To counter such results, the controller 950 may be supplied with a delay setting specifying a selected period of time that the controller 950 allows to pass since the last instance of determining that a change in operating state of an earpiece 100 has occurred before making a determination of whether a change in operating state of the entirety of the personal acoustic device 1000*a* or 1000*b* has occurred, and/or before taking any action in response.

In some implementations, the controller 950 may also be supplied a minimum level setting specifying a selected minimum signal level that must be met by one or both of the signals received from the inner microphone 120 and the outer microphone 130 (whether through a compensator of some variety, or not) for those signals to be deemed reliable for use in determining whether an earpiece 100 is positioned in the vicinity of an ear, or not. This may be done in recognition of the reliance of the analysis performed by the controller 950 on there being environmental noise sounds available to be detected by the inner microphone 120 and the outer microphone 130. In response to occasions when there are insufficient environmental noise sounds available for detection by the inner microphone 120 and/or the outer microphone 130, and/or for the generation of signals by the inner microphone 120 and the outer microphone 130, the controller 950 may simply refrain from attempting to determine a current operating state, refrain from determining whether a change in operating state of an earpiece 100 and/or of the personal acoustic device 1000*a* or 1000*b* has occurred, and/or refrain from taking any actions, at least until usable environmental noise sounds are once again available. Alternatively and/or additionally, the controller 950 may temporarily alter the range of frequencies on which analysis of signal levels is based in an effort to locate an environmental noise sound outside the range of frequencies otherwise normally used in analyzing the signals output by the inner microphone 120 and the outer microphone 130.

Figure 3B:
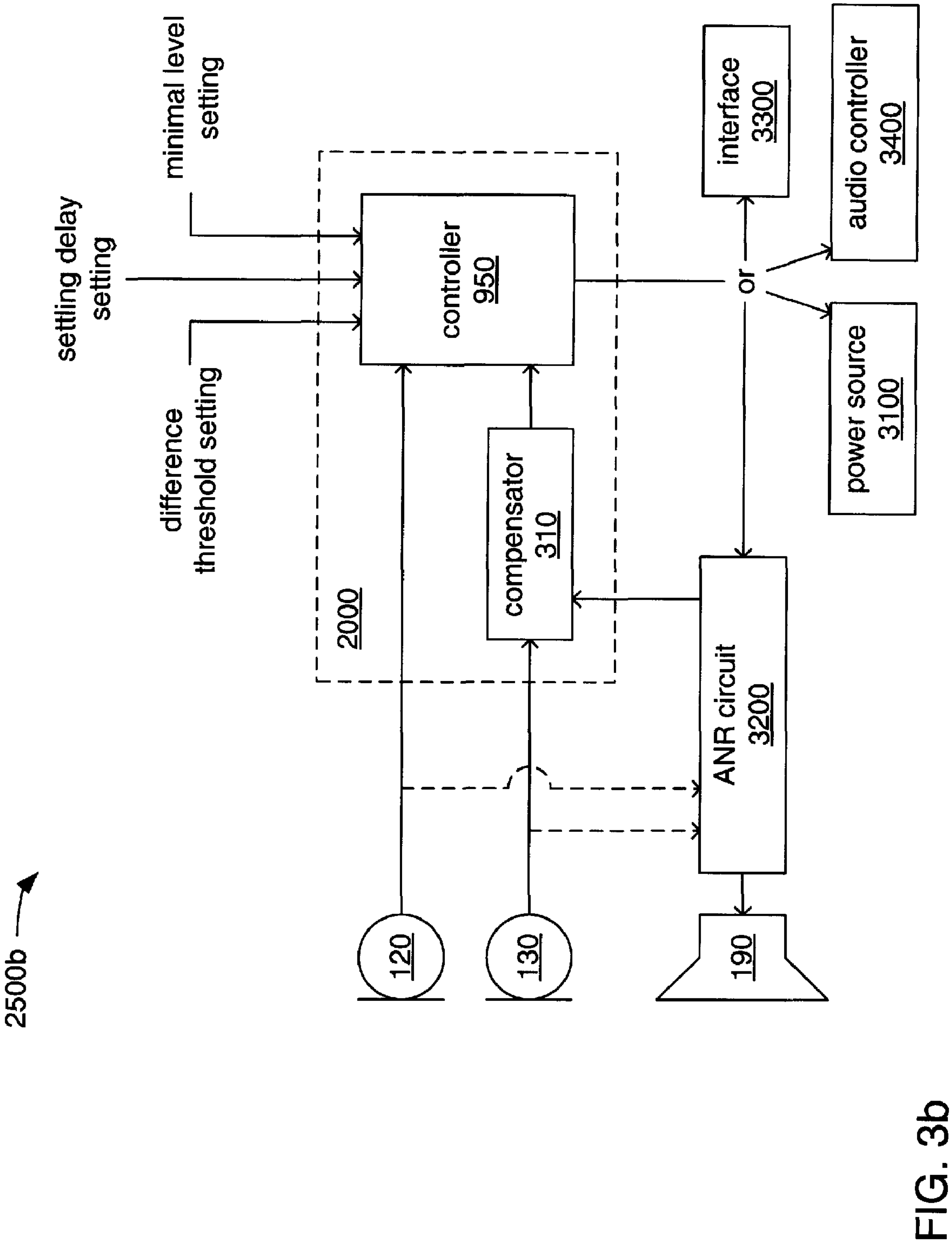

FIG. 3*b* depicts a possible electrical architecture 2500*b* of the control circuit 2000 usable in the personal acoustic device 1000*b* where at least ANR entailing the acoustic output of anti-noise sounds by the acoustic driver 190 is provided. The electrical architecture 2500*b* is substantially similar to the electrical architecture 2500*a*, but the electrical architecture 2500*b* additionally supports adjusting one or more characteristics of the transfer function imposed by the compensator 310 in response to input received from the ANR circuit 3200. Depending on the type of ANR provided, one or both of the inner microphone 120 and the outer microphone 130 may also output signals representing the sounds that they detect to the ANR circuit 3200.

In some implementations, the ANR circuit 3200 may provide an adaptive form of feedback-based and/or feedforward-based ANR in which filter coefficients, gain settings and/or other parameters may be dynamically adjusted as a result of whatever adaptive ANR algorithm is employed. As those skilled in the art will readily recognize, changes made to such ANR parameters will necessarily result in changes to the transfer function to which sounds reaching the inner microphone 120 are subjected. The ANR circuit 3200 provides indications of the changing parameters to the compensator 310 to enable the compensator 310 to adjust its transfer function to take into account the changing transfer function to which sounds reaching the inner microphone 120 are subjected.

In other implementations, the ANR circuit 3200 may be capable of being turned on or off, and the ANR circuit 3200 may provide indications of being on or off to the compensator 310 to enable the compensator to alter the transfer function it imposes in response. However, in such other implementations where the controller 950 signals the ANR circuit 3200 to turn on or off, it may be the controller 950, rather than the ANR circuit 3200, that provides an indication to the compensator 310 of the ANR circuit 3200 being turned on or off.

Alternatively, in implementations where an alternate compensator is interposed between the inner microphone 120 and the controller 950, the ANR circuit 3200 may provide inputs to the alternate compensator to enable it to adjust the transfer function it employs to reverse the attenuating effects of the transfer function to which sounds reaching the inner microphone 120 are subjected. Or, the alternate compensator may receive signals indicating that the ANR circuit 3200 has been turned on or off.

Figure 3C:
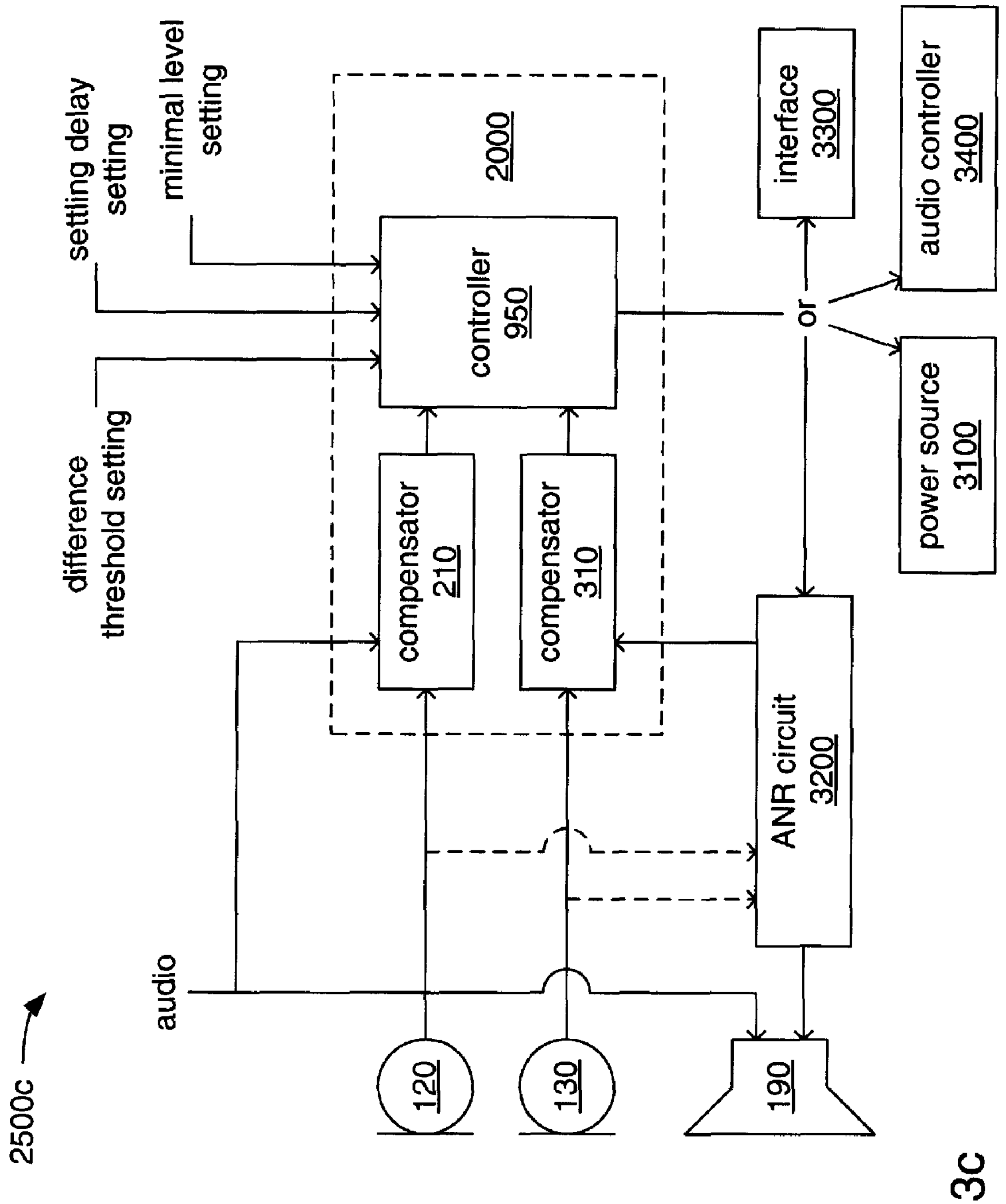
Figure 3D:
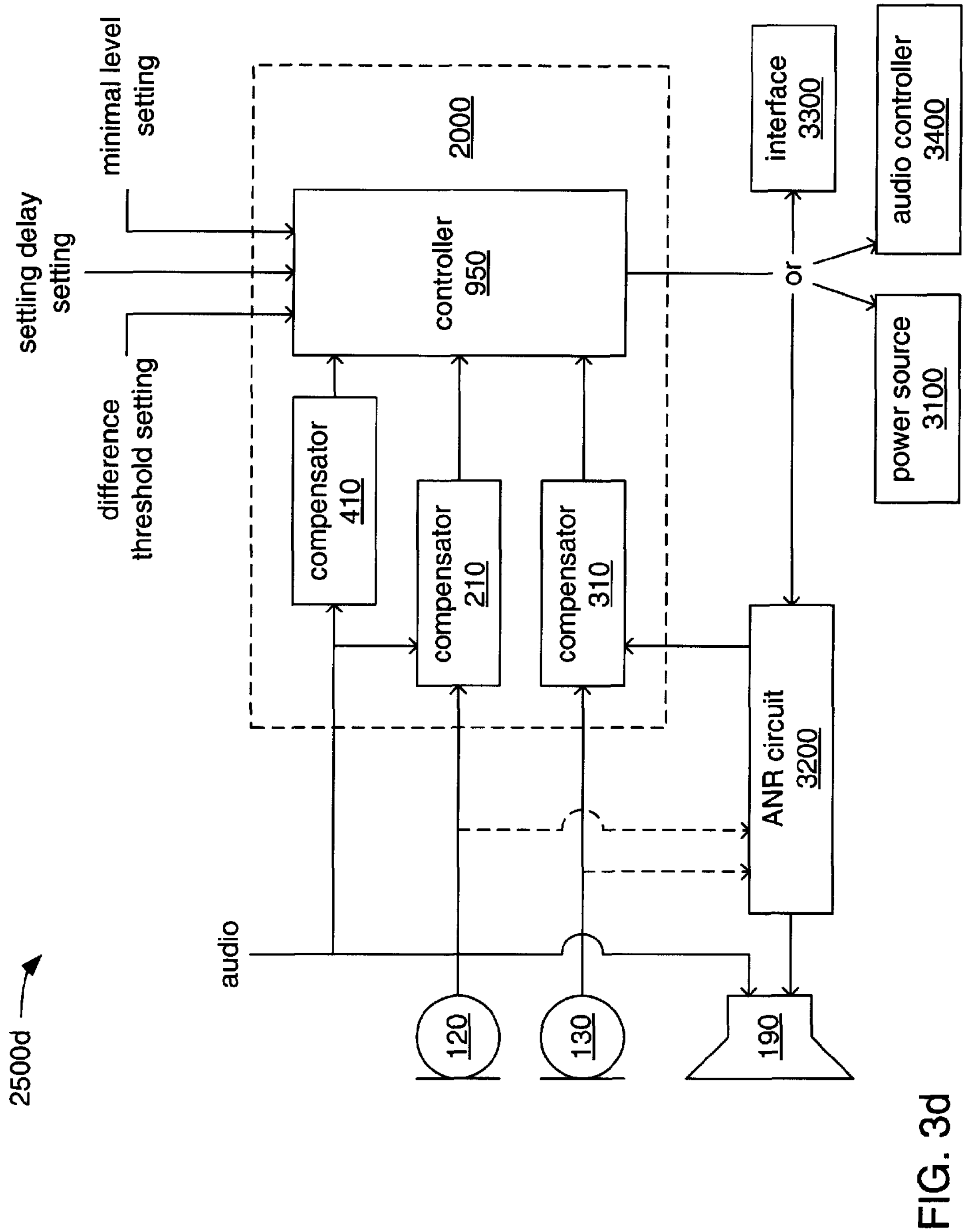
Figure 3E:
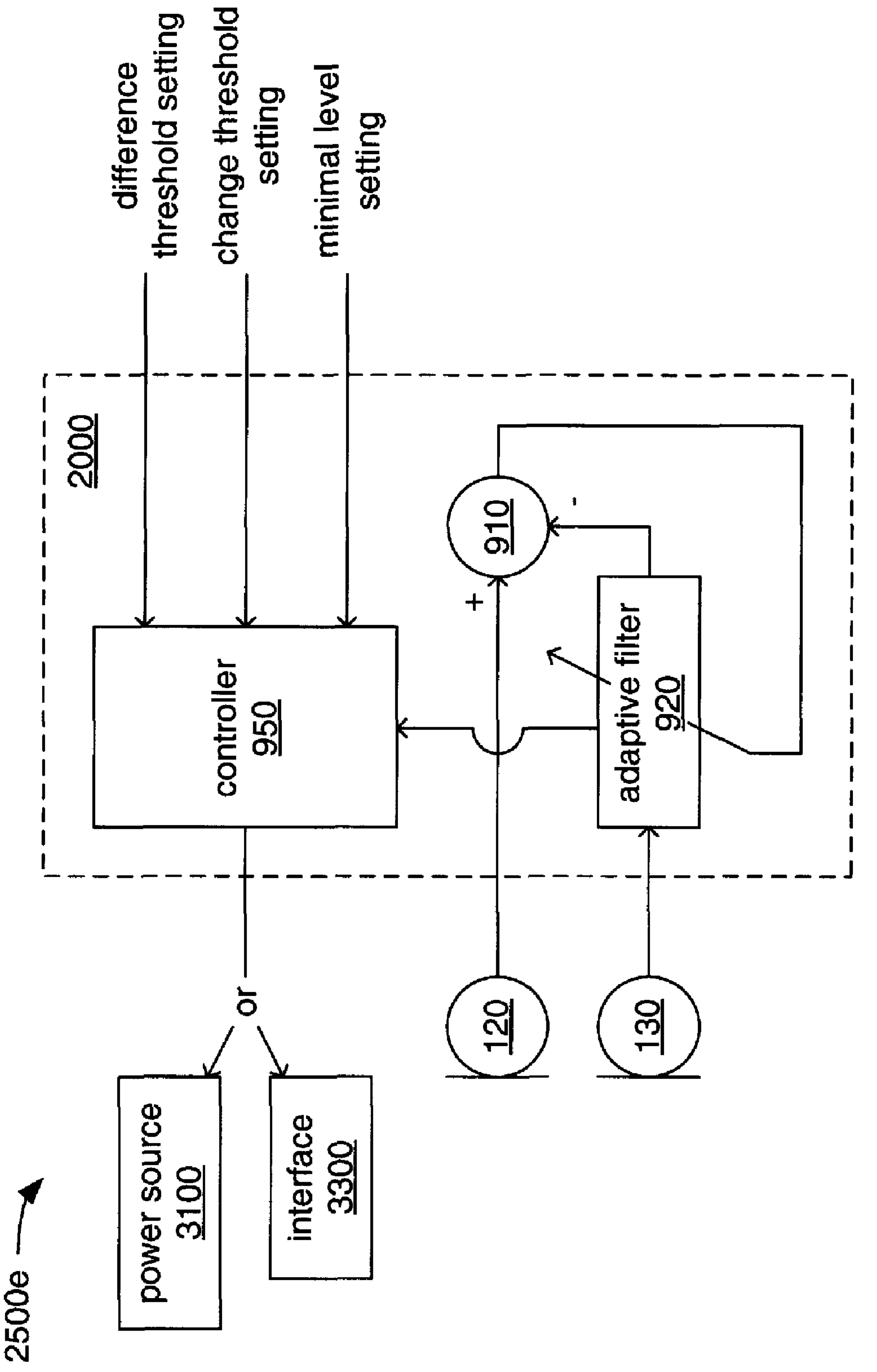

FIG. 3*c* depicts a possible electrical architecture 2500*c* of the control circuit 2000 usable in the personal acoustic device 1000*b* where at least acoustic output of electronically provided audio by the acoustic driver 190 is provided in addition to the provision of ANR. The electrical architecture 2500*c* is substantially similar to the electrical architecture 2500*b*, but the electrical architecture 2500*c* additionally supports the acoustic output of electronically provided audio (e.g., audio signal from an external or built-in CD player, radio or MP3 player) through the acoustic driver 190. Those skilled in the art will readily recognize that the combining of ANR anti-noise sounds and electronically provided audio to enable the acoustic driver 190 to acoustically output both may be accomplished in any of a variety of ways. In employing the electrical architecture 2500*c*, the control circuit 2000 additionally incorporates another compensator 210, along with the compensator 310 and the controller 950.

The inner microphone 120 detects the possibly more attenuated form of a sound emanating from the acoustic noise source 9900 located within the cavity 112 (along with other sounds that may be present within the cavity 112) and outputs a signal representative of this sound to the compensator 210.

The compensator 210 also receives a signal representing the electronically provided audio that is acoustically output by the acoustic driver 190, and at least partially subtracts the electronically provided audio from the sounds detected by the inner microphone 120. The compensator 210 may subject the signal representing the electronically provided audio to a transfer function selected to alter the electronically provided audio in a manner substantially similar to the transfer function that the acoustic output of the electronically provided audio is subjected to in propagating from the acoustic driver 190 to the inner microphone 120 as a result of the acoustics of the cavity 112 and/or the passage 117. The compensator 210 then provides the resulting altered signal to the controller 950, and the controller 950 analyzes signal level differences between the signals received from the compensators 210 and 310.

FIG. **3*d* depicts a possible electrical architecture 2500*d* of the control circuit 2000 that is also usable in the personal acoustic device 1000*b* where at least acoustic output of electronically provided audio by the acoustic driver 190 is provided in addition to the provision of ANR. The electrical architecture 2500*d* is substantially similar to the electrical architecture 2500*c*, but the electrical architecture 2500*d* additionally supports the use of a comparison of the signal level of the signal output by the inner microphone 120 to the signal level of a modified form of electronically provided audio, at least at times when there are insufficient environmental noise sounds available with sufficient strength to enable a reliable analysis of differences between the signals output by the inner microphone 120 and the outer microphone 130. In employing the electrical architecture 2500*d*, the control circuit 2000 additionally incorporates still another compensator 410, along with the compensators 210 and 310, and along with the controller 950**.

The controller 950 monitors the signal level of at least the output of the outer microphone 130, and if that signal levels drops below the minimal level setting, the controller 950 refrains from analyzing differences between the signals output by the inner microphone 120 and the outer microphone 130. On such occasions, if electronically provided audio is being acoustically output by the acoustic driver 190 into the cavity 112, then the controller 950 operates the compensator 210 to cause the compensator 210 to cease modifying the signal received from the inner microphone 120 in any way such that the signal output by the inner microphone 120 is provided by the compensator 210 to the controller 950 unmodified. The compensator 410 receives the signal representing the electronically provided audio that is acoustically output by the acoustic driver 190, and subjects the signal representing the electronically provided audio to a transfer function selected to alter the electronically provided audio in a manner substantially similar to the transfer function that the acoustic output of the electronically provided audio is subjected to in propagating from the acoustic driver 190 to the inner microphone 120 as a result of the acoustics of the cavity 112 and/or the passage 117. The compensator 210 then provides the resulting altered signal to the controller 950, and the controller 950 analyzes signal level differences between the signals received from the inner microphone 120 (unmodified by the compensator 210) and the compensator 410.

As those skilled in the art will readily recognize, the strength of any audio acoustically output by the acoustic driver 190 into the cavity 112 as detected by the inner microphone 120 differs between occasions when the cavity 112 and the passage 117 are acoustically coupled to the environment external to the casing 110 and occasions when they are acoustically coupled to an ear canal. In a manner not unlike the analysis of signal levels between the signals output by the inner microphone 120 and the outer microphone 130, an analysis of differences between signals levels of the signals output by the inner microphone 120 and the compensator 410 may be used to determine the current operating state of the earpiece and/or the entirety of the personal acoustic device **1000*b***.

FIG. **3*e* depicts a possible electrical architecture 2500*e* of the control circuit 2000 usable in either of the personal acoustic devices 1000*a* and 1000*b* where at least PNR is provided. In employing the electrical architecture 2500*e*, the control circuit 2000 incorporates a subtractive summing node 910, an adaptive filter 920 and a controller 950, which are interconnected to analyze signals received from the inner microphone 120 and the outer microphone 130** to derive a transfer function indicative of a difference between them.

The inner microphone 120 detects the possibly more attenuated form of a sound emanating from the acoustic noise source 9900 present in the cavity 112 and outputs a signal representative of this sound to the subtractive summing node 910. The outer microphone 130 detects the same sound emanating from the acoustic noise source 9900 at a location external to the cavity 112, and outputs a signal representative of this sound to the adaptive filter 920. The adaptive filter 920 outputs a filtered form of the signal output by the outer microphone 130 to the subtractive summing node 910, where it is subtracted from the signal output by the inner microphone 120. The signal that results from this subtraction is then provided back to the adaptive filter 920 as an error term input. This interconnection between the subtractive summing node 910 and the adaptive filter 920 enables the subtractive summing node 910 and the adaptive filter 920 to cooperate to iteratively derive a transfer function by which the signal output by the outer microphone 130 is altered before being subtracted from the signal output by the inner microphone 120 to iteratively reduce the result of the subtraction to as close to zero as possible. The adaptive filter 920 provides data characterizing the derived transfer function on a recurring basis to the controller 950. In analyzing the received signals, the controller 950 may be provided with one or more of a difference threshold setting, a change threshold setting and a minimum level setting.

As previously discussed, a sound emanating from the acoustic noise source 9900 is subjected to different transfer functions as it propagates to each of the inner microphone 120 and the outer microphone 130. The propagation of that sound from the acoustic noise source 9900 to the inner microphone 120 together with the effects of its conversion into an electrical signal by the inner microphone 120 can be represented as a first transfer function $H_1(s)$. Analogously, the propagation of the same sound from the acoustic noise source 9900 to the outer microphone 130 together with the effects of its conversion into an electrical signal by the outer microphone 130 can be represented as a second transfer function $H_2(s)$. The transfer function derived by the cooperation between the subtractive summing node 910 and the adaptive filter 920 can be represented by a third transfer function $H_3(s)$. As the error term approaches zero, the $H_3(s)$ approximates $H_1(s)/H_2(s)$. Therefore, as the error term approaches zero, the derived transfer function $H_3(s)$ is at least indicative of the difference in the transfer functions to which a sound propagating from the acoustic noise source 9900 to each of the inner microphone 120 and the outer microphone 130 is subjected.

In implementations where the inner microphone 120 and the outer microphone 130 have substantially similar characteristics in converting the sounds they detect into electrical signals, the difference in the portions of each of the transfer functions $H_1(s)$ and $H_2(s)$ that are attributable to conversions of detected sounds to electrical signals are comparatively negligible, and effectively cancel each other in the derivation of the transfer function $H_3(s)$. Therefore, where the conversion characteristics of the inner microphone 120 and the outer microphone 130 are substantially similar, the derived transfer function $H_3(s)$ becomes equal to the difference in the transfer functions to which the sound propagating from the acoustic noise source 9900 to each of the inner microphone 120 and the outer microphone 130 is subjected as the error term approaches zero.

As also previously discussed, the transfer function to which a sound propagating from the acoustic noise source 9900 to the inner microphone 120 is subjected changes as the earpiece 100 changes operating states between being positioned in the vicinity of an ear and not being so positioned. Therefore, as the error term approaches zero, changes in the derived transfer function $H_3(s)$ become at least indicative of the changes in the transfer function to which the sound propagating from the acoustic noise source 9900 to the inner microphone 120 is subjected. And further, where the conversion characteristics of the inner microphone 120 and the outer microphone 130 are substantially similar, changes in the derived transfer function $H_3(s)$ become equal to the changes in the transfer function to which the sound propagating from the acoustic noise source 9900 to the inner microphone 120 is subjected.

In some implementations, the controller 950 compares the data received from the adaptive filter 920 characterizing the derived transfer function to stored data characterizing a transfer function consistent with the earpiece 100 being in either one or the other of the operating state of being positioned in the vicinity of an ear and the operating state of not being so positioned. In such implementations, the controller 950 is supplied with a difference threshold setting specifying the minimum degree to which the data received from the adaptive filter 920 must be similar to the stored data for the controller 950 to detect that the earpiece 100 is in that operating state. In other implementations, the controller 950 compares the data characterizing the derived transfer function both to stored data characterizing a transfer function consistent with the earpiece 100 being positioned in the vicinity of an ear and to other stored data characterizing a transfer function consistent with the earpiece 100 not being so positioned. In such other implementations, the controller 950 may determine the degree of similarity that the data characterizing the derived transfer function has to stored data characterizing each of the transfer functions consistent with each of the possible operating states of the earpiece.

In determining the degree of similarity between pieces of data characterizing transfer functions, the controller 950 may employ any of a variety of comparison algorithms, the choice of which may be determined by the nature of the data received from the adaptive filter 920 and/or characteristics of the type of filter employed as the adaptive filter 920. By way of example, in implementations in which the adaptive filter 920 is a finite impulse response (FIR) filter, the data received from the adaptive filter 920 may characterize the derived transfer function in terms of filter coefficients specifying the impulse response of the derived transfer function in the time domain. In such implementations, a discrete Fourier transform (DFT) may be employed to convert these coefficients into the frequency domain to enable a comparison of sets of mean squared error (MSE) values. Further, in implementations in which the adaptive filter 920 is a FIR filter, a FIR filter with a relatively small quantity of taps may be used and a relatively small number of coefficients may make up the data characterizing its derived transfer function. This may be deemed desirable to conserve power and/or to allow possibly limited computational resources of the controller 2000 to be devoted to other functions.

Due to the adaptive filter 920 employing an iterative process to derive a transfer function, whenever a change in operating state of the earpiece 100 or another event altering the transfer function to which a sound propagating from the acoustic noise source 9900 to the inner microphone 120 occurs, the adaptive filter 920 requires time to again derive a new transfer function. To put this another way, time is required to allow the adaptive filter 920 to converge to a new solution. As this convergence takes place, the data received from the adaptive filter 920 may include data values that change relatively rapidly and with high magnitudes, especially after a change in operating state of the earpiece 100. Therefore, the controller 950 may be supplied with a change threshold setting selected to cause the controller 950 to refrain from using data received from the adaptive filter 920 to detect whether or not the earpiece 100 is in the vicinity of an ear until the rate of change of the data received from the adaptive filter 920 drops below a degree specified by the change threshold setting such that the data characterizing the derived transfer function is again deemed to be reliable. This provision of a change threshold setting counters instances of false detections of a change in operating state of an earpiece 100 arising from spurious movements or other acts of a user that generate spurious sounds and/or momentarily move an earpiece 100 relative to an ear to an extent detected by one or both of the inner microphone 120 and the outer microphone 130. This aids in preventing false determinations that a change in operating state of the entirety of the personal acoustic device 1000*a* or 1000*b* has occurred, and/or the controller 950 taking unnecessary actions.

In some implementations, the controller 950 may also be supplied a minimum level setting specifying a selected minimum signal level that must be met by one or both of the signals received from the inner microphone 120 and the outer microphone 130 for those signals to be deemed reliable for use in determining whether an earpiece 100 is positioned in the vicinity of an ear, or not. In response to occasions when there are insufficient environmental noise sounds available for detection and/or for the generation of signals by the inner microphone 120 and/or the outer microphone 130, the controller 950 may simply refrain from attempting to determine whether changes in operating state of an earpiece 100 and/or of the personal acoustic device 1000*a* or 1000*b* have occurred, and/or refrain from taking any actions at least until usable environmental noise sounds are once again available.

It should be noted that alternate implementations of the electrical architecture 2500*e* are possible in which the outer microphone 130 provides its output signal to the subtractive summing node 910 and the inner microphone 120 provides output signal to the adaptive filter 920. In such implementations, the derived transfer function would be the inverse of the transfer function that has been described as being derived by cooperation of the subtractive summing node 910 and the adaptive filter 920. However, the manner in which the data provided by the adaptive filter 920 is employed by the controller 950 is substantially the same.

It should also be noted that although no acoustic driver 190 acoustically outputting anti-noise sounds or electronically provided music into the cavity 112 is depicted or discussed in relation to the electrical architecture 2500*e*, this should not be taken to suggest that the acoustic output of such sounds into the cavity 112 would necessarily impede the operation of the electrical architecture 2500*e*. More specifically, a transfer function indicative of the difference in the transfer functions to which a sound propagating from the acoustic noise source 9900 to each of the inner microphone 120 and the outer microphone 130 is subjected would still be derived, and the current operating state of the earpiece 100 and/or of the entirety of the personal acoustic device 1000*a* or 1000*b* would still be determinable.

Figure 3F:
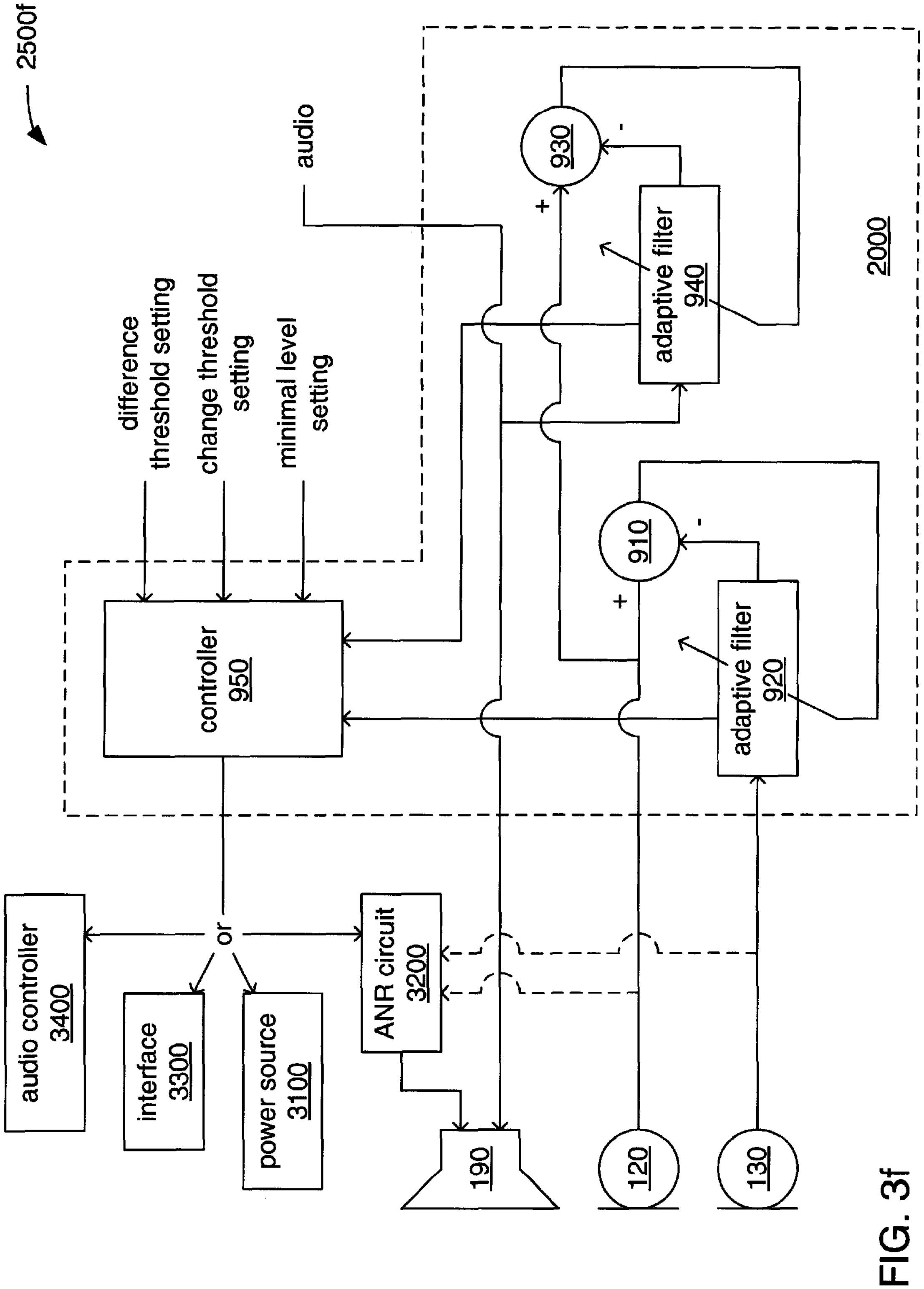

FIG. 3*f* depicts a possible electrical architecture 2500*f* of the control circuit 2000 usable in the personal acoustic device 1000*b* where at least acoustic output of electronically provided audio by the acoustic driver 190 is provided in addition to the provision of ANR. The electrical architecture 2500*f* is substantially similar to the electrical architecture 2500*e*, but the electrical architecture 2500*f* additionally supports the acoustic output of electronically provided audio. In employing the electrical architecture 2500*f*, the control circuit 2000 additionally incorporates an additional subtractive summing node 930 and an additional adaptive filter 940, which are interconnected to analyze signals received from the inner microphone 120 and an audio source.

The signal output by the inner microphone 120 is provided to the subtractive node 930 in addition to being provided to the subtractive node 910. The electronically provided audio signal is provided as an input to the adaptive filter 940, as well as being provided for audio output by the acoustic driver 190. The adaptive filter 940 outputs an altered form of the electronically provided audio signal to the subtractive summing node 930, where it is subtracted from the signal output by the inner microphone 120. The signal that results from this subtraction is then provided back to the adaptive filter 940 as an error term input. In a manner substantially similar to that between the subtractive summing node 910 and the adaptive filter 920, the subtractive summing node 930 and the adaptive filter 940 cooperate to iteratively derive a transfer function by which the electronically provided audio signal is altered before being subtracted from the signal output by the inner microphone 120 to iteratively reduce the result of this subtraction to as close to zero as possible. The adaptive filter 940 provides data characterizing the derived transfer function on a recurring basis to the controller 950. The same difference threshold setting, change threshold delay setting and/or minimum level setting provided to the controller 950 for use in analyzing the data provided by the adaptive filter 920 may also be used by the controller 950 in analyzing the data provided by the adaptive filter 940. Alternatively, as those skilled in the art will readily recognize, it may be deemed desirable to provide the adaptive filter 940 with different ones of these settings.

While the derivation of a transfer function characterized by the data received from the adaptive filter 920 and its analysis by the controller 950 relies on the presence of environmental noise sounds (such as those provided by the acoustic noise source 9900), the derivation of a transfer function characterized by the data received from the adaptive filter 940 and its analysis by the controller 950 relies on the acoustic output of electronically provided sounds by the acoustic driver 190. As will be clear to those skilled in the art, the acoustic characteristics of the cavity 112 and the passage 117 change as they are alternately acoustically coupled to an ear canal and to the environment external to the casing 110 as a result of the earpiece 100 changing operating states between being positioned in the vicinity of an ear and not being so positioned. To put this another way, the transfer function to which sound propagating from the acoustic driver 190 to the inner microphone 120 is subjected changes as the earpiece 100 changes operating state, and in turn, so does the transfer function derived by the cooperation of the subtractive summing node 930 and the adaptive filter 940.

In some implementations, the controller 950 compares the data received from the adaptive filter 940 characterizing the derived transfer function to stored data characterizing a transfer function consistent with the earpiece 100 being in either one or the other of the operating state of being positioned in the vicinity of an ear and the operating state of not being so positioned. In such implementations, the controller 950 is supplied with a difference threshold setting specifying the minimum degree to which the data received from the adaptive filter 940 must be similar to the stored data for the controller 950 to determine that the earpiece 100 is in that operating state. In other implementations, the controller 950 compares the data characterizing this derived transfer function both to stored data characterizing a transfer function consistent with the earpiece 100 being positioned in the vicinity of an ear and to other stored data characterizing a transfer function consistent with the earpiece 100 not being so positioned. In such other implementations, the controller 950 may determine the degree of similarity that the data characterizing the derived transfer function has to stored data characterizing each of the transfer functions consistent with each of the possible operating states of the earpiece 100.

The controller 950 is able to employ the data provided by either or both of the adaptive filters 920 and 940, and one or both may be dynamically selected for use depending on various conditions to increase the accuracy of determinations of occurrences of changes in operating state of the earpiece 100 and/or of the entirety of the personal acoustic device 1000*a* or 1000*b*. In some implementations, the controller 950 switches between employing the data provided by one or the other of the adaptive filters 920 and 940 depending (at least in part) on the whether the electronically provided audio is being acoustically output through the acoustic driver 190, or not. In other implementations, the controller 950 does such switching based (at least in part) on monitoring the signal levels of the signals output by one or both of the internal microphone 120 and the external microphone 130 for occurrences of one or both of these signals falling below the minimum level setting.

Each of the electrical architectures discussed in relation to FIGS. 3*a-f* may employ either analog or digital circuitry, or a combination of both. Where digital circuitry is at least partly employed, that digital circuitry may include a processing device (e.g., a digital signal processor) accessing and executing a machine-readable sequence of instructions that causes the processing device to receive, analyze, compare, alter and/or output one or more signals, as will be described. As will also be described, such a sequence of instructions may cause the processing device to make determinations of whether or not an earpiece 100 and/or the entirety of one of the personal acoustic devices 1000*a* and 1000*b* is correctly positioned in response to the results of analyzing signals.

The inner microphone 120 and the outer microphone 130 may each be any of a wide variety of types of microphone, including and not limited to, an electret microphone. Although not specifically shown or discussed, one or more amplifying components, possibly built into the inner microphone 120 and/or the outer microphone 130, may be employed to amplify or otherwise adjust the signals output by the inner microphone 120 and/or the outer microphone 130. It is preferred that the sound detection and signal output characteristics of the inner microphone 120 and the outer microphone 130 are substantially similar to avoid any need to compensate for substantial sound detection or signal output differences.

Where characteristics of signals provided by a microphone are analyzed in a manner entailing a comparison to stored data, the stored data may be derived through modeling of acoustic characteristics and/or through the taking of various measurements during various tests. Such tests may entail efforts to derive data corresponding to averaging measurements of the use of a personal acoustic device with a representative sampling of the shapes and sizes of people's ears and heads.

As was previously discussed, one or more bandpass filters may be employed to limit the frequencies of the sounds analyzed in comparing sounds detected by the inner microphone 120 and the outer microphone 130. And this may be done in any of the electrical architectures 2500*a-f*, as well as in many of the possible variants thereof. As was also previously discussed, even though the frequencies chosen for such analysis may be one range or multiple ranges of frequencies encompassing any conceivable frequencies of sound, what range or ranges of frequencies are ultimately chosen would likely depend on the frequencies at which environmental noise sounds are deemed likely to occur. However, what range or ranges of frequencies are ultimately chosen may also be based on what frequencies require less power to analyze and/or what frequencies may be simpler to analyze.

As those familiar with ANR will readily recognize, implementations of both feedforward-based and feedback-based ANR tend to be limited in the range of frequencies of noise sounds that can be reduced in amplitude through the acoustic output of anti-noise sounds. Indeed, it is not uncommon for implementations of ANR to be limited to reducing the amplitude of noise sounds occurring at lower frequencies, often at about 1.5 KHz and below, leaving implementations of PNR to attempt to reduce the amplitude of noise sounds occurring at higher frequencies. If the frequencies employed in making the comparisons between sounds detected by the inner microphone 120 and the outer microphone 130, or in making the comparisons between sounds detected by the inner microphone 120 and the sound making up the electronically provided audio were to exclude the lower frequencies in which ANR is employed in reducing environmental noise sound amplitudes, then the design of whatever compensators are used can be made simpler as a result of there being no need to alter their operation in response to input received from the ANR circuit 3200 concerning its current state. This would reduce both power consumption and complexity. Indeed, if the frequencies employed in making comparisons were midrange audible frequencies above those attenuated by ANR (e.g., 2 KHz to 4 KHz), it may be possible to avoid including of one or more compensators in one or more of the electrical architectures 2500*a-d* (or variants thereof) if the comparison made by the controller 950 incorporated a fixed expected level of difference in amplitudes between noise sounds detected by each of the inner microphone 120 and the outer microphone 130 at such frequencies. By way of example, where the PNR provides a reduction of 20 dB in a noise sound detected by the inner microphone 120 in comparison to what the outer microphone 130 detects of that same noise sound when an earpiece 100 is in position adjacent an ear, then the controller 950 could determine that the earpiece 100 is not in place upon detecting a difference in amplitude of a noise sound as detected by these two microphones that is substantially less than 20 dB. This would further reduce both power consumption and complexity.

As was also previously discussed, situations may arise where there are insufficient environmental noise sounds (at least at some frequencies) to enable a reliable analysis of differences in sounds detected by the inner microphone 120 and the outer microphone 130. And attempts may be made to overcome such situations by either changing one or more ranges of frequencies of environmental noise sounds employed in analyzing differences between what is detected by the inner microphone 120 and the outer microphone 130 (perhaps by broadening the range of frequencies used), or employing a comparison of sounds detected by the inner microphone 120 and sounds acoustically output into the cavity 112 and the passage 117 by the acoustic driver 190.

Another variation of using differences between what the inner microphone 120 detects and what is acoustically output by the acoustic driver 190 entails employing the acoustic driver 190 to acoustically output a sound at a frequency or of a narrow range of frequencies chosen based on characteristics of the acoustic driver 190 and on the acoustics of the cavity 112 and the passage 117 to bring about a reliably detectable difference in amplitude levels of that frequency as detected by the inner microphone 120 between an earpiece 100 being in position adjacent an ear and not being so positioned, while also being outside the range of frequencies of normal human hearing. By way of example, infrasonic sounds (i.e., sounds having frequencies below the normal range of human hearing, such as sounds generally below 20 Hz) may be employed, although the reliable detection of such sounds may require the use of synchronous sound detection techniques that will be familiar to those skilled in the art to reliably distinguish the infrasonic sound acoustically output by the acoustic driver 190 for this purpose from other infrasonic sounds that may be present.

Figure 4:
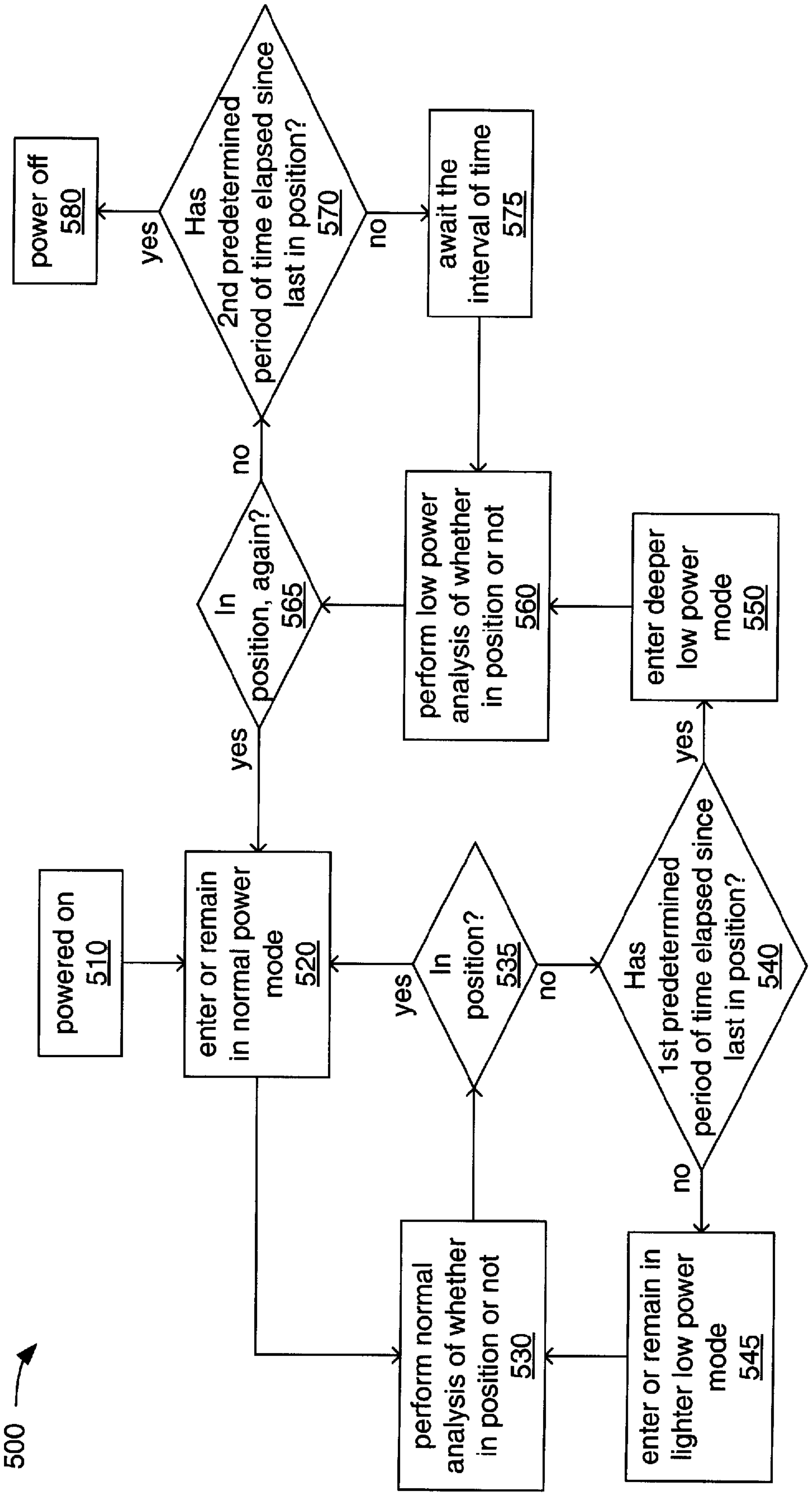
FIG. 4 is a flow chart of a state machine of possible implementations of a personal acoustic device.

FIG. 4 is a flow chart of a possible state machine 500 that may be employed by the control circuit 2000 in implementations of either of the personal acoustic devices 1000*a* and 1000*b*. As has already been discussed at length, possible implementations of the personal acoustic devices 1000*a* and 1000*b* may have either a single earpiece 100 or a pair of the earpieces 100. Thus, the state machine 500, and the possible variants of it that will also be discussed, may be applied by the control circuit 2000 to either a single earpiece 100 or a pair of the earpieces 100.

Starting at 510, the entirety of some form of either of the personal acoustic devices 1000*a* or 1000*b* has been powered on, perhaps manually by a user or perhaps remotely by another device with which this one of the personal acoustic devices 1000*a* or 1000*b* is in some way in communication. Following being powered on, at 520, the control circuit 2000 enables this particular personal acoustic device to operate in a normal power mode in which one or more functions are fully enabled with the provision of electrical power, such as two-way voice communications, feedforward-based and/or feedback-based ANR, acoustic output of audio, operation of noisy machinery, etc. At 530, the control circuit 2000 also repeatedly checks that this particular personal acoustic device (or at least an earpiece 100 of it) is in position, and if this particular personal acoustic device (or at least an earpiece 100 of it) is in position at 535, then the normal power mode with the normal provision of one or more functions continues at 520. In other words, so long as this particular personal acoustic device (or at least an earpiece 100 of it) is in position, the control circuit 2000 repeatedly loops through 520, 530 and 535 in FIG. 4. The manner in which this check is made at 530 may entail employing one or more of the various approaches discussed at length earlier (e.g., the various approaches depicted in FIGS. 3*a-f*) for testing whether or not an earpiece 100 and/or the entirety of a personal acoustic device is in position.

Regarding the determination made at 535, as has been previously discussed at length, variations are possible in the manner in which the determination is made about whether or not a personal acoustic device is in position, especially where there are a pair of the earpieces 100. Again, by way of example, if this particular personal acoustic device has only a single one of the earpieces 100, then the determination made by the control circuit 2000 as to whether or not the entirety of this particular personal acoustic device is in position may be based solely on whether or not the single earpiece 100 is in position. Again, by way of another example, if this particular personal acoustic device has a pair of the earpieces 100, then the determination made by the control circuit 2000 as to whether or not the entirety of this particular personal acoustic device is in position may be based on whether or not either one of the earpieces 100 are in position, or may be based on whether or not both of the earpieces 100 are in position. As has also been previously discussed at length, separate determinations of whether or not each one of the earpieces 100 are in position (in a variant of this particular personal acoustic device that has a pair of the earpieces 100) may be employed in modifying the manner in which one or more functions are performed, such as causing the rerouting of acoustically output audio from one of the earpieces 100 to the other, discontinuing the provision of ANR to one of the earpieces 100 (while continuing to provide ANR to the other), etc. Thus, the exact nature of the determination made at 535 is at least partially dependent upon one or more of these characteristics. As has further been discussed at length, it is desirable for a delay (such as is specified in the settling delay setting of the electrical architectures 2500*a-d*) to be employed in the making of a determination (e.g., at 535) that a personal acoustic device (or at least an earpiece 100 of it) is no longer in position. Again, this may be deemed desirable to appropriately handle instances where a user may only briefly pull an earpiece 100 away from their head to reposition it slightly for comfort or to accommodate other brief events that might be incorrectly interpreted as at least an earpiece 100 no longer being in position without such a delay.

If at 535, the determination is made that at least an earpiece 100 of this particular personal acoustic device (if not the entirety of this particular acoustic device) is not in position, then a check is made at 540 as to whether or not this has been the case for more than a first predetermined period of time. If that first predetermined period of time has not yet been exceeded, then the control circuit 2000 causes at least a portion of this particular personal acoustic device to enter a lighter low power mode at 545. Where this particular personal acoustic device has only a single earpiece 100 that has been determined to not be in position at 535, entering the lighter low power mode at 545 may entail simply ceasing to provide one or more functions, such as ceasing to acoustically output audio, ceasing to provide ANR, ceasing to provide two-way voice communications, ceasing to signal a piece of noisy machinery that this particular personal acoustic device is in position, etc. By way of example, where a personal acoustic device cooperates with a cellular telephone (perhaps through a wireless coupling between them) to provide two-way voice communications, entering the lighter low power mode may entail ceasing to provide audio from a communications microphone of the personal acoustic device to the cellular telephone, as well as ceasing to acoustically output communications audio provided by the cellular telephone and/or ANR anti-noise sounds. Where this particular personal acoustic device has a pair of the earpieces 100 and the determination at 535 is that one of those earpieces 100 is in position while the other is not, entering the lighter low power mode at 545 may entail simply ceasing to provide one or more functions at the one of the earpieces 100 that is not in position, while continuing to provide that same one or more functions at the other, or may entail moving one or more functions from the one of the earpieces 100 that is not in position to the other (e.g., moving the acoustic output of an audio channel, as has been previously discussed). Alternatively and/or additionally, where this particular personal acoustic device has a pair of the earpieces 100, of which one is in position and the other is not, entering the lighter low power mode at 545 may entail ceasing to provide one or more functions, entirely, just as would occur if the determination at 535 is that both of the earpieces 100 are not in position.

Through such cessation of one or more functions at either a single earpiece 100 or at both of a pair of the earpieces 100, less power is consumed. However, power sufficient to enable the performance of one of the tests described at length above for determining whether or not at least a single earpiece 100 is in position (such as one of the approaches detailed with regard to what is depicted in at least one of FIGS. 3*a-f*) is still consumed. The control circuit 2000 continues to maintain this particular personal acoustic device in this lighter low power mode, while looping through 530, 535, 540 and 545 as long as the first predetermined period of time is not determined at 540 to have been exceeded, and as long as the one of the earpieces 100 that was previously not in position and/or the entirety of this personal acoustic device is not determined at 535 to have been put back in position. If the one of the earpieces 100 that was previously not in position and/or the entirety of this personal acoustic device is determined at 535 to have been put back in position, then the control circuit 2000 causes this particular personal acoustic device to re-enter the normal power mode at 520 in which the one or more of the normal functions that were caused to cease to be provided as part of being in the lighter low power mode are at least enabled, once again. Returning to the above example of a personal acoustic device cooperating with a cellular telephone to provide two-way communications, leaving the lighter low power mode to reenter the normal power mode may occur as a result of a user putting the personal acoustic device back in position adjacent at least one ear in an effort to answer a phone call received on the cellular telephone. In reentering the normal power mode, the personal acoustic device may cooperate with the cellular telephone to automatically “answer” the telephone call and immediately enable two-way communications between the user of the personal acoustic device and the caller without requiring the user to operate any manually-operable controls on either the personal acoustic device or the cellular telephone. In essence, the user’s act of putting the personal acoustic device back into position would be treated as the user choosing to answer the phone call.

However, if the first predetermined period of time is determined to have been exceeded at 540, then the control circuit 2000 causes this particular personal acoustic device to enter a deeper low power mode at 550. This deeper low power mode may differ from the lighter low power mode in that more of the functions normally performed by this particular personal acoustic device are disabled or modified in some way so as to consume less power. Alternatively and/or additionally, this deeper low power mode may differ from the lighter low power mode in that whichever variant of the test for determining whether at least a single earpiece 100 is in position or not is performed only at relatively lengthy intervals to conserve power, whereas such testing might otherwise have been done continuously (or at least at relatively short intervals) while this particular personal acoustic device is in either the normal power mode or the lighter low power mode. Alternatively and/or additionally, this deeper low power mode may differ from the lighter low power mode in that whichever variant of the test for determining whether at least a single earpiece 100 is in position or not is altered to reduce power consumption (perhaps through a change in the range of frequencies used) or is replaced with a different variant of the test that is chosen to consume less power.

Where normally, the test for determining whether or not an earpiece 100 and/or the entirety of the particular personal acoustic device is in position entails analyzing the difference between what is detected by the inner microphone 120 and the outer microphone 130 within a given range of frequencies on a continuous basis, a lower power variant of such a test may entail narrowing the range of frequencies to simplify the analysis, or changing the range of frequencies to a range chosen to take into account the cessation of ANR and/or the cessation of acoustic output of electronically provided audio. A lower power variant of such a test may entail changing from performing the analysis continuously with sounds detected by the inner microphone 120 and the outer microphone 130 that are sampled on a frequent basis to performing the analysis only at a chosen recurring interval of time and/or with sounds that are sampled only at a chosen recurring interval of time. Where an adaptive filter is used to derive a transfer function as part of a test for determining whether an earpiece 100 and/or the entirety of the particular personal acoustic device is in position or not, the sampling rate and/or the quantity of taps employed by the adaptive filter may be decreased as a lower power variant of such a test. A lower power variant of such a test may entail operating the acoustic driver 190 to output a sound at a frequency or frequencies chosen to require minimal energy to produce at a given amplitude in comparison to other sounds, doing so at a chosen recurring interval, and performing a comparison between what is detected by the inner microphone 120 and the sound as it is acoustically output by the acoustic driver 190.

Alternatively, entry into the deeper low power mode at 550, the lower power variant of the test performed at 560 to determine whether or not at least a single earpiece 100 is in position may actually be an entirely different test than the variant performed at 530, perhaps based on a mechanism having nothing to do with the detection of sound. By way of example, a movement sensor (not shown) may be coupled to the control circuit 2000 and monitored for a sign of movement, which may be taken as an indication of at least a single earpiece 100 being in position, versus being left sitting at some location by a user. Among the possible choices of movement sensors are any of a variety of MEMS (micro-electromechanical systems) devices, such as an accelerometer to sense linear accelerations that may indicate movement (as opposed to simply indicating the Earth's gravity) or a gyroscope to sense rotational movement.

Having entered the deeper low power mode at 550, whatever lower power variant of the test for determining whether at least a single earpiece 100 is in position or not is performed at 560. If, at 565, it is determined that the one of the earpieces 100 that was previously not in position and/or the entirety of this personal acoustic device is determined to have been put back in position, then the control circuit 2000 causes this particular personal acoustic device to re-enter the normal power mode at 520 in which the one or more of the normal functions that were caused to cease to be provided are at least enabled, once again. However, if the determination is made at 565 that at least an earpiece 100 of this particular personal acoustic device (if not the entirety of this particular acoustic device) is still not in position, then a check is made at 570 as to whether or not this has been the case for more than a second predetermined period of time. If that second predetermined period of time has not yet been exceeded, then the control circuit 2000 waits the relatively lengthy interval of time at 575 before again performing the low power variant of the test at 560. If that second predetermined period of time has been exceeded, then the control circuit 2000 powers off this particular personal acoustic device at 580. Thus, the control circuit 2000 continues to maintain this particular personal acoustic device in this deeper low power mode, while looping through 560, 565, 570 and 575 as long as the second predetermined period of time is not determined at 570 to have been exceeded, and as long as the one of the earpieces 100 that was previously not in position and/or the entirety of this personal acoustic device is not determined at 565 to have been put back in position.

Preferably, the first period of time is chosen to accommodate instances where a user might either momentarily move an earpiece 100 away from an ear for a short moment to talk to someone or momentarily remove the entirety of this particular personal acoustic device from their head to move about to another location for a break or short errand before coming back to put this particular personal acoustic device back in position on their head. The lighter low power mode into which this particular personal acoustic device enters during the first predetermined period of time maintains the normal variant of the test that occurs either continuously (or at least at relatively short intervals) to enable the control circuit 2000 to quickly determine when the user has returned the removed earpiece 100 to being in position in the vicinity of an ear and/or when the user has put the entirety of this particular personal acoustic device back in position on their head. It is deemed desirable to enable such a quick determination so that the normal power mode can be quickly re-entered and so that whatever normal function(s) were ceased by the entry into the lighter low power mode can be quickly resumed, all to ensure that the user perceives only a minimal (if any) interruption in the provision of those normal function(s). However, the first period of time is also preferably chosen to cause a greater conservation of power to occur through entry into the deeper low power mode at a point where enough time has passed since entry into the lighter low power mode that it is unlikely that the user is imminently returning.

Where the control circuit 2000 does implement a variant of the state machine 500 that includes the check at 570 as to whether the second predetermined period of time has been exceeded, the second period of time is preferably chosen to accommodate instances where a user might have stopped using this particular personal acoustic device long enough to do such things as attend a meeting, eat a meal, carry out a lengthier errand, etc. It is intended that the second predetermined period of time will be long enough that a user may return from doing such things and simply put this particular personal acoustic device back in position on their head with the expectation that whatever normal function(s) ceased to be provided as a result of entering the lighter and deeper low power modes will resume. However, it is also preferable that the interval of time awaited at 575 between instances at 560 where the lower power variant of the test is performed be chosen to be long enough to provide significant power conservation, but short enough that the user is not caused to wait for what may be perceived to be an excessive period of time before those function(s) resume. It is deemed likely that a customer will intuitively understand or accept that this particular personal acoustic device may be somewhat slower in resuming those function(s) when the user has been away longer, but that those function(s) will be caused to resume without the customer having to manually operate any manual controls of this particular personal acoustic device to cause those function(s) to resume. It is also deemed likely that a customer will intuitively understand or accept that being away still longer will result in this particular personal acoustic device having powered itself off such that the customer must manually operate such manually operable controls to power on this particular personal acoustic device, again, and to perhaps also cause those function(s) to resume.

The lengths of each of the first and second predetermined periods of time are at least partially dictated by the functions performed by a given personal acoustic device, as well as being at least partially determined by the expected availability of electric power. It is deemed generally preferable that the first predetermined period of time last a matter of minutes to perhaps as much as an hour in an effort to strike a balance between conservation of power and immediacy of reentering the normal power mode from the lighter low power mode upon the user putting a personal acoustic device back into position after having it not in position for what users are generally likely to perceive as being a “short” period of time. It is also deemed generally preferable that the second predetermined period of time last at least 2 or 3 hours in an effort to strike a balance between conservation of power and not requiring a user to operate a manually-operable control to cause reentry into the normal power mode after the user has not had the personal acoustic device in position for what users are generally likely to perceive as being a reasonable “longer” period of time. It is further deemed preferable that the second predetermined period of time be shorter than 8 hours so that the resulting balance that is struck does not result in the second predetermined period of time being so long that a personal acoustic device does not power off after sitting on a desk or in a drawer overnight. In some embodiments, a manually-operable control or other mechanism may be provided to enable a user to choose the length of one or both of the first and second predetermined periods of time. Alternatively, the control circuit 2000 may observe a user’s behavior over time, and may autonomously derive the lengths of one or both of the first and second predetermined periods of time. Alternatively and/or additionally, despite the desire to avoid having a user needing to operate a manually-operable control unless the second predetermined period of time has elapsed, a manually-operable control may be provided to enable a user to cause a personal acoustic device to more immediately reenter the normal power mode from the deeper low power mode, especially where it is possible that the interval of time awaited at 575 between tests at 560 may be deemed to be too long for a user to wait, at least under some circumstances.

It may be, in some alternate variants, that the interval awaited at 575 by the control circuit 2000 lengthens as more time passes since an earpiece 100 and/or the entirety of this particular personal acoustic device was last in position. In such alternate variants, at some point when the interval has reached a predetermined length of time, the control circuit 2000 may cause this particular personal acoustic device to power itself off.

As an alternative to or in addition to determining whether or not an earpiece 100 and/or the entirety of a personal acoustic device is in position using a comparative analysis of sounds, detection of user movement may also be used, including movement of a user’s head. In particular, portions of a personal acoustic device may incorporate one or more movement sensors, such as one or a pair of accelerometers and/or one or a pair of gyroscopes. Recent advances in MEMS (microelectromechanical systems) technologies have enabled the manufacture of relatively low cost multi-axis accelerometers and gyroscopes of very small size and having relatively low power consumption using processes based on those employed in the microelectronics industry. Indeed, developments in this field have also resulted in the creation of relatively low cost MEMS devices that combine a multi-axis accelerometer and gyroscope (sometimes referred to as an IMU or inertial measurement unit). As a result, incorporating accelerometers and/or gyroscopes into personal acoustic devices, including those powered by a limited power source such as a battery, is becoming both possible and economical. There is also a growing body of research concerning various aspects of the way in which portions of the human body move, in particular, the mechanics of the manner in which people voluntarily and involuntarily use various muscles of the human body in moving about and in moving their heads as part of normal activities. Numerous observations have been made concerning behavioral tendencies in moving muscles, as well as various limitations in range and frequency of such movements.

In employing accelerometer(s) and/or gyroscope(s) incorporated into a personal acoustic device to detect movement, and in employing these observations concerning movement of the human body, it is possible both to detect movement imparted to that personal acoustic device and to distinguish instances of that movement being caused by a user of that personal acoustic device from instances of that movement being caused by some other influence. For example, where a user is traveling in a vehicle, it is possible to distinguish between movement made by the user from movement made by the vehicle. In this way, it is possible to more accurately detect that a personal acoustic device is not in position on a user’s head, even if that personal acoustic device has been placed on a seat or elsewhere in moving vehicle, despite the fact that a moving vehicle will subject the personal acoustic device to changes in acceleration and/or orientation as the vehicle moves.

Figure 5:
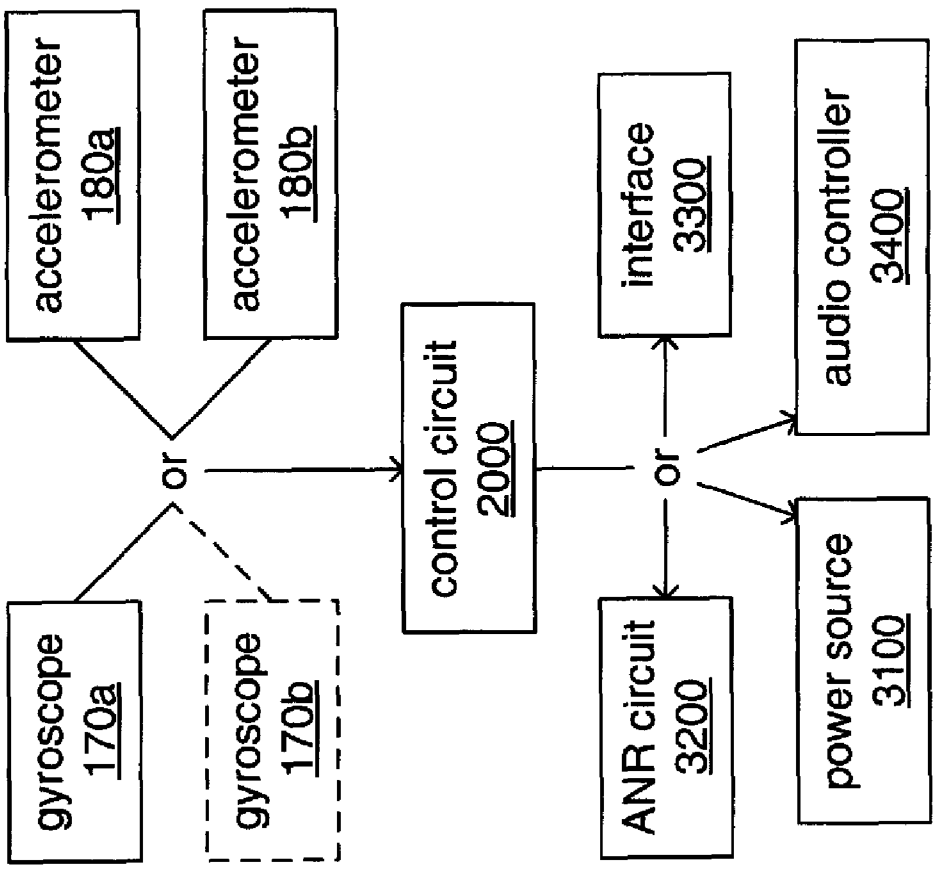
FIG. 5 is a block diagram of a portion of a possible implementation of personal acoustic device.

FIG. 5 provides a block diagram of the addition of one or more movement sensors to either of the personal acoustic devices 1000*a* and 1000*b*, specifically, the addition of one or more of a three-axis accelerometer 180*a*, a three-axis accelerometer 180*b*, a three-axis gyroscope 170*a* and a three-axis gyroscope 170*b* to either of the personal acoustic devices 1000*a* and 1000*b*. Again, a personal acoustic device (such as one of the personal acoustic devices 1000*a* and 1000*b*) incorporates at least one of the control circuit 2000, and one or more of the movement sensors (i.e., one or both of the accelerometers 180*a* and 180*b* and/or one or both of the gyroscopes 170*a* and 190*b*) coupled to the at least one control circuit 2000. As will be explained in greater detail, recurring analyses are made by the control circuit 2000 of movement detected by such movement sensors to determine the current operating state of one or more of earpieces 100 of a personal acoustic device (such as either of the personal acoustic devices 1000*a* or 1000*b*), where the possible operating states of each of the earpieces 100 are: 1) being positioned in the vicinity of an ear, and 2) not being positioned in the vicinity of an ear. Through such recurring analyses, further determinations of whether or not a change in operating state of one or more of the earpieces 100 has occurred are also made. Through determining the current operating state and/or through determining whether there has been a change in operating state of one or more of the earpieces 100, the current operating state and/or whether there has been a change in operating state of the entirety of a personal acoustic device are determined, where the possible operating states of a personal acoustic drive are: 1) being fully positioned on or about a user’s head, 2) being partially positioned on or about the user’s head, and 3) not being in position on or about the user’s head, at all.

Thus, the control circuit 2000 analyzes detected movement, and takes any of a variety of possible actions in response to determining that an earpiece 100 and/or the entirety of a personal acoustic device is in a particular operating state, and/or in response to determining that a particular change in operating state has occurred. As part of performing these analyses, and as will be explained in greater detail, characteristics of detected movement are also analyzed to distinguish detected movement likely caused by muscular movements of a user from detected movement likely caused by other influences. Making such distinctions enables greater accuracy in using detection of movement as a basis for determining whether or not a personal acoustic device is in position by enabling knowledge of the limitations of human muscular movement and possibly other physical limitations of the human body to be employed.

FIGS. 6*a* through 6*f* depict the manner in which one or more of the accelerometers 180*a* and 180*b* and/or one or more of the gyroscopes 170*a* and 170*b* may be positioned about the structure of the previously introduced possible physical configurations 1500*a* through 1500*d*, as well as an additional possible physical configuration 1500*e*. As previously discussed, different variants of each of the physical configurations 1500*a-d* are possible that may have either one or two earpieces 100, and all of the physical configurations 1500*a-d* are structured to be positioned on or near a user's head in a manner that enables each earpiece 100 to be positioned in the vicinity of an ear.

Figure 6A:
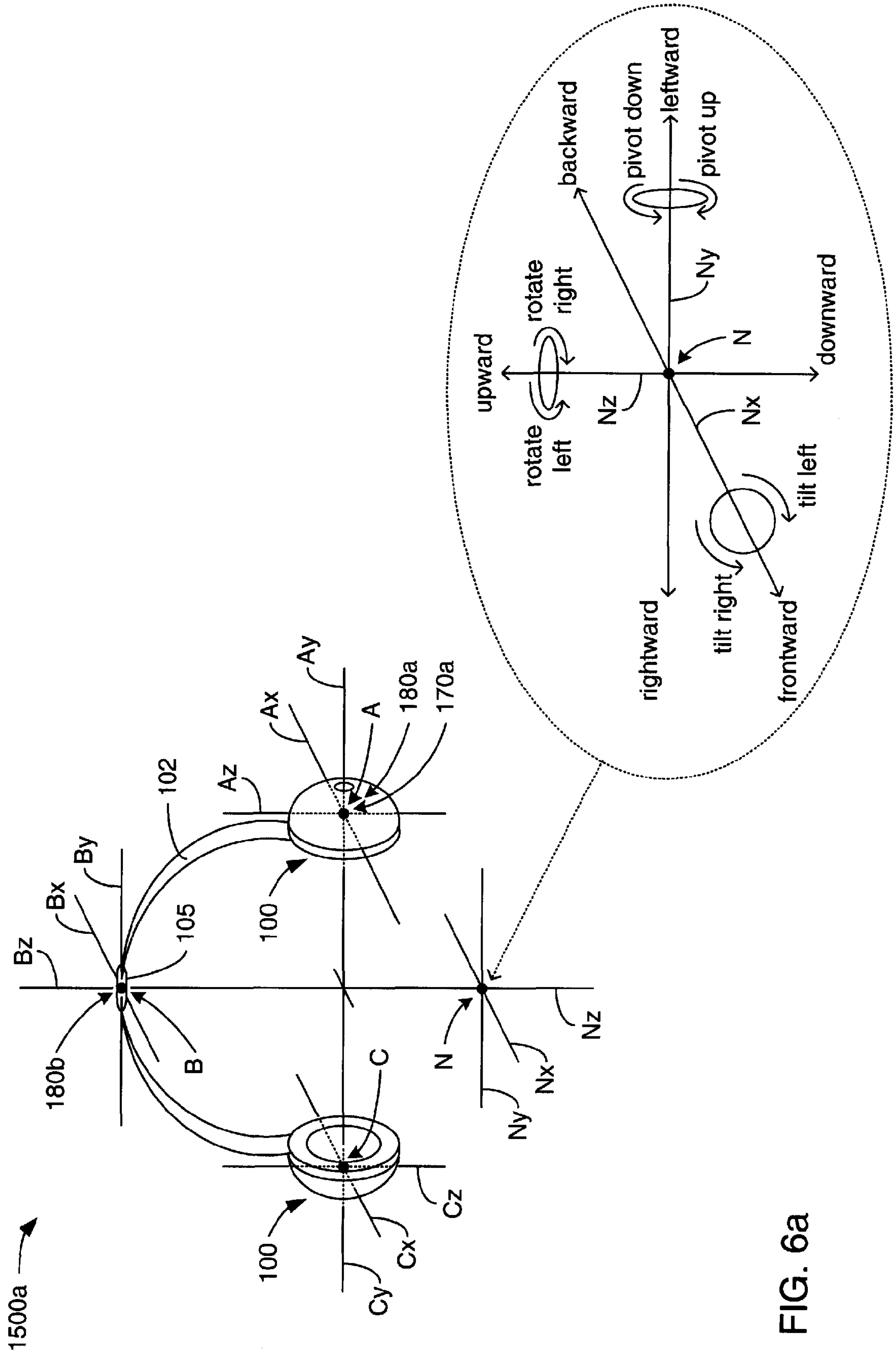
FIGS. 6*a* through 6*f* depict possible physical configurations of personal acoustic devices having either one or two earpieces, including variants of the physical configurations of FIGS. 2*a* through 2*d*.

FIG. 6*a* depicts a variant of the over-the-head physical configuration 1500*a* that incorporates a pair of earpieces 100 that are each in the form of an earcup, and that are connected by a headband 102 structured to be worn over the head of a user. Again, each of the earpieces 100 may be either an "on-ear" or an "over-the-ear" form of earcup, depending on their size relative to the pinna of a typical human ear. A slight difference in this variant of the physical configuration 1500*a* as depicted in FIG. 6*a* from how it was depicted in FIG. 2*a* is the optional addition of a very small casing 105 midway along the length of the band 102 coupling the pair of earpieces 100. As will be discussed, the accelerometer 180*b* may be positioned along the band 102, and where the structure of the band 102 does not afford sufficient space to so position the accelerometer 180*b*, the casing 105 may be positioned along the band 102 to provide the necessary space.

FIG. 6*a* also depicts a rough approximation of how the earpieces 100 and the headband 102 are positioned on a user's head relative to a rough approximation of a pivot point N of the user's neck when a personal acoustic device adopting the physical configuration 1500*a* is being worn by a user. The pivot point N is meant to be a rough approximation of the location on the human body at which the head is pivoted for movement relative to the rest of the human body. As those skilled in the area of human physiology will readily recognize, it is important to note that there is no such thing as an actual single pivot point in the human neck at which the head pivots relative to the rest of the body. In reality, the entire length of the spine, including the cervical portion connecting the head to the torso, is made up of a linked chain of vertebrae. Between each vertebrae is a flexible linkage of various tissues that enable each adjacent pair of vertebrae to pivot and rotate to a limited degree relative to each other. With several cervical vertebrae forming the neck, the pivoting and rotating of the head relative to the torso is enabled through the additive effect of several of these flexible linkages being positioned between adjacent pairs of these cervical vertebrae within the neck. However, despite there being no single pivot point defined by the geometry of the human neck by which the head moves relative to the torso, it is possible to define such a pivot point as a rough approximation of the pivoting and rotating movement of the head relative to the torso that the geometry of the neck does enable. Some efforts at modeling the human body for any of a variety of engineering, scientific and other purposes have suggested that the pivot point can be approximated to be at or about the location of the "C3" cervical vertebrae within the neck (i.e., the third cervical vertebrae from the top of the chain of vertebrae forming the spine). So, for ease of understanding of the discussion to follow, a similar rough approximation is made herein, and this is used as the basis on which the location of the pivot point N is chosen and depicted in FIG. 6*a*.

FIG. 6*a* further depicts the axes and orientation of a coordinate system that will be used in describing movement and the detection of movement by one or more of the movement sensors (e.g., one or both of the accelerometers 180*a* and 180*b*, and/or one or both of the gyroscopes 170*a* and 170*b*). As depicted, forward-backward movement is defined as occurring along a X axis, leftward-rightward movement is defined as occurring along a Y axis, and upward-downward movement is defined as occurring along a Z axis. As a result, left-right rotation is defined as occurring about the Z axis, upward-downward pivoting is defined as occurring about the Y axis, and left-right tilting is defined as occurring about the X axis. Thus, rotation of a user's head at the neck to the left or right (i.e., what might be called a "panning left" or "panning right" movement such as what a user might do to look to the left or to the right) entails rotation about the Z axis of the pivot point N (i.e., axis Nz). Thus, pivoting a user's head up or down at the neck (i.e., what might be called a "tilting forward" or "tilting backward" movement such as what a user might do to look up or down) entails rotation about the Y axis of the pivot point N (i.e., axis Ny). And thus, pivoting a user's head to the left or right (i.e., what might be called a "tilting left" or "tilting right" movement such as what a user might do to look at something like a painting hung on a wall in a crooked manner or to look around an edge of window to see something outside) entails rotation about the X axis of the pivot point N (i.e., axis Nx).

It should be noted that throughout much of the discussion that immediately follows, the assumption is made that whatever ones of the accelerometers 180*a* and 180*b* and whatever ones of the gyroscopes 170*a* and 190*b* are present will be positioned within the structures of personal acoustic devices in a manner in which their coordinate systems are aligned (e.g., such that their X, Y and Z axes are all in the same orientation). As will be explained in greater detail, having such alignment in coordinate systems where multiple ones of such movement sensors are present can greatly simplify comparisons and analyses of detected movement. Later discussions will set forth techniques of comparison and analysis that address situations in which the coordinate systems of multiple ones of such movement sensors present within portions of the same personal acoustic device cannot be assumed to be aligned.

FIG. 6*a* still further depicts a rough approximation of the relationship between the axes of the pivot point N and various other points A, B and C at which portions of the structure of a personal acoustic device adopting the physical configuration 1500*a* may be positioned about the head of a user. Points A and C roughly correspond to the locations of the two earpieces 100 at each ear of a user. Point B roughly corresponds to the location at the top of a user's head over which the midpoint of the band 102 crosses over the user's head as it extends between the two earpieces 100, presuming that the band 102 is of a configuration meant to be worn over the top of the head (i.e., a "headband"), and not around the back of the neck (i.e., a "napeband"). Although the exact geometry of the positioning of the head, the cervical vertebrae of the neck and the ears are unique to each person, the pivot point N is usually roughly vertically aligned with the point B to a close enough degree that the axis Nz can be roughly deemed to be one and the same with the Z axis of the point B (i.e., the axis Bz). Further, the ears are positioned relative to the axis Nz in a sufficiently aligned manner that the Y axes of the points A and C (i.e., the axes Ay and Cy) can be deemed to be one and the same axis, and this common Y axis can be roughly deemed to intersect with the common Z axis made up of the axes Bz and Nz.

Some embodiments of personal acoustic device (such as one of the personal acoustic devices 1000*a* or 1000*b*) employing the physical configuration 1500*a* may incorporate the gyroscope 170*a* to detect instances of rotational movement of a user's head. As will be familiar to those skilled in the art, a gyroscope detects rotational movement (i.e., rotating movement about an axis), but not translational movement (i.e., movement along an axis). As a result of this inherent characteristics of a gyroscope, the question of where the gyroscope 170*a* is disposed about the structure of a personal acoustic device adopting the physical configuration 1500*a* is of relatively little importance. This inherent characteristic of a gyroscope also means that the gyroscope 170*a* is somewhat inherently able to distinguish between detected movements likely caused by a user (which would tend to indicate that a personal acoustic device is in position about the user's head) and detected movements caused by other influences. For example, where a user is riding in a moving vehicle (e.g., a car, truck, train, boat or airplane) while wearing a personal acoustic device employing the physical configuration 1500*a* and incorporating the gyroscope 170*a*, the gyroscope 170*a* will inherently not detect the typically translational movement of the vehicle (e.g., moving forwardly or rearwardly, moving upwardly or downwardly, slowing down, speeding, stopping, starting, etc.), but the gyroscope 170*a* will readily detect the typically rotational movements of the user's head (e.g., rotating left or right, pivoting up or down and/or tilting left or right at the pivot point N). Occurrences of these instances of rotational movement detected by the gyroscope 170*a* are suggestive of the personal acoustic device being in position on a user's head, while the lack of such instances of rotation movement being detected by the gyroscope 170*a* over a predetermined period of time are suggestive of the personal acoustic device not being so positioned. In other words, if this same personal acoustic device incorporating the gyroscope 170*a* is removed from the user's head and placed on a seat or in a storage compartment of the same moving vehicle, the rotational movements of the user's head that were previously detected by the gyroscope 170*a* are no longer detected, and the lack of detection of such rotational movements over a predetermined period of time (perhaps several minutes) may be taken as an indication that this personal acoustic device is no longer in position on that user's head.

Some embodiments of personal acoustic device (such as one of the personal acoustic devices 1000*a* or 1000*b*) employing the physical configuration 1500*a* may incorporate the pair of accelerometers 180*a* and 180*b* to detect movement. In some of such embodiments, the accelerometer 180*a* may be positioned within one of the earpieces 100 (i.e., at point A) and the accelerometer 180*b* may be positioned along the band 102 (i.e., at point B). As a result of such positioning, both of the accelerometers are at positions that are vertically offset from the pivot point N, and the accelerometer 180*a* is also horizontally offset from the pivot point N (i.e., offset along the common Y axis made up of the axes Ay and Cy). Thus, the accelerometers 180*a* and 180*b* are spaced relatively widely apart from each other and are positioned asymmetrically relative to the user's head. This may be deemed preferable to ensure that rotational movements of a user's head will bring about detectable differences in the magnitudes and/or directions of acceleration detected by each of the accelerometers 180*a* and 180*b*, while translational movements that are more likely caused by other influences will more likely result in relatively similar magnitudes and directions of acceleration detected by each of the accelerometers 180*a* and 180*b*. In other words, the accelerometers 180*a* and 180*b* are employed as a pair to enable differential acceleration sensing in which there is sensing of both accelerations of similar direction and magnitude (i.e., "common mode" accelerations) that are deemed indicative of movement caused by influences other than the user, and accelerations of different magnitude and/or direction (i.e., "differential mode" accelerations) that are deemed indicative of head movements caused by the user. To put it yet another way, the accelerometers 180*a* and 180*b* are preferably positioned so as to be subjected to differential mode movement at times when the user moves their head, and so as to be subjected to common mode movement at times when other influences bring about movement, such as the entirety of the user's body being moved in a vehicle.

Being positioned at the points A and B, both of the accelerometers 180*a* and 180*b* are able to detect upward-downward pivoting movements of a head (i.e., rotations about the axis Ny at the pivot point N at the neck) as accelerations along their X axes (i.e., acceleration along an axis Ax at the point A by the accelerometer 180*a* and acceleration along an axis Bx at the point B by the accelerometer 180*b*). The accelerometers 180*a* and 180*b* may also both detect the resulting centrifugal forces of such upward-downward pivoting movements of a head at their respective locations as upward accelerations along their Z axes (i.e., upward acceleration along an axis Az at the point A by the accelerometer 180*a* and upward acceleration along the axis Bz at the point B by the accelerometer 180*b*). However, although the accelerometers 180*a* and 180*b* may both detect accelerations in the same directions, their different vertical offsets from the pivot point N results in each of these accelerometers detecting these accelerations with different magnitudes. The accelerations along the X and Z axes detected by the accelerometer 180*b* are greater than for the accelerometer 180*a* as a result of the accelerometer 180*a* being at a lesser vertical offset than the accelerometer 180*b*, such that location of the accelerometer 180*a* at the point A is closer to the axis Ny about which the upward-downward pivoting movement occurs.

In an analogous manner, being positioned at the points A and B, both of the accelerometers 180*a* and 180*b* are able to detect leftward-rightward tilting movements (i.e., rotations about the axis Nx) as accelerations along their Y axes (i.e., accelerations along the axis Ay at the point A by the accelerometer 180*a* and accelerations along an axis By at the point B by the accelerometer 180*b*). The accelerometers 180*a* and 180*b* may also both detect the resulting centrifugal forces of such leftward-rightward tilting movements of a head at their respective locations as upward accelerations along their Z axes. Again, the accelerometers detect these accelerations with different magnitudes, with the accelerations along the Y and Z axes that are detected by the accelerometer 180*b* being greater than those detected by the accelerometer 180*a*.

Being positioned at points A and B results in an even greater difference in accelerations that are detected in the case of leftward-rightward rotating movements of a head (i.e., rotations about the axis Nz). Being at the point A, which is horizontally offset from the pivot point N, and therefore horizontally offset from the axis Nz, the accelerometer 180*a* is able to detect such leftward-rightward rotating movements as accelerations along the axis Ax, and the accelerometer 180*a* may also detect the resulting centrifugal forces at the point A as a leftward acceleration along the axis Ay. However, being at the point B, which is along the common Z axis made up of the axes Bz and Nz, the accelerometer 180*b* detects little (if anything) in the way of an acceleration arising from such leftward-rightward rotating movements. Thus, the accelerometer 180*a* detects accelerations arising from such leftward-rightward rotating movements while the accelerometer 180*b* detects none (or almost none).

In contrast to these differences in magnitude of acceleration detected by the accelerometers 180*a* and 180*b* as a result of head movements by a user, accelerations detected by these accelerometers that arise from other influences are more likely to be relatively similar in magnitude. Returning to the previously discussed example of a user in a moving vehicle, movements of the vehicle (e.g., moving forwardly or rearwardly, moving upwardly or downwardly, slowing down, speeding, stopping, starting, etc.) are more likely to be translational movements such that both of these accelerometers experience accelerations of the same magnitude, in the same direction and occurring at the same time. In other words, where the accelerations detected by these accelerometers as a result of vehicle movement are compared, those accelerations would be found to be common mode accelerations. Again, such common mode accelerations differ from the accelerations arising from head movements (as described at length, above), which would be found to be differential mode accelerations.

Other embodiments of personal acoustic device employing the physical configuration 1500*a* may also incorporate the pair of accelerometers 180*a* and 180*b* to detect movement, but the positioning of these accelerometers may be different such that one each of these accelerometers is positioned within each of the earpieces 100 (i.e., one each at the points A and C), rather than having one of them positioned along the band 102. Such a placement of these accelerometers may be deemed necessary where it is somehow difficult or undesirable to position one of these accelerometers along the band 102. However, there is a disadvantage in having both accelerometers positioned so as to be along the common Y axis made up of the axes Ay and Cy inasmuch as upward-downward pivoting movements of a head (i.e., rotations about the axis Ny) become more difficult to detect, since both accelerometers would be detecting accelerations of very similar magnitudes and directions. In other words, the left-to-right symmetry resulting from the positioning of the accelerometers 180*a* and 180*b* at the points A and C, respectively, would cause the detection of such upward-downward pivoting movements to be detected as common mode accelerations, instead of differential mode accelerations. A more complex analysis would be required of common mode accelerations to attempt to determine which ones are more indicative of an upward-downward pivoting movement of the head and which ones are more indicative of movements caused by other influences unrelated to head movement.

Alternatively, where it is necessary and/or desirable to position one each of the accelerometers 180*a* and 180*b* within each of the earpieces 100, it may be possible to regain a detectable differential mode acceleration arising from such upward-downward pivoting by positioning these accelerometers asymmetrically within their respective ones of the earpieces 100. For example, the accelerometer 180*a* may be positioned toward an upper portion of the casing 110 of one of the earpieces 100, while the accelerometer 180*b* may be positioned toward a lower portion of the casing 110 of the other of the earpieces 100.

Figure 6C:
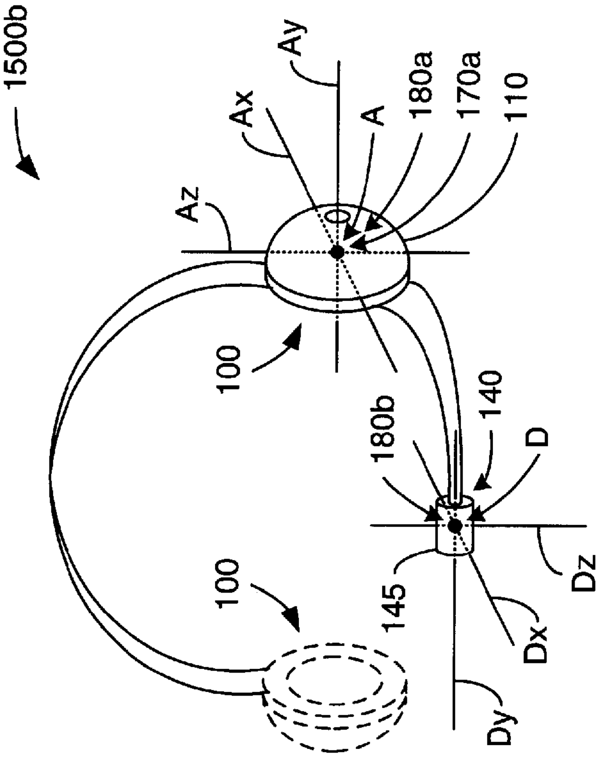
Figure 6B:
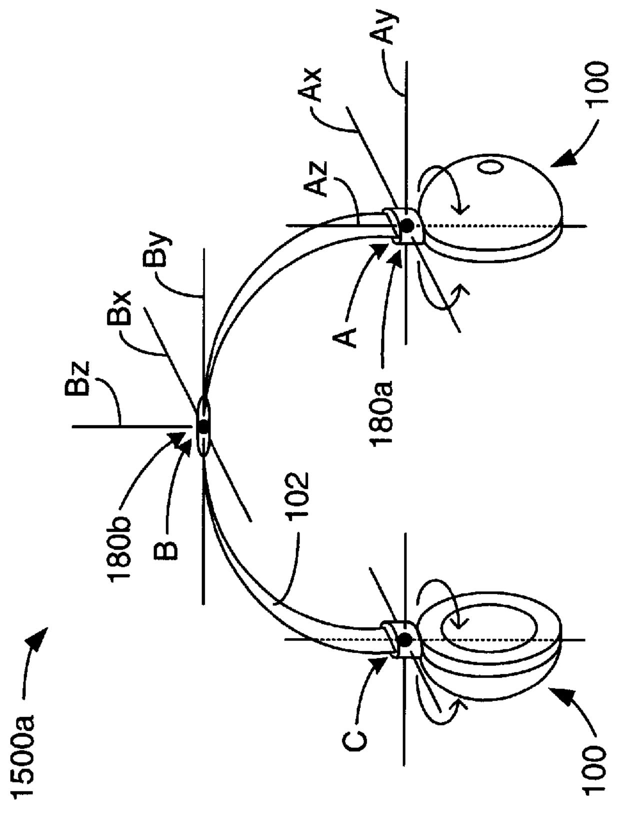

FIG. 6*b* depicts another variant of the over-the-head physical configuration 1500*a* that is similar to that depicted in FIG. 6*a*, but with the points A and C shifted upward from within the earpieces 100 to within the ends of the band 102 such that one or more of the accelerometers 180*a* and 180*b* and/or one or more of the gyroscopes 170*a* and 170*b* that may be present are positioned within one or both of the ends of the band 102, instead of being positioned within one or both of the earpieces 100. Otherwise, the variants of the physical configuration 1500*a* depicted in FIGS. 6*a* and 6*b* are substantially alike and function in substantially the same with regard to at least the detection of movement. Such positioning of one or more of such movement sensors as depicted in FIG. 6*b* may be deemed desirable where the ends of the band 102 are coupled to the earpieces 100 in such as way as to allow the earpieces 100 to rotate or “swivel” relative to the ends of the band 102. Allowing such rotational movement of the earpieces 100 relative to the band 102 may be deemed desirable to aid in ensuring a comfortable fit of the earpieces against portions of the head of a user, and/or to accommodate unique aspects of a task in which a given personal acoustic device may be employed, such as a DJ occasionally wanting to swivel one of the earpieces into an orientation where an acoustic driver of that earpiece is oriented away from the ear canal of one ear, thereby leaving that ear “free” to listen to the sounds in the room in which the DJ is playing music.

Movement sensors positioned within the ends of the band 102, instead of within swiveling variants of the earpieces 100, enable the swiveling of those earpieces 100 to be done without affecting the orientation of the coordinate systems of those movement sensors relative to each other. In other words, were movement sensors to be positioned within swiveling variants of the earpieces 100, it would no longer be possible to assume that the coordinate systems of such movement sensors are aligned, since the coordinate systems of one or more of such sensors would be rotated into a different orientations each time the swiveling feature of one or both of the earpieces 100 is used. Again, as will be explained in greater detail, being able to rely on the coordinate systems of the movement sensors within a personal acoustic device being aligned where multiple movement sensors are employed simplifies the comparison and analysis of detected movement.

FIG. 6*c* depicts a variant of the over-the-head physical configuration 1500*b* that is substantially similar to the physical configuration 1500*a*, but in which one of the earpieces 100 additionally incorporates the microphone boom 142 to support the communications microphone 140. Broken lines are used to specifically depict the possibility of the physical configuration 1500*b* having either one or two of the earpieces 100. Also again, in some variants of the physical configuration 1500*b*, the microphone boom 142 may be a hollow tube to convey speech sounds back to the communications microphone 140, which would then be positioned within the casing 110 of the one of the earpieces to which the microphone boom 142 is attached. A slight difference in this variant of the physical configuration 1500*b* as depicted in FIG. 6*c* from how it was depicted in FIG. 2*b* is the optional addition of a very small casing 145 at the end of the microphone boom 142 in the vicinity of the user’s mouth. As will be discussed, the accelerometer 180*b* may be positioned at that end of the microphone boom 142, and where the structure of the microphone boom 142 does not afford sufficient space to so position the accelerometer 180*b*, the casing 145 may be positioned at that end of the microphone boom 142 to provide the necessary space.

Some embodiments of personal acoustic device (such as one of the personal acoustic devices 1000*a* or 1000*b*) employing the physical configuration 1500*b* may incorporate the gyroscope 170*a* to detect instances of rotational movement of a user's head. Again, the question of where the gyroscope 170*a* is disposed about the structure of a personal acoustic device adopting the physical configuration 1500*b* is of relatively little importance. However, as there is likely to be space available within the casing 110 of an earpiece 100, it is preferred that the gyroscope 170*a* be positioned therein, perhaps at point A.

Some embodiments of personal acoustic device (such as one of the personal acoustic devices 1000*a* or 1000*b*) employing the physical configuration 1500*b* may incorporate the pair of accelerometers 180*a* and 180*b* to detect movement. In some of such embodiments, the accelerometer 180*a* may be positioned within one of the earpieces 100 (i.e., at point A) and the accelerometer 180*b* may be positioned at the end of the microphone boom closest to the user's mouth (i.e., at a point D). With the accelerometer 180*b* being positioned at the point D, the accelerometer 180*b* is positioned at least somewhat forwardly of the point A, and may be further offset from the point A along other axes depending on the exact shape and length of the microphone boom 142. As a result of such positioning, both of the accelerometers are at positions that are vertically offset from the pivot point N (refer back to FIG. 6*a* for a depiction of pivot point N relative to the point A), and both accelerometers are also horizontally offset from the pivot point N, though they are offset in different horizontal directions. Thus, in a manner not unlike what was the case in the variant of the physical configuration 1500*a* depicted in FIG. 6*a*, in the variant of the physical configuration 1500*b* depicted in FIG. 6*c*, the accelerometers 180*a* and 180*b* are spaced relatively widely apart from each other and are positioned asymmetrically relative to the user's head. Again, this may be deemed preferable to ensure that rotational movements of a user's head will bring about differences in the magnitudes and/or directions of acceleration detected by each of the accelerometers 180*a* and 180*b*, while translational movements that are more likely caused by other influences (such as vehicular movement) will more likely result in relatively similar magnitudes and directions of acceleration detected by each of the accelerometers 180*a* and 180*b*.

Being positioned at the point A, the accelerometer 180*a* is able to detect upward-downward pivoting movements of a head as at least an acceleration along the axis Ax at the point A, and may also detect the resulting centrifugal force along the axis Az. Being positioned at the point D, the accelerometer 180*b* is able to detect such upward-downward pivoting movements as an acceleration having components along both of an axis Dx and an axis Dz, at least partially due to the more forward positioning of the point D relative to the point A. The accelerometer 180*b* may also detect the resulting centrifugal force along the same two axes. Thus, with the accelerometers 180*a* and 180*b* positioned at the points A and D, respectively, there are differences in the directions of the detected accelerations arising from such upward-downward pivoting movements, as well as likely differences in magnitude of such accelerations.

Being positioned at the points A and D, both of the accelerometers 180*a* and 180*b* are able to detect leftward-rightward tilting movements of a head as accelerations along their Y axes (i.e., accelerations along the axis Ay at the point A by the accelerometer 180*a* and accelerations along an axis Dy at the point D by the accelerometer 180*b*). The accelerometers 180*a* and 180*b* may also both detect the resulting centrifugal forces of such leftward-rightward tilting movements of a head at their respective locations as upward accelerations along the axis Az and the axis Dz, respectively. With these different positions of these accelerometers, the detected accelerations along their Y and Z axes will differ.

Being positioned at the point A, the accelerometer 180*a* is able to detect leftward-rightward rotating movements of a head as at least an acceleration along the axis Ax at the point A, and may also detect the resulting centrifugal force along the axis Ay. Being positioned at the point D, the accelerometer 180*b* is able to detect such leftward-rightward rotating movements as at least an acceleration along the axis Dy, and may also detect the resulting centrifugal force along the axis Dx. Thus, there are differences in the directions of the detected accelerations arising from such leftward-rightward rotating movements, as well as likely differences in magnitude of such accelerations.

Figure 6D:
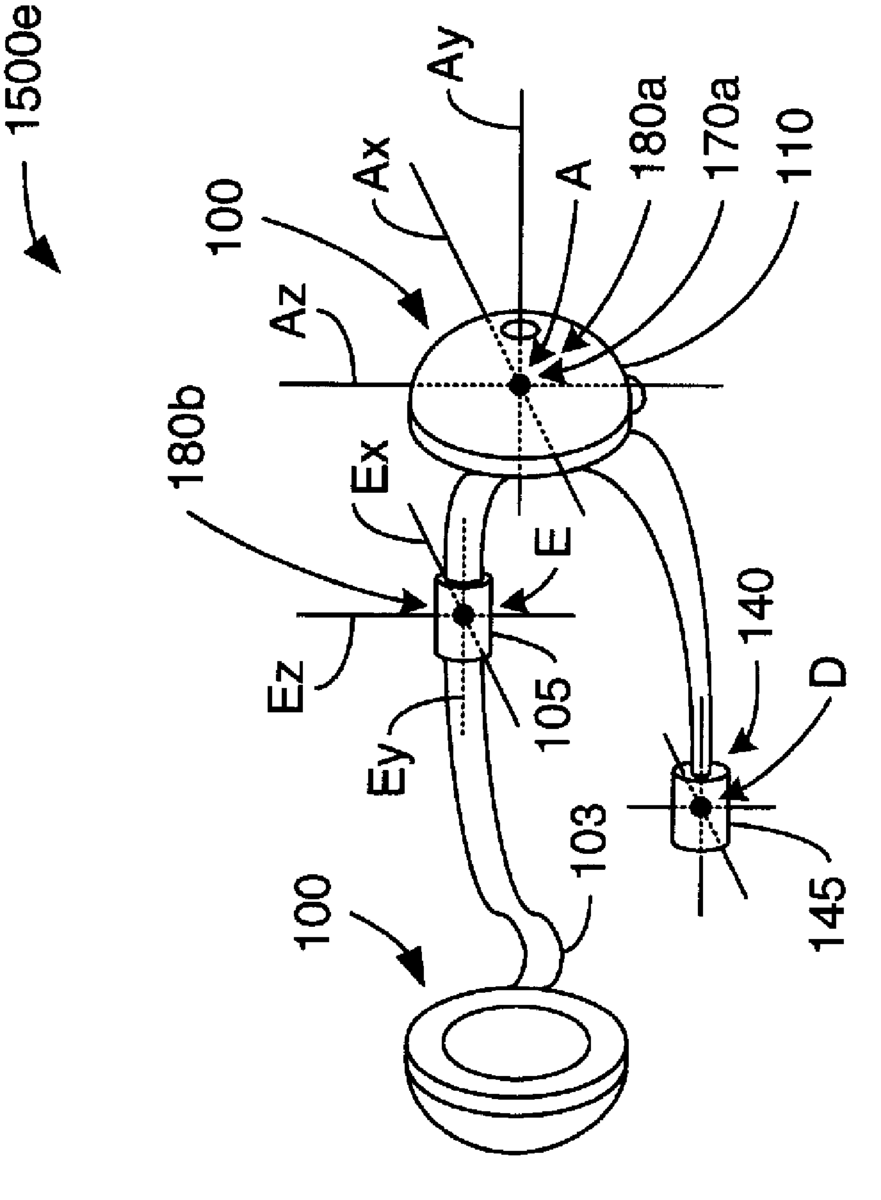

FIG. 6*d* depicts a physical configuration 1500*e* that is substantially similar to the variant of the physical configuration 1500*b* depicted in FIG. 6*c*, but in which the band 102 meant to go over a user's head (i.e., a headband) has been replaced with a different band 103 meant to go around the back of the neck at about the level of where the neck joins with the base of the head (i.e., a napeband). Again, in some variants of the physical configuration 1500*e*, the microphone boom 142 may be a hollow tube to convey speech sounds back to the communications microphone 140, which would then be positioned within the casing 110 of the one of the earpieces to which the microphone boom 142 is attached. As will be discussed, the accelerometer 180*b* may be positioned either at that end of the microphone boom 142 or along the band 103, and where the structure of the microphone boom 142 or the band 103 does not afford sufficient space to so position the accelerometer 180*b*, the casing 145 may be positioned at that end of the microphone boom 142 or the casing 105 may be positioned along the band 103, to provide the necessary space.

Some embodiments of personal acoustic device (such as one of the personal acoustic devices 1000*a* or 1000*b*) employing the physical configuration 1500*e* may incorporate the gyroscope 170*a* to detect instances of rotational movement of a user's head, and again, the question of where the gyroscope 170*a* is disposed about the structure of a personal acoustic device adopting the physical configuration 1500*b* is of relatively little importance. However, as there is likely to be space available within the casing 110 of an earpiece 100, it is preferred that the gyroscope 170*a* be positioned therein, perhaps at point A.

Some embodiments of personal acoustic device (such as one of the personal acoustic devices 1000*a* or 1000*b*) employing the physical configuration 1500*e* may incorporate the pair of accelerometers 180*a* and 180*b* to detect movement. In some of such embodiments, the accelerometer 180*a* may be positioned within one of the earpieces 100 (i.e., at point A) and the accelerometer 180*b* may be positioned midway along the band 103 (i.e., at a point E). With the accelerometer 180*b* being positioned at the point E, the accelerometer 180*b* is positioned at least somewhat rearwardly of the point A, and may be further offset from the point A along other axes depending on the exact shape and length of the band 103. As a result of such positioning, both of the accelerometers are at positions that are vertically offset from the pivot point N (refer back to FIG. 6*a* for a depiction of pivot point N relative to the point A), and both accelerometers are also horizontally offset from the pivot point N, though they are offset in different horizontal directions. Thus, the accelerometers 180*a* and 180*b* are spaced relatively widely apart from each other and are positioned asymmetrically relative to the user's head, which may be deemed preferable to ensure that rotational movements of a user's head will bring about differences in the magnitudes and/or directions of acceleration detected by each of the accelerometers 180*a* and 180*b*, while translational movements that are more likely caused by other influences will more likely result in relatively similar magnitudes and directions of acceleration detected by each of the accelerometers 180*a* and 180*b*.

Being positioned at the point A, the accelerometer 180*a* is able to detect upward-downward pivoting movements of a head as at least an acceleration along the axis Ax at the point A, and may also detect the resulting centrifugal force along the axis Az. Being positioned at the point E, the accelerometer 180*b* is able to detect such upward-downward pivoting movements as an acceleration having components along both of an axis Ex and an axis Ez, at least partially due to the more rearward positioning of the point E relative to the point A. The accelerometer 180*b* may also detect the resulting centrifugal force along the same two axes. Thus, with the accelerometers 180*a* and 180*b* positioned at the points A and E, respectively, there are differences in the directions and magnitude of the detected accelerations arising from such upward-downward pivoting movements.

Being positioned at the points A and E, both of the accelerometers 180*a* and 180*b* are able to detect leftward-rightward tilting movements of a head as accelerations along their Y axes (i.e., accelerations along the axis Ay at the point A by the accelerometer 180*a* and accelerations along an axis Ey at the point E by the accelerometer 180*b*). The accelerometers 180*a* and 180*b* may also both detect the resulting centrifugal forces of such leftward-rightward tilting movements of a head at their respective locations as upward accelerations along the axis Ez and the axis Ez, respectively. With these different positions of these accelerometers, the detected accelerations along their Y and Z axes will differ.

Being positioned at the point A, the accelerometer 180*a* is able to detect leftward-rightward rotating movements of a head as at least an acceleration along the axis Ax at the point A, and may also detect the resulting centrifugal force along the axis Ay. Being positioned at the point E, the accelerometer 180*b* is able to detect such leftward-rightward rotating movements as at least an acceleration along the axis Ey, and may also detect the resulting centrifugal force along the axis Ex. Thus, there are differences in the directions and magnitude of the detected accelerations arising from such leftward-rightward rotating movements.

Figure 6E:
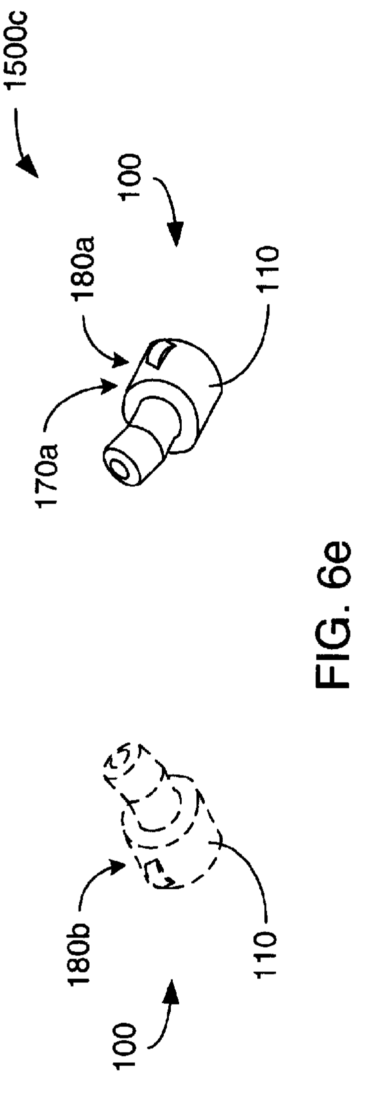

FIG. 6*e* depicts a variant of the "in-ear" physical configuration 1500*c* that incorporates a pair of earpieces 100 that are each in the form of an in-ear earphone. Broken lines are used to specifically depict the possibility of the physical configuration 1500*c* having either one or two of the earpieces 100.

Some embodiments of personal acoustic device (such as one of the personal acoustic devices 1000*a* or 1000*b*) employing the physical configuration 1500*c* may incorporate the gyroscope 170*a* to detect instances of rotational movement of a user's head. Again, the question of where the gyroscope 170*a* is disposed about the structure of a personal acoustic device adopting the physical configuration 1500*c* is of relatively little importance. However, given that there is no band or similar structure coupling what may be a pair of the earpieces 100, it is likely that the gyroscope 170*a* is to be positioned within the casing 110 of one of the earpieces 100.

Some embodiments of personal acoustic device (such as one of the personal acoustic devices 1000*a* or 1000*b*) employing the physical configuration 1500*c* may incorporate the pair of accelerometers 180*a* and 180*b* to detect movement. In such embodiments, the desirability of the accelerometers 180*a* and 180*b* being positioned with some distance between makes it preferable to dispose one each of the accelerometers 180*a* and 180*b* in each one of a pair of the earpieces 100. Thus, where the pair of accelerometers 180*a* and 180*b* is used (instead of the gyroscope 170*a*), it is preferable for this variant of the physical configuration 1500*c* to incorporate a pair of the earpieces 100, rather than only a single one of the earpieces 100. With the accelerometers 180*a* and 180*b* distributed among a pair of the earpieces 100 in this manner, the resulting ability of each of the accelerometers 180*a* and 180*b* to detect accelerations arising from the aforedescribed different possible forms of head movement becomes much the same as in the above-described variants of the physical configuration 1500*a* in which the accelerometers 180*a* and 180*b* were positioned at the points A and C, respectively (refer to FIGS. 6*a* and 6*b*). Unfortunately, this may also bring about the same difficulties in detecting an upward-downward pivoting movement of a head as were previously discussed in reference to such positioning of these two accelerometers at the points A and C in those variants of the physical configuration 1500*a*.

Figure 6F:
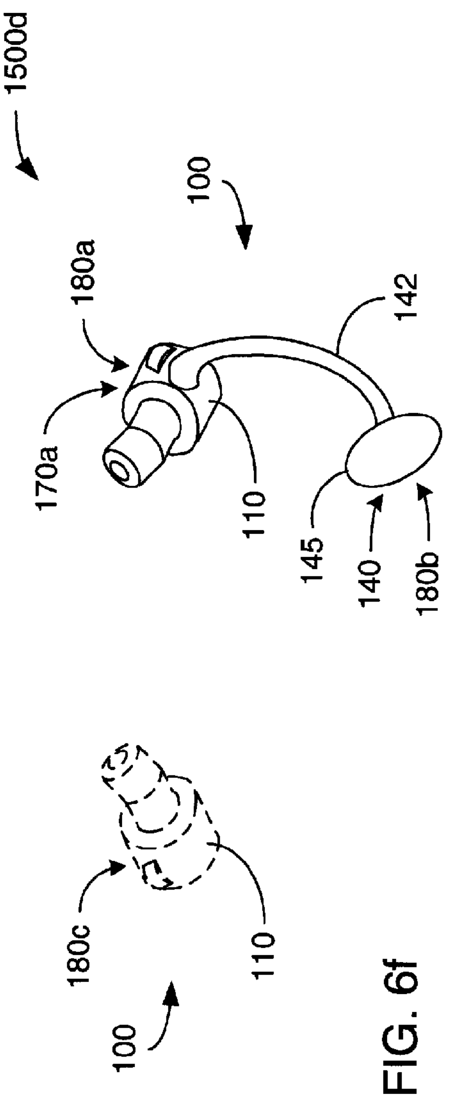

FIG. 6*f* depicts a variant of the in-ear physical configuration 1500*d* in which one of the earpieces 100 is in the form of a single-ear headset (sometimes also called an "earset") that additionally incorporates the microphone boom 142 to support the communications microphone 140. Again, alternative variants of the physical configuration 1500*d* are possible in which sounds from the vicinity of the user's mouth are conveyed to the communications microphone 140 through a tube (not shown), or in which the communications microphone 140 is disposed on the casing 110 in a manner in which the communications microphone is oriented towards the user's mouth. Also again, the depicted earpiece 100 of the physical configuration 1500*d* that has the communications microphone 140 may or may not be accompanied by another earpiece 100 (as indicated by the depiction of such another earpiece 100 in broken lines). A slight difference in this variant of the physical configuration 1500*d* as depicted in FIG. 6*f* from how it was depicted in FIG. 2*d* is the optional addition of a very small casing 145 at the end of the microphone boom 142 in the vicinity of the user's mouth. Not unlike the above-described variant of the physical configuration 1500*b* (refer to FIG. 6*c*), in the physical configuration 1500*d* of FIG. 6*f*, the accelerometer 180*b* may be positioned at that end of the microphone boom 142. Where the structure of the microphone boom 142 does not afford sufficient space to so position the accelerometer 180*b*, the casing 145 may be positioned at that end of the microphone boom 142 to provide the necessary space.

Some embodiments of personal acoustic device (such as one of the personal acoustic devices 1000*a* or 1000*b*) employing the physical configuration 1500*d* may incorporate the gyroscope 170*a* to detect instances of rotational movement of a user's head. Again, the question of where the gyroscope 170*a* is disposed about the structure of a personal acoustic device adopting the physical configuration 1500*d* is of relatively little importance. However, given that there is no band or similar structure coupling what may be a pair of the earpieces 100, it is likely that the gyroscope 170*a* is to be positioned within the casing 110 of one of the earpieces 100.

Some embodiments of personal acoustic device (such as one of the personal acoustic devices 1000*a* or 1000*b*) employing the physical configuration 1500*d* may incorporate the pair of accelerometers 180*a* and 180*b* to detect movement. Where the microphone boom 142 (or whatever other structure may be supporting the communications microphone 140) enables a single one of the earpieces 100 to incorporate both of the accelerometers 180*a* and 180*b* with sufficient distance between them to enable the previously described differential acceleration sensing, then it is deemed preferable to have both of the accelerometers 180*a* and 180*b* incorporated into a single one of the earpieces 100. Given that such a form of earpiece 100 would likely be at least somewhat elongated to both engage an ear and position the communications microphone 140 relatively close to the mouth, it is likely that the accelerometer 180*a* would be positioned relatively close to the ear and the accelerometer 180*b* would be positioned relatively close to the mouth. With the accelerometers 180*a* and 180*b* distributed among portions of a single earpiece 100 in this manner, the resulting ability of each of the accelerometers 180*a* and 180*b* to detect accelerations arising from the aforedescribed different possible forms of head movement becomes much the same as in the above-described variant of the physical configuration 1500*b* in which the accelerometers 180*a* and 180*b* were positioned at the points A and D, respectively (refer to FIG. 6*c*).

Figure 7A:
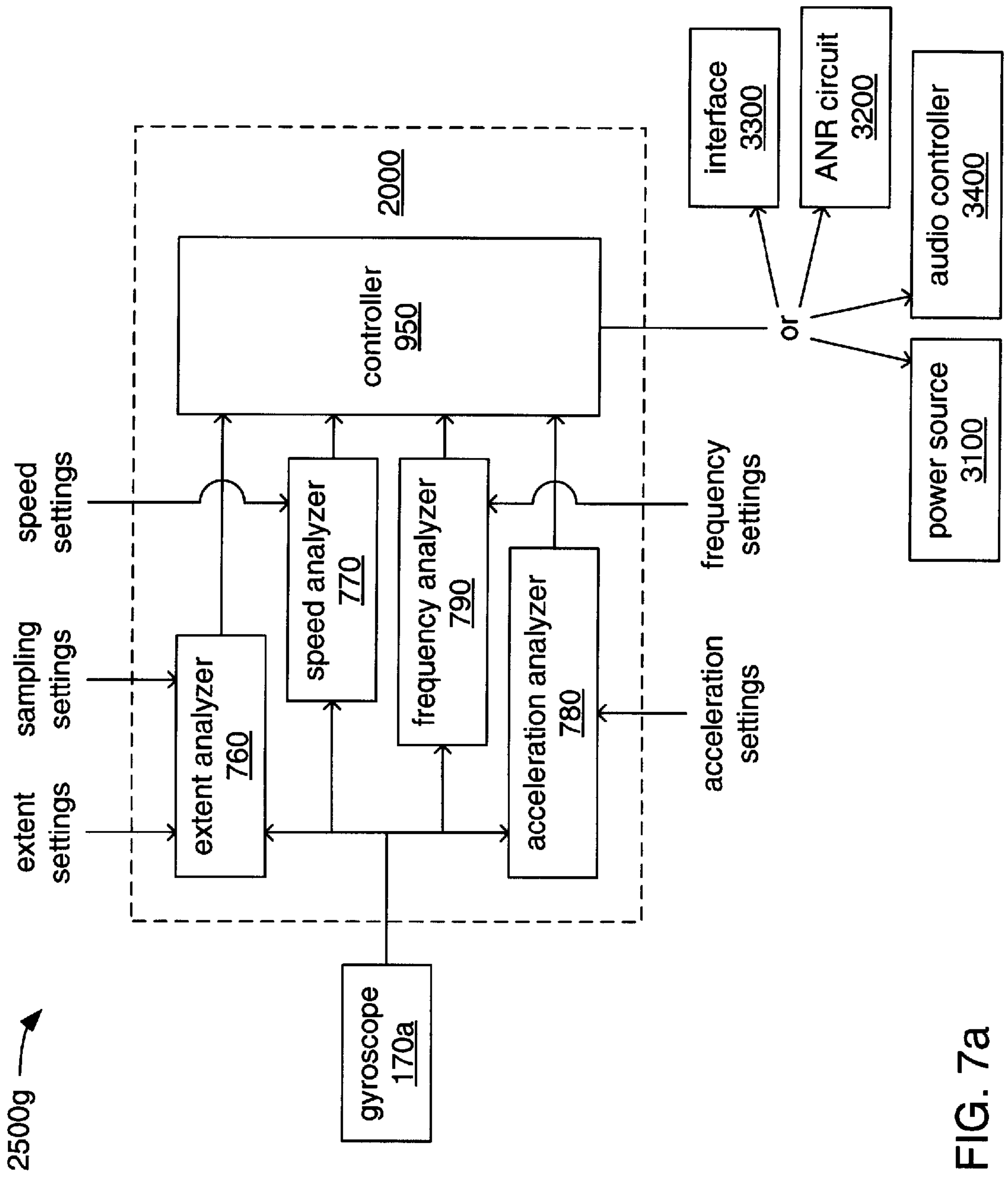
FIGS. 7*a* and 7*b* depict portions of possible electrical architectures of personal acoustic devices in which analyses are made of signals provided by gyroscopes or accelerometers.

FIG. 7*a* depicts a possible electrical architecture 2500*g* of the control circuit 2000 usable in either of the personal acoustic devices 1000*a* and 1000*b* incorporating at least the gyroscope 170*a*. In employing the electrical architecture 2500*g*, the control circuit 2000 incorporates one or more of an extent analyzer 760, a speed analyzer 770, an acceleration analyzer 780 and a frequency analyzer 790, along with the controller 950, which are interconnected to analyze characteristics of rotational movement detected by the gyroscope 170*a*. The gyroscope 170*a* outputs a signal representative of the rotational movement that it detects to whichever ones of the extent analyzer 760, the speed analyzer 770, the acceleration analyzer 780 and the frequency analyzer 790 are present.

The extent analyzer 760 analyzes the amount of rotation detected by the gyroscope 170*a* about one or more axes. The extent analyzer 760 may be structured to confine such analysis to the amount of rotation detected as occurring within a predetermined sampling period, the length of which is set through sampling settings provided to the extent analyzer 760. This analysis includes a comparison of the detected amount of rotation to one or more rotation extent values set through extent settings that are also provided to the extent analyzer 760. Among the rotation extent values may be a minimum rotation extent value (e.g., a minimum quantity of degrees of movement about one or more axes) that must be indicated as having been detected in the signal output by the gyroscope 170*a* (perhaps within a given sampling period) before that indication of rotational movement will be accepted as a valid indication of rotational movement, at all, or before that indication of rotational movement will be accepted as having been caused by a head movement on the part of a user.

Having a required minimum extent of rotational movement for any indication of movement to be accepted as valid, at all, may be deemed desirable to filter out erroneous indications of movement signaled by the gyroscope 170*a*. Having a required minimum extent of rotational movement for any indication of movement to be accepted as having been made by a user may be one approach taken to separating rotational movement caused by a user's head movement from rotational movement caused by other influences. Referring back to the previously presented example of a personal acoustic device being placed on a seat or in a storage compartment of a moving vehicle, although the movements caused by a vehicle do tend to be translational movements along an axis (as previously discussed at length), vehicles obviously do not always travel in a straight path, and must obviously make turns about one or more axes to change their direction of travel, which would be detected by the gyroscope 170*a* of a personal acoustic device placed on a seat or in a storage compartment as a rotational movement. However, most vehicles make turns in a relatively large arc of movement (e.g., typical cars have a turning radius of over 30 feet, or boats and planes tend to tilt towards one side or another while making turns that also typically have relatively large radii). Thus, a turn made by a vehicle will typically cause a detected rotational movement occurring over a far greater length of time than a typical rotational movement of a user's head. Therefore, the minimum rotation extent value may be set such that a typical turn made by a vehicle will not bring about sufficient rotation within a given sampling period to meet the minimum rotation extent value, while a typical rotational movement of a user's head will likely exceed the minimum rotation extent value.

Alternatively and/or additionally, among the rotation extent values may be a maximum rotation extent value selected to attempt to separate rotational movements caused by a head movement from rotational movements caused by other influences. The maximum rotation extent value may be set in recognition of known physiological limits of the extent to which a person can move their head relative to their torso. More specifically (and referring again to FIG. 6*a*), research into such physiological limits has found that the structure of the neck generally limits the range of upward-downward pivoting movements of the head relative to the torso (i.e., rotation about the axis Ny) to roughly 90 degrees, limits the range of leftward-rightward rotation movements (i.e., rotation about the axis Nz) to roughly 120 degrees, and limits the range of leftward-rightward tilting movements (i.e., rotation about the axis Nx) to roughly 90 degrees.

Thus, where the signal received from the gyroscope 170*a* indicates an extent of rotational movement within a sampling period that is less than a minimum rotation extent value (if provided) or is greater than a maximum rotation extent value (if provided), the extent analyzer 760 may signal the controller 950 that the movement indicated in the signal from the gyroscope 170*a* is unlikely to be indicative of a head movement made by a user. Alternatively, the extent analyzer 760 may signal the controller 950 to attribute a lesser weighting value to the movement indicated in the signal from the gyroscope 170*a* in embodiments in which the controller 950 is structured to attribute one of multiple possible weighting values to specific indications of whether or not a personal acoustic device is in position on a user's head, or not.

The speed analyzer 770 analyzes the speed of a rotational movement detected by the gyroscope 170*a* about one or more axes. This analysis includes a comparison of the detected speed of rotation to one or more rotation speed values set through speed settings that are provided to the speed analyzer 770. Among the rotation speed values may be a minimum rotation speed value that must be indicated as having been detected in the signal output by the gyroscope 170*a* before that indication of rotational movement will be accepted as a valid indication of rotational movement, at all, or before an indication of rotational movement will be accepted as having been caused by a head movement on the part of a user. This minimum rotation speed value may be an alternative to the earlier-described minimum rotation extent value in embodiments where the extent analyzer 760 is not present or where the minimum rotation extent value does not set a minimum extent of rotation that must occur within a given sampling period.

Alternatively and/or additionally, among the rotation speed values may be a maximum rotation speed value selected to attempt to separate rotational movements caused by a head movement from rotational movements caused by other influences. The maximum rotation speed value may be set in recognition of known physiological limits of the speed at which a person can move their head relative to their torso. By way of example, a personal acoustic device may be left dangling at the end of a cord by a user, and wind or some other influence may cause that personal acoustic device to start spinning at the end of that cord, and perhaps at a rotational speed that is faster than a person could possibly move their head about any of the aforedescribed axes. Thus, where the signal received from the gyroscope 170*a* indicates a speed of rotational movement that is less than a minimum rotation speed value (if provided) or is greater than a maximum rotation speed value (if provided), the speed analyzer 770 may signal the controller 950 that the movement indicated in that signal is unlikely to be indicative of a head movement made by a user.

The acceleration analyzer 780 analyzes the accelerations of rotational movement detected by the gyroscope 170*a* about one or more axes. This analysis includes a comparison of the detected accelerations and/or changes in acceleration in detected rotational movements to one or more rotation acceleration values set through acceleration settings that are provided to the acceleration analyzer 780. Among the rotation acceleration values may be a minimum rotation acceleration value or minimum acceleration rate of change value that must be indicated as having been detected in the signal output by the gyroscope 170*a* before an indication of rotational movement will be accepted as a valid indication of rotational movement, at all, or before that indication of rotational movement will be accepted as having been caused by a head movement on the part of a user.

Alternatively and/or additionally, among the rotation acceleration values may be a maximum rotation acceleration value or a maximum acceleration rate of change value selected to attempt to separate rotational movements caused by a head movement from rotational movements caused by other influences. These maximum values may be set in recognition of known physiological limits of the acceleration or rate of change of acceleration at which a person can move their head relative to their torso. Returning to the previously presented example of a personal acoustic device being left dangling at the end of a cord, the accelerations and/or relatively sharp changes in acceleration that may be detected as the personal acoustic device twists in wind and/or is caused to bump into stationary objects while dangling are likely to be greater than what a person could impart to that personal acoustic device through their own head movements. Thus, where the signal received from the gyroscope 170*a* indicates a rotational acceleration or rate of change in acceleration that is less than a minimum value (if provided) or is greater than a maximum value (if provided), the acceleration analyzer 780 may signal the controller 950 that the movement indicated in that signal is unlikely to be indicative of a head movement made by a user.

The frequency analyzer 790 analyzes the frequencies of any cyclic rotational movement detected by the gyroscope 170*a* about one or more axes. A growing body of research has shown that the majority of repetitive muscular movements made by the human body occur with a frequency roughly within the range of 1 Hz to 2 Hz. One example is that of heartbeats, which usually occur within the range of 60 to 120 beats per minute, or in other words, with a frequency between 1 Hz to 2 Hz. Another example is that of walking or running, where strides are taken also at a rate of 1 to 2 strides per second, or in other words, with a frequency between 1 Hz to 2 Hz. Even the fastest of runners tend not to exceed a rate of taking strides of more than 2 per second, and instead, usually achieve their greater speeds by taking longer strides. Still another example is that of someone moving in time with the beat of music that they are listening to, as it appears that tapping a foot or nodding a head to a beat occurs most commonly with a frequency within this same range. On occasion, frequencies of repetitive movement up to 3 Hz or 4 Hz do occur, as has been encountered with repetitive arm movements made by a person scrubbing something, rates of heartbeats reaching 150 beats per minute or more under very high physical exertion or very high emotional distress, or when a person very quickly nods or shakes their head to very emphatically indicate agreement or disagreement. On very rare occasions, frequencies of repetitive muscle movement as high as 6 Hz or 7 Hz have been observed.

Therefore, the frequency analyzer 790 may be provided with frequency settings specifying at least a maximum frequency value against which detected rotational movement of a repetitive nature may be compared to determine whether or not the frequency of such movement is of a frequency that is too high to be indicative of muscle movements of a user (perhaps 4 Hz). Given that the gyroscope 170*a* is structured to detect rotational movements, rather than translational movements, a user nodding or shaking their head would easily be detected as rotational movements and would likely be determined to have a frequency below a maximum frequency value such that the frequency analyzer 790 would signal the controller 950 with an indication that a repetitive rotational movement likely caused by a user had been detected. Further, although walking and running tend to impart a repetitive translational movement along a vertical axis (i.e., the axis Nz) as the head and torso typically move up and down with each stride, research has shown that there also tends to be slight upward-downward pivoting movements (i.e., rotation about the axis Ny) of the head in synchronization with each stride. This typically occurs as a person fixes their gaze straight ahead while walking or running to compensate for the very same vertical translational movement with each stride in order to keep their gaze focused on a given object or other focal point in front of them. Thus, the gyroscope 170*a* may be able to detect the repetitive pattern of rotational movements caused by this repetitive upward-downward pivoting during walking, and the frequency analyzer 790 may signal the controller 950 that the frequency of this upward-downward pivoting is occurring at a frequency indicative of a head movement caused by a user.

Figure 7B:
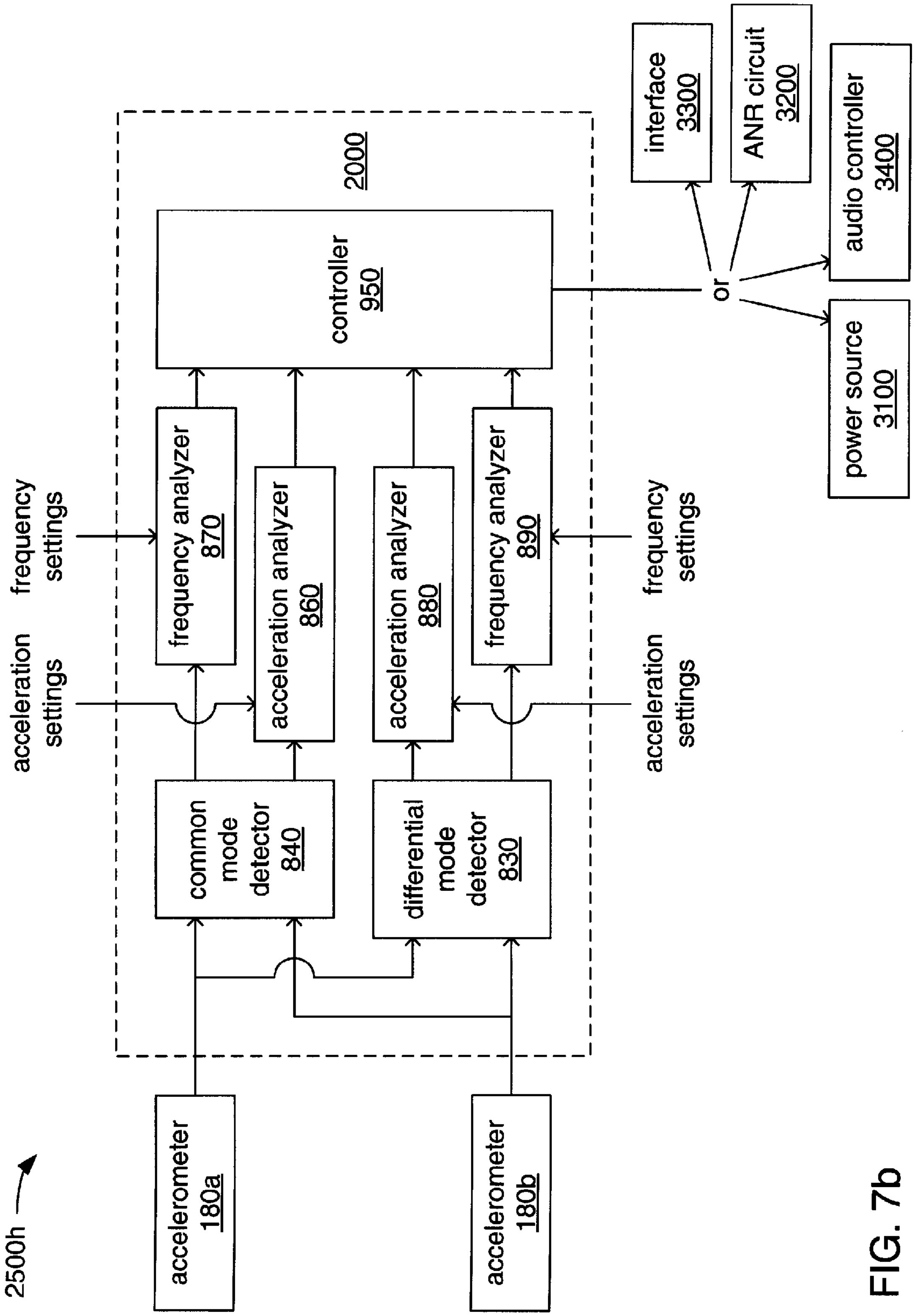

FIG. 7*b* depicts a possible electrical architecture 2500*h* of the control circuit 2000 usable in either of the personal acoustic devices 1000*a* and 1000*b* incorporating at least the pair of accelerometers 180*a* and 180*b*. In employing the electrical architecture 2500*h*, the control circuit 2000 incorporates one or more of a differential mode detector 830, a common mode detector 840, an acceleration analyzer 860, a frequency analyzer 870, an acceleration analyzer 880 and a frequency analyzer 890, along with the controller 950, which are interconnected to analyze characteristics of movement detected by the pair of accelerometers 180*a* and 180*b* as accelerations along one or more axes. Both of the accelerometers 180*a* and 180*b* output signals representative of the accelerations that each detects to whichever ones of the differential mode detector 830 and the common mode detector 840 are present.

The differential mode detector 830 compares the accelerations detected along the various axes to which the accelerometers 180*a* and 180*b* are structured to be sensitive, and outputs a signal indicative of differences in those detected accelerations to whichever ones of the acceleration analyzer 880 and the frequency analyzer 890 are present. The common mode detector 840 compares those same accelerations detected along those same axes, and outputs a signal indicative of accelerations found to be common to the accelerations detected by both of the accelerometers 180*a* and 180*b* to whichever ones of the acceleration analyzer 860 and the frequency analyzer 870 are present. In other words, the differential mode detector 830 and the common mode detector 840 function to distinguish differential mode accelerations from common mode accelerations. In so doing, the differential mode detector 830 and the common mode detector 840 function to distinguish differential mode movement experienced at the locations of the accelerometers 180*a* and 180*b* from common mode movement.

The acceleration analyzer 860 analyzes the accelerations along one or more axes indicated in the signal output of the common mode detector 840 to have been detected by both of the accelerometers 180*a* and 180*b*. This analysis includes a comparison of the common mode accelerations and/or changes in common mode acceleration to one or more acceleration values set through acceleration settings that are provided to the acceleration analyzer 860. As has been previously discussed, common mode accelerations are likely to be translational accelerations that are indicative of influences other than head movements caused by a user. In spite of this presumption that translational accelerations are less likely to have been caused by movements of a user, especially head movements, it is important to reiterate that it is possible for the accelerometers 180*a* and 180*b* to be subjected to accelerations arising from both a user head movement and another influence. Returning to the example of the personal acoustic device in a moving vehicle, if the personal acoustic device is in position on the head of a user in the moving vehicle, then the accelerometers 180*a* and 180*b* would detect both common mode accelerations arising from vehicle movements and differential mode accelerations arising from the user's head movements. While the controller 950 would likely normally ignore indications of the common mode accelerations and employ the indications of the differential mode accelerations in determining that the personal acoustic device is in position on the user's head, there could (at some other time) be an indication of a common mode acceleration that necessarily could only be detected if the personal acoustic device had been removed from the user's head and placed somewhere within the moving vehicle. Such an indication of a common mode acceleration might be an acceleration consistent with the personal acoustic device being dropped and/or might be a rate of change in acceleration that is high enough and that occurs over a short enough period of time to be consistent with the personal acoustic device hitting a floor or other hard surface after having been dropped. The controller 950 may take either of such indications as a basis on which to immediately determine that the personal acoustic device is not in position on a user's head, because it is highly unlikely to still be on a user's head if it is either falling or hitting a hard surface after having fallen.

The frequency analyzer 870 analyzes the frequencies of any repetitive accelerations detected as occurring along one or more axes indicated in the signal output of the common mode detector 840 to have been detected by both of the accelerometers 180*a* and 180*b*. This analysis includes a comparison of the frequencies of such common mode accelerations to one or more frequency values set through frequency settings that are provided to the frequency analyzer 870. Again, as has been previously discussed, common mode accelerations are likely to be translational accelerations that are indicative of influences other than head movements caused by a user. In spite of this presumption that translational accelerations are less likely to have been caused by movements of a user, especially head movements, some common mode accelerations may actually be an indication of a personal acoustic device being in position on a user's head. By way of example, and as previously discussed, many forms of repetitive muscle movements tend to occur with a frequency roughly within the range of 1 Hz to 2 Hz. Thus, the one or more frequency values may be chosen so that if a repetitive translational acceleration is detected as occurring within that range of frequencies, then it may be possible to regard the detection of that repetitive translational acceleration as an indication that the personal acoustic device is in position on a user's head. In some embodiments, the acceleration analyzer 860 may be employed in conjunction with the frequency analyzer 870 to limit such frequency analysis of repetitive translational accelerations only to vertical repetitive accelerations, by employing acceleration analyzer 860 to determine the direction of gravity (which should be a continuous acceleration of 1G downward) and then performing such frequency analysis only with repetitive accelerations that occur along an axis aligned with the direction of gravity, such as a 1 Hz to 2 Hz repetitive up-and-down movement that would be consistent with a person's head and torso moving up and down as they walk or run.

The acceleration analyzer 880 analyzes the differential mode accelerations along one or more axes indicated in the signal output of the differential mode detector 830. This analysis includes a comparison of the differential mode accelerations and/or changes in differential mode acceleration to one or more acceleration values set through acceleration settings that are provided to the acceleration analyzer 880. As has been previously discussed, given the geometry of the head and neck with a rough approximation of the pivot point N at a location along the spine, differential mode accelerations detected by the accelerometers 180*a* and 180*b* are likely to be rotational accelerations that are indicative of head movements caused by a user. Thus, the comparisons of these differential mode accelerations and/or changes in differential mode acceleration to one or more acceleration values is likely to be performed by the acceleration analyzer 880 in much the same way and for much the same purposes as has been previously discussed with regard to the acceleration analyzer 780, earlier.

The frequency analyzer 890 analyzes the frequencies of any repetitive differential mode accelerations along one or more axes indicated in the signal output of the differential mode detector 830. This analysis includes a comparison of the frequencies of any such repetitive differential mode accelerations to one or more frequency values set through frequency settings that are provided to the frequency analyzer 890. Again, given the geometry of the head and neck with a rough approximation of the pivot point N at a location along the spine, differential mode accelerations detected by the accelerometers 180*a* and 180*b* are likely to be rotational accelerations that are indicative of head movements caused by a user. Thus, such comparisons of frequencies of any such repetitive differential mode accelerations to one or more frequency values is likely to be performed by the frequency analyzer 890 in much the same way and for much the same purposes as has been previously discussed with regard to the frequency analyzer 790, earlier.

It should be noted that despite this general presumption that the detection of differential mode accelerations are likely indicative of rotational movement of the head of a user, there are some possible differential mode accelerations that may be detected that do not correspond to a rotational head movement, and yet, are indicative of a personal acoustic device being in position on a user's head. For example, in embodiments in which the accelerometers 180*a* and 180*b* are positioned on opposite sides of a user's head (e.g., positioned in separate ones of a pair of the ear pieces 100, such as at the points A and C), the accelerometers 180*a* and 180*b* may detect opposing accelerations arising from the structures in which the accelerometers 180*a* and 180*b* are positioned being repeatedly pushed away from each other and allowed to move back towards each other. This may be caused by chewing or other jaw movements of the user related to talking or yawning, as muscles along the sides of the user's head act to move the user's jaw bone. Some of such muscles are positioned alongside the user's skull and in close proximity to the user's ears such that they may press against the ear pieces 100, for example, causing the earpieces 100 to move about as those muscles are flexed with each jaw movement. Where a user is chewing, such flexing and accompanying differential mode accelerations may occur with a cyclic nature, perhaps within the previously discussed range of frequencies of 1 Hz to 2 Hz (or perhaps 1 Hz to either 3 Hz or 4 Hz).

Figure 8B:
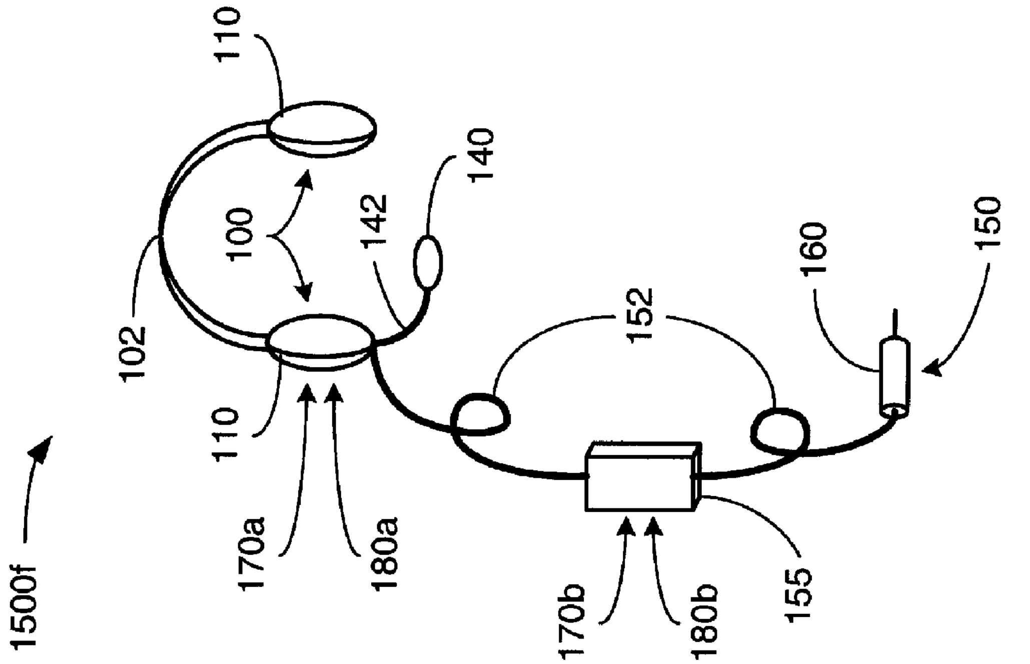
FIGS. 8*a* through 8*c* depict possible physical configurations of personal acoustic devices having two earpieces and a connector for coupling to a vehicle intercom system.
Figure 8A:
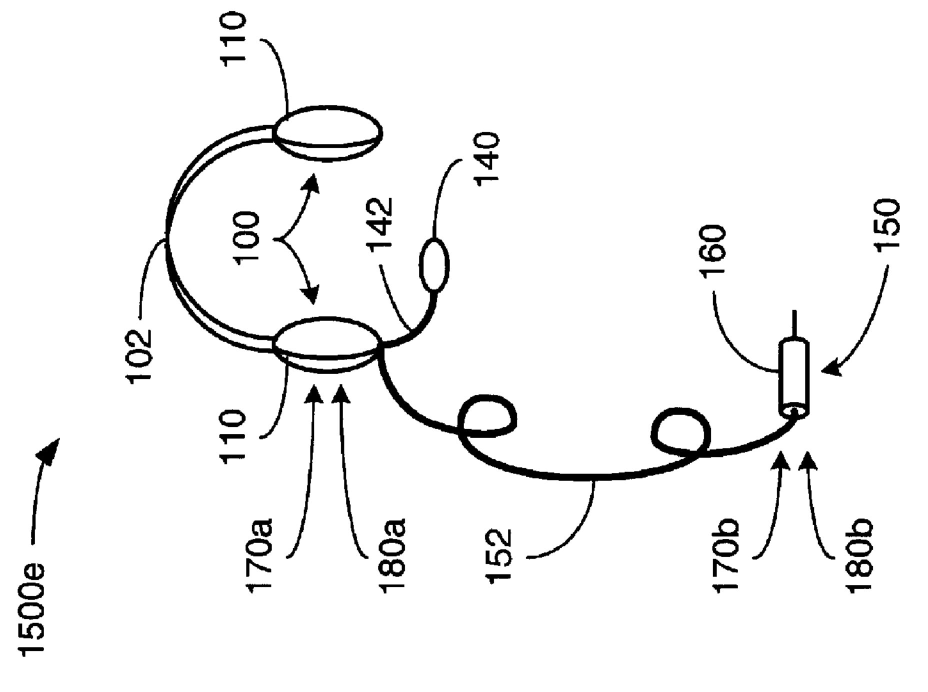

FIG. 8*a* depicts a physical configuration 1500*e* that is substantially similar to the variant of the physical configuration 1500*b* depicted in FIG. 6*c*, but additionally incorporating another casing 160 of a connector 150 that is coupled to the casing 110 of one of the earpieces 100 by a cable 152. Further, although the physical configuration 1500*e* maintains either or both of the accelerometer 180*a* and/or the gyroscope 170*a* within an earpiece 100, one or both of the accelerometer 180*b* and/or the gyroscope 170*b* is positioned within the casing 160.

Separating the pair of gyroscopes 170*a* and 170*b* or separating the pair of accelerometers 180*a* and 180*b* by disposing one each in the casing 110 of an earpiece 100 and the casing 160 enables differential detection of movement, but with the difference that the casing 160 can become physically coupled to the motion of a moving vehicle when the connector 150 is connected to an intercom system of that moving vehicle while the casing 110 may or may not be physically coupled to the head of a user. Thus, one or the other of the gyroscope 170*b* or the accelerometer 180*b* is physically coupled to the movements of the vehicle as a movement reference, while one or the other of the gyroscope 170*a* or the accelerometer 180*a* is physically coupled to the movement of the head of a user when the personal acoustic device is in position on the user's head. In this way, a form of differential detection of movement is created in which differences in movement are in reference to the vehicle's movement, rather than an inertial reference.

Where the pair of accelerometers 180*a* and 180*b* are incorporated into a personal acoustic device that employs the physical configuration 1500*e*, many of the techniques already discussed with regard to variants of the physical configurations 1500*a-d* that analyze accelerations detected by these accelerometers to determine whether a personal acoustic device is in position on a user's head may still be used with the physical configuration 1500*e*, although likely with some modifications. However, while the accelerometers 180*a* and 180*b* were positioned within the physical configurations 1500*a-d* such that it was possible to presume that their coordinate systems were aligned, such a presumption is not possible where these two accelerometers are disposed in the separate casings of the physical configuration 1500*e* with only a flexible cable coupling them. In other words, there is nothing in the structure of the physical configuration 1500*e* that ensures that the coordinate systems of the accelerometers 180*a* and 180*b* are aligned.

Where the pair of gyroscopes 170*a* and 170*b* are incorporated into a personal acoustic device that employs the physical configuration 1500*e*, a mixture of the previously described techniques of employing the single gyroscope 170*a* and the previously described techniques employing the pair of the accelerometers 180*a* and 180*b* may be used to analyze detected movement, as will be described in greater detail. However, again, with these two gyroscopes disposed within the separate casings of the physical configuration 1500*e* connected only by a cable, there can be no presumption that the coordinate systems of these two gyroscopes are in any way aligned.

FIG. 8*b* depicts a physical configuration 1500*f* that is similar to the physical configuration 1500*e*, but additionally incorporating yet another casing 155 positioned along the cable 152 between the casing 160 of the connector 150 and the casing 110 of the earpiece 100 to which the cable 152 is coupled. The physical configuration 1500*f* also differs from the physical configuration 1500*e* in that whichever ones of the gyroscope 170*b* and the accelerometer 180*b* that are present are located within the casing 155 along the cable 152, instead of within the casing 160 at the location of the connector 150.

This positioning of one or both of the gyroscope 170*b* or the accelerometer 180*b* within the casing 155 still provides some degree of physical coupling of one or both of the gyroscope 170*b* or the accelerometer 180*b* to the motion of a moving vehicle when the connector 150 is connected to an intercom system of that vehicle. However, the location of the casing 155 along the length of the cable 152 also provides some degree of physical coupling of one or both of these movement detectors to the head of a user at times when a personal acoustic device employing the physical configuration 1500*f* is in position on the user's head.

It should be noted that the positioning of one or both of the gyroscope 170*b* or the accelerometer 180*b* within the casing 155 enables movements of the user other than their head movements to also be relied upon in determining whether or not a personal acoustic device employing the physical configuration 1500*f* is in position on that user's head. In short, with at least the one earpiece 100 to which the cable is 152 is coupled being in position on the user's head, and with the casing 160 being physically coupled to a portion of a vehicle by the connector 150 being connected to a vehicle intercom system, the user's head is effectively tethered to a portion of the vehicle. Therefore, movement of the user's body within the vehicle that causes the user's head to be moved from one portion of the vehicle to another (e.g., such as the user changing seats within the vehicle) will likely be detected as a result of the likely movement of the casing 155 as a portion of the cable 152 follows the user's body. Thus, movements made by the user other than head movements can also result in detectable movements that can be attributed to the user, instead of other influences.

Not unlike head movements, movements of the cable 152 caused by the user moving about within a vehicle are likely to be more rotational in nature than translational. This is because the cable 152 can be roughly regarded as extending between two pivot points, namely the point where the cable is coupled to the casing 160 of the connector 150 and the point where the cable is coupled to the casing 110 of an earpiece 100. Thus, the techniques for analyzing detected rotational movements and/or detected accelerations briefly described as useable with the physical configuration 1500*e* may also be used with the physical configuration 1500*f*, because once again, rotational movements are more indicative of user-initiated movement (even where the user is actually making a translational body move within a vehicle) while translational movements are more indicative of movement brought about by other influences (e.g., movements of the vehicle, itself).

Figure 8C:
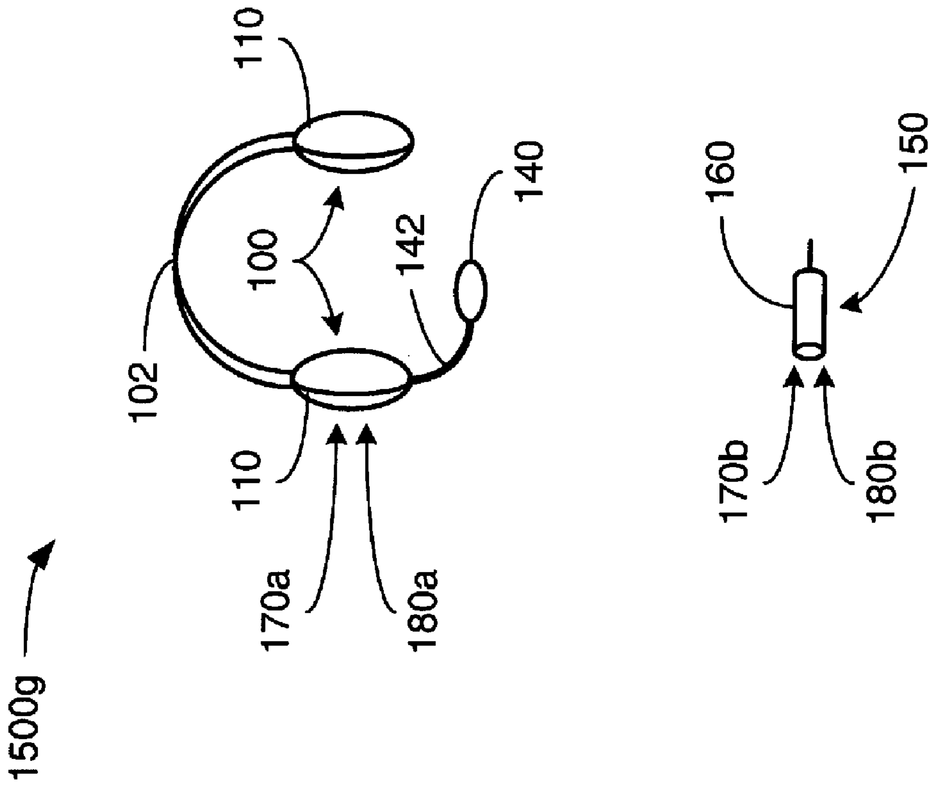

FIG. 8*c* depicts a physical configuration 1500*g* that is substantially similar to the physical configuration 1500*e*, but with a wireless radio frequency and/or optical linkage formed between the casing 160 of the connector 150 and the casing 110 of at least one of the earpieces 100, in place of the cable 152 of the physical configuration 1500*e*.

Figure 9A:
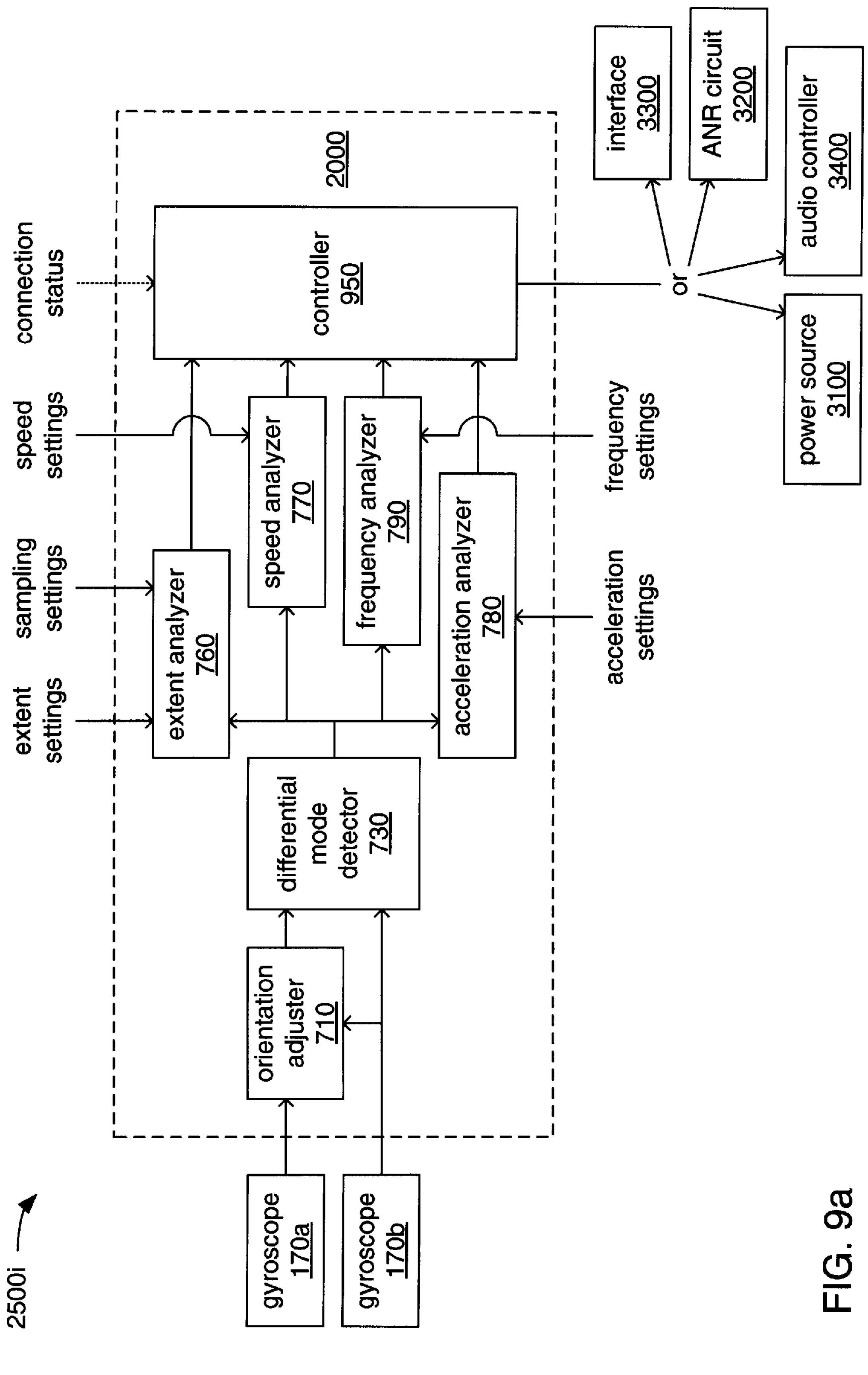
FIGS. 9*a* and 9*b* depict portions of possible electrical architectures of personal acoustic devices in which analyses are made of signals provided by gyroscopes or accelerometers.

FIG. 9*a* depicts a possible electrical architecture 2500*i* of the control circuit 2000 usable in either of the personal acoustic devices 1000*a* and 1000*b* incorporating the pair of gyroscopes 170*a* and 170*b*. As will be explained in greater detail, the electrical architecture 2500*i* is structured to address the use of physical configurations in which it is not possible to presume that the coordinate systems of the gyroscopes 170*a* and 170*b* are in any way aligned (such as any one of the physical configurations 1500*e-g*). Despite the change from supporting only the single gyroscope 170*a* to supporting both of the gyroscopes 170*a* and 170*b*, the electrical architecture 2500*i* is similar in a number of ways to the earlier-described electrical architecture 2500*g*. In employing the electrical architecture 2500*i*, the control circuit 2000 incorporates one or more of an orientation adjuster 710, a differential mode detector 730, the extent analyzer 760, the speed analyzer 770, the acceleration analyzer 780 and the frequency analyzer 790, along with the controller 950, which are interconnected to analyze differences in characteristics of rotational movement detected by each of the gyroscopes 170*a* and 170*b*.

Each of the gyroscopes 170*a* and 170*b* outputs a signal indicative of rotational movement that each detects about one or more axes. However, while the gyroscope 170*b* directly outputs its signal to the differential mode detector 730, the gyroscope 170*a* outputs its signal to the orientation adjuster 710. The orientation adjuster 710 also receives the output of the gyroscope 170*b*, and analyzes similarities between the rotational movements detected by each of these gyroscopes at intervals to repeatedly derive how the orientation of the coordinate system of the gyroscope 170*a* differs from the orientation of the coordinate system of the gyroscope 170*b*. The orientation adjuster 710 may average the indications of rotational movement from each of the gyroscopes 170*a* and 170*b* over a period of time (perhaps seconds, or up to a minute) to derive the difference in orientation of their two coordinate systems so as to counteract relatively spurious changes of the orientation of one of these coordinate systems relative to another. Next, the orientation adjuster 710 employs this derived difference as the basis of a transform to which the rotational movements indicated in the signal output by the gyroscope 170*a* are subjected to create a modified indication of those movements detected by the gyroscope 170*a*. The orientation adjuster 710 then outputs a signal to the differential mode detector 730 that provides that modified indication of those movements.

The differential mode detector 730 compares the detected rotational movements (now having aligned coordinate systems), and outputs a signal indicative of differences in those detected rotational movements (i.e., an indication of differential mode rotational movement) to whichever ones of the extent analyzer 760, the speed analyzer 770, the acceleration analyzer 780 and the frequency analyzer 790 are present. In other words, the differential mode detector 730 separates differential mode rotational movements from any common mode rotational movements detected by the gyroscopes 170*a* and 170*b*. Alternatively and/or in addition to incorporating and using the differential mode detector 730 to provide an indication of differences in detected rotational movements, the orientation adjuster 710 may output a signal indicative of changes in the derived difference in orientation of the coordinate systems of the gyroscopes 170*a* and 170*b*, perhaps specifying changes in the transform. Where the orientation adjuster 710 employs averaging and/or other techniques in deriving differences in orientation that tend to filter out spurious orientation changes, the outputting of a signal by the orientation adjuster 710 indicating changes in differences in orientation may be deemed a desirable way to filter out erroneous indications of differential mode rotational movement.

The extent analyzer 760 analyzes the amount of differential mode rotation detected by the pair of gyroscopes 170*a* and 170*b*. Again, the extent analyzer 760 may be structured to confine such analysis to the amount of differential mode rotation detected as occurring within a predetermined recurring sampling period, the length of which is set through sampling settings provided to the extent analyzer 760. This analysis includes a comparison of the detected amount of differential mode rotational movement to one or more rotation extent values set through extent settings that are also provided to the extent analyzer 760. Again, a required minimum extent of differential mode rotational movement may be specified (i.e., a minimum rotation extent value) to filter out erroneous indications of differential mode rotational movement (especially where no output of the orientation adjuster is being employed to do so) and/or as an aid to separating detected differential mode rotational movements caused by a user from detected differential mode rotational movements caused by other influences.

Also, a maximum rotation extent value may be specified as an aid to separating detected differential mode rotational movements caused by a user from detected differential mode rotational movements caused by other influences based on known physiological limits of the extent a person can move their head relative to their torso. However, where a personal acoustic device employs the physical configuration 1500*f*, there may be difficulties with specifying a maximum extent of differential mode rotational movement for use in distinguishing detected movements of a user from detected movements caused by other influences due to the positioning of the gyroscope 170*b* within the casing 155 positioned along the length of the cable 152. Specifically, at a time when the user moves about within a vehicle in a way that causes their head to rotate in one direction, it is possible that the casing 155 may be moved about in a manner in which it rotates in an opposing direction such that the resulting difference in extents of rotation creates a differential mode extent of rotation signaled to the extent analyzer 760 that exceeds a specified maximum extent of differential mode rotational movement, and is therefore deemed to be humanly impossible. Thus, where the physical configuration 1500*f* is employed, either a much larger maximum extent of rotation may need to be specified, or it may be preferable to not attempt to specify such a maximum value.

The speed analyzer 770 analyzes the speed of the differential mode rotational movement derived by the differential mode detector 730 from the rotational movements detected by the pair of gyroscopes 170*a* and 170*b*. This analysis includes a comparison of the detected differential mode speed of rotation to one or more rotation speed values set through speed settings that are provided to the speed analyzer 770. Among the rotation speed values may be a minimum differential mode rotation speed value that must be indicated as having been detected in the signal output by the differential mode detector 710 before that indication of differential mode rotational movement will be accepted as valid indication of differential mode rotational movement, at all, or before an indication of differential mode rotational movement will be accepted as having been caused by a head movement on the part of a user.

Also, a maximum differential mode rotation speed value may be selected to attempt to separate differential mode rotational movements caused by a head movement from differential mode rotational movements caused by other influences based on known physiological limits of the speed at which a person can move their head relative to their torso. However, again, where a personal acoustic device employs the physical configuration 1500*f*, difficulties may be encountered in specifying a maximum speed of differential mode rotational movement due to the casing 155 being free to rotate in a manner that may create the false appearance that a humanly impossible rotational movement has occurred.

The acceleration analyzer 780 analyzes the accelerations of the differential mode rotational movement derived by the differential mode detector 710 from the rotational movements detected by the gyroscopes 170*a* and 170*b*. This analysis includes a comparison of accelerations and/or changes in acceleration of a differential mode rotational movement to one or more rotation acceleration values set through acceleration settings that are provided to the acceleration analyzer 780. Among the rotation acceleration values may be a minimum rotation acceleration magnitude value or minimum acceleration rate of change value that must be indicated as having been detected in the signal output by the differential mode detector 730 before an indication of rotational movement will be accepted as a valid indication of differential mode rotational movement, at all, or before that indication of differential mode rotational movement will be accepted as having been caused by a head movement on the part of a user. Also, a maximum rotation acceleration value may be selected to attempt to separate rotational movements caused by a head movement from rotational movements caused by other influences based on known physiological limits of the speed at which the head can be moved.

Again, where a personal acoustic device employs the physical configuration 1500*f*, difficulties may be encountered in specifying a maximum acceleration of differential mode rotational movement due to the casing 155 being free to rotate in a manner that may create the false appearance that a humanly impossible rotational movement has occurred. However, the electrical architecture 2500*i* may be altered slightly to enable the acceleration analyzer 780 to directly monitor the signal received from the gyroscope 170*a* for an indication of a rate of change in rotational acceleration detected by the gyroscope 170*a* that is higher than what is humanly possible for a user to produce with such a personal acoustic device in position on the user's head. Such a high rate of change in rotational acceleration detected by the gyroscope 170*a* would be more indicative of a personal acoustic device dangling at one end of the cable 152 and bumping into an object within a vehicle, or of a personal acoustic device being allowed to freely slide and fall about the interior of a vehicle in motion such that it bumps into a portion of the vehicle as the vehicle moves about.

The frequency analyzer 790 analyzes the frequencies of any cyclic accelerations of the differential mode rotational movement derived by the differential mode detector 730 from the rotational movements detected by the gyroscopes 170*a* and 170*b*. The frequency analyzer 790 may be provided with frequency settings specifying at least a maximum frequency value against which derived differential mode rotational movement of a repetitive nature may be compared to determine whether or not the frequency of such movement is of a frequency that is too high to be indicative of muscle movements of a user.

Although the operation of the electrical architecture 2500*i* in a personal acoustic device adopting one of the physical configurations 1500*e* or 1500*f* has just been presented in considerable detail, it should be noted that the electrical architecture 2500*i* could be beneficially employed in a personal acoustic device adopting the variant of the physical configuration 1500*a* that is depicted in FIG. 6*b*, especially where the pair of accelerometers 180*a* and 180*b* are disposed in the casings 110 of the earpieces 100. Again, in the variant of the physical configuration 1500*a* depicted in FIG. 6*b*, the casings 110 of the earpieces 100 are coupled to the ends of the band 102 with swiveling connections permitting the casings 110 to be rotated relative to the ends of the band 102. As previously discussed, in such a situation, it is not possible to rely on the orientations of the accelerometers 180*a* and 180*b* to be aligned, and thus, the ability of the electrical architecture 2500*i* to accommodate unpredictable differences in alignment of orientations between the accelerometers 180*a* and 180*b* would be useful. Further, the ability of the control circuit 2000, when implementing the electrical architecture 2500*i*, to derive the difference in orientation between the accelerometers 180*a* and 180*b* may be useful in detecting instances of when the casings 110 of the earpieces 100 have each been rotated such that it is not possible for the cavities 112 defined by the casings 110 to both be acoustically coupled to ear canals of a user. By way of example, such a personal acoustic device may be accompanied by a storage or carrying case (not shown) in which the personal acoustic device is stored with the casings 110 rotated so that both of the cavities 112 face a common wall of such a case to enable more compact storage of the personal acoustic device within it. Where, in deriving differences in orientation between the accelerometers 180*a* and 180*b*, a difference in orientation is derived that is consistent with the casings 110 having been rotated in this manner, the controller 950 may respond to the receipt of an indication of such a difference by immediately determining that such a personal acoustic device is not in position on a user's head, and therefore, immediately cause such a personal acoustic device to enter a lower power mode and/or to take other possible actions, as have previous been detailed at length.

Figure 9B:
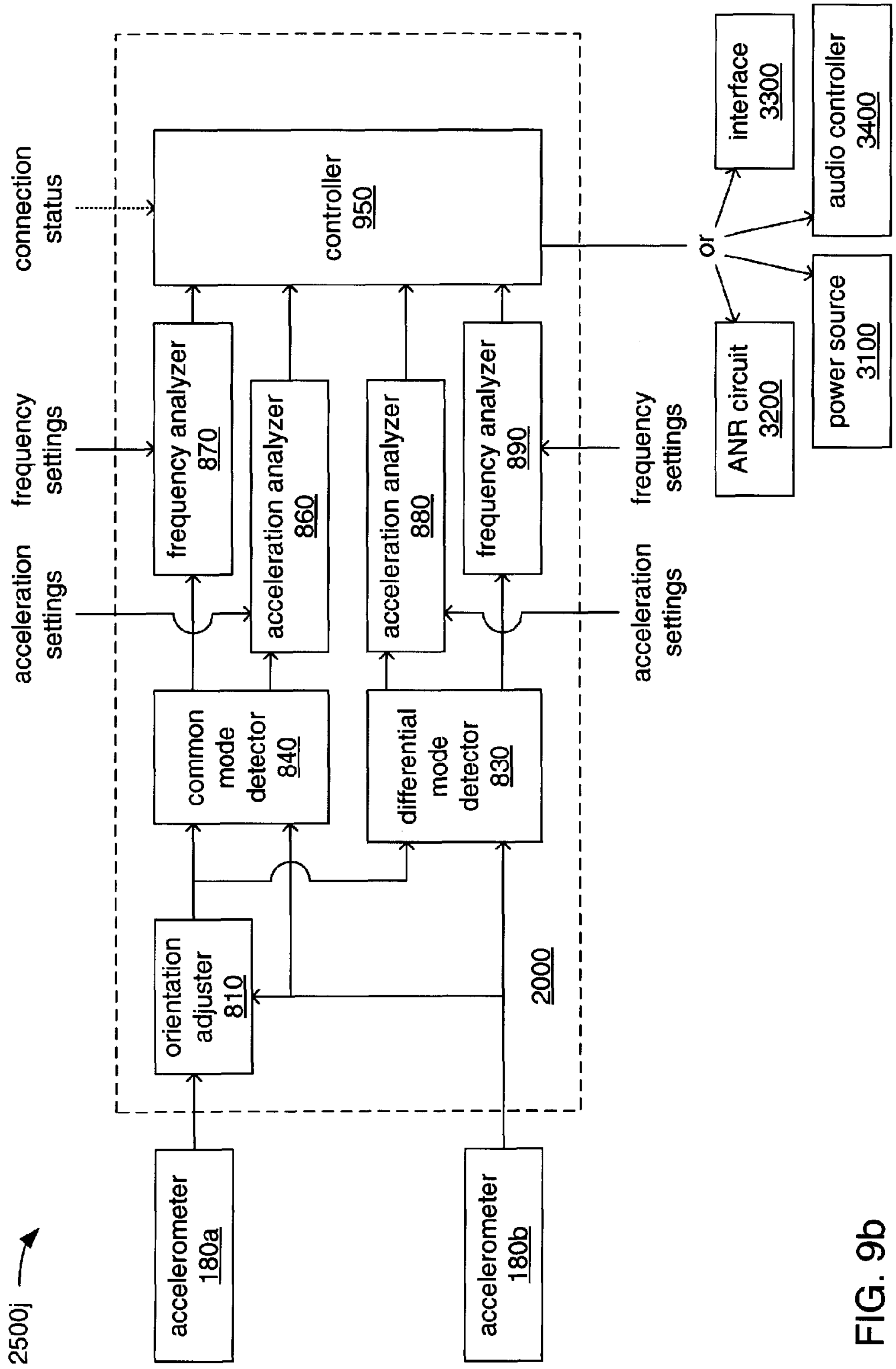

FIG. 9*b* depicts a possible electrical architecture 2500*j* of the control circuit 2000 usable in either of the personal acoustic devices 1000*a* and 1000*b* incorporating at least the pair of accelerometers 180*a* and 180*b*. As will be explained in greater detail, the electrical architecture 2500*j* is structured to address the use of physical configurations in which it is not possible to presume that the coordinate systems of the accelerometers 180*a* and 180*b* are in any way aligned (such as any one of the physical configurations 1500*e-g*). Despite this change, the electrical architecture 2500*j* is similar in a number of ways to the earlier-described electrical architecture 2500*h*. In employing the electrical architecture 2500*j*, the control circuit 2000 incorporates one or more of an orientation adjuster 810, the differential mode detector 830, the common mode detector 840, the acceleration analyzer 860, the frequency analyzer 870, the acceleration analyzer 880 and the frequency analyzer 890, along with the controller 950, which are interconnected to analyze characteristics of movement detected by the pair of accelerometers 180*a* and 180*b* as accelerations along one or more axes.

Each of the accelerometers 180*a* and 180*b* outputs a signal indicative of accelerations that each detects along one or more axes. However, while the accelerometer 180*b* directly outputs its signal to the differential mode detector 830, the accelerometer 180*a* outputs its signal to the orientation adjuster 810. The orientation adjuster 810 also receives the output of the accelerometer 180*b*, and analyzes similarities between the accelerations detected by each of these accelerometers at intervals to repeatedly derive how the orientation of the coordinate system of the accelerometer 180*a* differs from the orientation of the coordinate system of the accelerometer 180*b*. In some embodiments, the orientation adjuster 810 may identify the directions in which each of the accelerometers 180*a* and 180*b* detect the constant downward 1G acceleration caused by Earth's gravity in deriving how the difference between these coordinate systems. The orientation adjuster 810 may average the indications of acceleration from each of the accelerometers 180*a* and 180*b* over a period of time (perhaps seconds, or up to a minute) to derive the difference in orientation of their two coordinate systems so as to counteract relatively spurious changes of the orientation of one of these coordinate systems relative to another. Next, the orientation adjuster 810 employs this derived difference as the basis of a transform to which the accelerations indicated in the signal output by the accelerometer 180*a* are subjected to create a modified indication of those accelerations detected by the accelerometer 180*a*. The orientation adjuster 810 then outputs a signal to the differential mode detector 830 and the common mode detector 840 that provides that modified indication of those accelerations.

The differential mode detector 830 compares the accelerations detected by the accelerometers 180*a* and 180*b*, and outputs a signal indicative of differences in those detected accelerations (i.e., differential mode accelerations) to whichever ones of the acceleration analyzer 880 and the frequency analyzer 890 are present. The common mode detector 840 compares those same accelerations, and outputs a signal indicative of accelerations found to be common to the accelerations detected by both of the accelerometers 180*a* and 180*b* (i.e., common mode accelerations) to whichever ones of the acceleration analyzer 860 and the frequency analyzer 870 are present. In other words, just as in the case of the electrical architecture 2500*h*, the differential mode detector 830 and the common mode detector 840 function to distinguish differential mode accelerations from common mode accelerations. Alternatively and/or in addition to incorporating and using the differential mode detector 830 to provide an indication of differences in detected accelerations, the orientation adjuster 810 may output a signal indicative of changes in the derived difference in orientation of the coordinate systems of the accelerometers 180*a* and 180*b*, perhaps specifying changes in the transform. Where the orientation adjuster 810 employs averaging and/or other techniques in deriving differences in orientation that tend to filter out spurious orientation changes, the outputting of a signal by the orientation adjuster 810 indicating changes in differences in orientation may be deemed a desirable way to filter out erroneous indications of differential mode accelerations.

The acceleration analyzer 860 analyzes the accelerations indicated in the signal output of the common mode detector 840 to have been detected by both of the accelerometers 180*a* and 180*b* (i.e., common mode accelerations). This analysis includes a comparison of the common mode accelerations and/or changes in common mode acceleration to one or more acceleration values set through acceleration settings that are provided to the acceleration analyzer 860. Again, as previously discussed, common mode accelerations are likely to be translational accelerations that are indicative of influences other than head movements caused by a user. Indeed, some common mode accelerations and/or rates of change in common mode accelerations may be indicative of a circumstance that could only arise if a personal acoustic device is not in position on a user's head (as opposed to common mode accelerations that could conceivably occur either while a personal acoustic device is in position on a user's head, or not), such as a personal acoustic device being dropped and/or hitting a floor or other hard surface. The controller 950 may take an indication from the acceleration analyzer 860 of such an acceleration or rate of change in acceleration as a basis on which to immediately determine that the personal acoustic device is not in position on a user's head.

The frequency analyzer 870 analyzes the frequencies of any repetitive common mode accelerations indicated in the signal output of the common mode detector 840 to have been detected by both of the accelerometers 180*a* and 180*b*. This analysis includes a comparison of the frequencies of such common mode accelerations to one or more frequency values set through frequency settings that are provided to the frequency analyzer 870. Again, as has been previously discussed, common mode accelerations are likely to be translational accelerations that are more likely indicative of influences other than head movements caused by a user (e.g., caused by a moving vehicle, rather than head movements of a user within that vehicle).

The acceleration analyzer 880 analyzes the differential mode accelerations indicated in the signal output of the differential mode detector 830. This analysis includes a comparison of the differential mode accelerations and/or changes in differential mode acceleration to one or more acceleration values set through acceleration settings that are provided to the acceleration analyzer 880. As has been previously discussed, given the geometry of the head and neck with a rough approximation of the pivot point N at a location along the cervical portion of the spine, differential mode accelerations detected by the accelerometers 180*a* and 180*b* are likely to be rotational accelerations that are indicative of head movements caused by a user. Thus, the comparisons of these differential mode accelerations and/or changes in differential mode acceleration to one or more acceleration values is likely to be performed by the acceleration analyzer 880 in much the same way and for much the same purposes as has been previously discussed with regard to the acceleration analyzer 780, earlier.

The frequency analyzer 890 analyzes the frequencies of any repetitive differential mode accelerations indicated in the signal output of the differential mode detector 830. This analysis includes a comparison of the frequencies of any such repetitive differential mode accelerations to one or more frequency values set through frequency settings that are provided to the frequency analyzer 890. Again, given the geometry of the head and neck with a rough approximation of the pivot point N at a location along the cervical portion of the spine, differential mode accelerations detected by the accelerometers 180*a* and 180*b* are likely to be rotational accelerations that are indicative of head movements caused by a user. Thus, such comparisons of frequencies of any such repetitive differential mode accelerations to one or more frequency values is likely to be performed by the frequency analyzer 890 in much the same way and for much the same purposes as has been previously discussed with regard to the frequency analyzer 790, earlier.

Looking back at both of the electrical architectures 2500*i* and 2500*j*, the manner in which the controller 950 responds to these various analyses of movement may be altered by receipt of an indication of whether or not the connector 150 is actually coupled to a vehicle intercom system, or not. By way of example, where the controller 950 attributes weighting values to results of various analyses of movement, the controller 950 may alter the weighting values assigned to those results to generally cause a determination that a personal acoustic device is not in position to be more likely at times when the connector 150 is not coupled to a vehicle intercom system, and may alter the weighting values to generally cause a determination that the same personal acoustic device is in position to be more likely at times when the connector is so coupled. By way of another example, where a pair of gyroscopes are used in the manner discussed in reference to the electrical architecture 2500*i*, an indication that the connecter 150 is not coupled to a vehicle intercom system may cause the control circuit 2000 to alter the manner in which analysis of movement is carried out to ignore which one of the gyroscopes is disposed with in the casing 160, and to analyze the indications of movement provided by the other gyroscope in a manner not unlike what has been described with regard to the electrical architecture 2500*g*.

It should be noted that although specific electrical architectures 2500*g-j* have been presented with considerable detail, other variations in electrical architectures are possible in which characteristics of movement, including one or both of differential mode and common mode characteristics of movement, are analyzed to distinguish movement caused by a user (especially, head movement) from movement caused by other influences (especially, vehicular movement), and which would be within the scope of what is described and claimed herein. Regardless of the exact nature in which various analyses are performed on indications of acceleration and/or rotational movement, the controller 950 receives and employs at least these indications in making a determination of whether or not a personal acoustic device is in position on a user's head.

Not unlike what has been previously discussed with regard to the electrical architectures 2500*a-f*, the controller 950 may be provided with one or more timing settings that govern the manner in which the controller 950 determines the current operating state of the entirety of a personal acoustic device. By way of example, the controller 950 may be provided with a specified period of time in which to wait following receiving any indication of an acceleration or rotational movement having characteristics indicative of the personal acoustic device being in position on a user's head before determining that the personal acoustic device is no longer so positioned, and causing the personal acoustic device to enter a low power mode.

In some embodiments, the controller 950 may attribute various weighting values to one or more of such indications. By way of example, receipt of an indication of the detection of a common mode acceleration by the pair of accelerometers 180*a* and 180*b* or an indication of the detection of a rate of change in rotational acceleration by the gyroscope 170*a* that is consistent with a personal acoustic device being dropped and/or hitting a floor or hard surface such that it is highly unlikely to be in position on a user's head may be given greater weight or otherwise given higher priority in determining whether the personal acoustic device is in position, or not, over other indications of other accelerations or rotational movements that may have been detected. In response to the receipt of such a higher priority indication, the controller 950 may immediately act on the presumption that a personal acoustic device is not in position by immediately causing the personal acoustic device to enter into a lower power mode.

In some embodiments, the controller 950 may receive indications concerning whether or not a personal acoustic device is in position based on a combination of analyses of detected sound and analyses of detected movement. By way of example, and although not specifically shown, the controller 950 may receive signals from both the adaptive filter 920 indicating results of comparisons of sounds detected by the inner microphone 120 and the outer microphone 130, and from one or more movement sensors (i.e., one or more of the gyroscopes 170*a* and 170*b* and/or one or more of the accelerometers 180*a* and 180*b*). It is likely that the use of different ones of the microphone, the gyroscopes and the accelerometers to determine whether a personal acoustic device is in position, or not, will consume power at different rates, and where a battery or other limited source of power is employed, it may be desirable to use different ones of these approaches to determine whether or not the personal acoustic device is in position based on a current power mode.

More specifically, and referring again to FIG. 4, as a personal acoustic device enters a deeper power mode at 550, one or both of the accelerometers 180*a* and 180*b* or one or both of the gyroscopes 170*a* and 170*b* may be monitored on a recurring basis for an indication of a differential mode acceleration or a rotational movement (whether of a differential mode, or not) attributable to the personal acoustic device once again being in position on a user's head. This may be done in place of comparing sounds detected by the inner microphone 120 and the outer microphone 130 in recognition of the accelerometers 180*a* and 180*b* (or the gyroscope(s) 170*a* and/or 170*b*) possibly consuming less power. Further, the fact that gyroscopes generally require the constant consumption of energy to keep a mass spinning or vibrating as an inertial reference is likely to result in a gyroscope consuming more energy than an accelerometer, which may make the use of one or more accelerometers preferable to the use of a gyroscope. Very likely, the use of either gyroscopes or accelerometers will consume less power than driving the acoustic driver 190 to output a sound to be detected by the inner microphone 120 for analysis of whether there is acoustic coupling to an ear canal, or not.

Upon the controller 950 receiving an indication at 565 through use of the accelerometers 180*a* and 180*b* (or the gyroscope(s) 170*a* and/or 170*b*) that the personal acoustic device is once again in position on the user's head, the controller 950 causes the personal acoustic device to enter normal power mode at 520. Once in normal power mode, the controller 950 may switch to analyzing the difference between the sounds detected by the inner microphone 120 and the outer microphone 130 of each one of a pair of the earpieces 100 to test whether or not the personal acoustic device is still in position. Indeed, in variants of personal acoustic devices that are structured to provide a combination of feedforward-based and feedback-based ANR, it may be deemed desirable to switch to employing an analysis of sounds detected by these microphones since the microphones will already be in use, and the analysis of the differences in sounds detected by each can be incorporated into the other analyses of sounds already underway during a normal power mode to provide ANR. Further, the presence of separate sets of the inner microphone 120 and the outer microphone 130 in each one of the earpieces 100 enables separate detection of whether or not each of the earpieces 100 is in position adjacent one of the user's ears. Thus, during a normal power mode, separate comparisons of sounds employed for each earpiece 100 may be used to provide indications to the controller 950 as to whether one or more functions need be discontinued for one of the earpieces 100 while still being provided to the other of the earpieces 100.

Alternatively, the controller 950 may employ only the accelerometers 180*a* and 180*b* (if present) and/or one or both of the gyroscopes 170*a* and 170*b* (if present) to determine whether or not a personal acoustic device is in position during normal power mode, leaving the inner microphone 120 and the outer microphone 130 to be employed solely for the provision of ANR and/or other audio functions.

Looking back at the electrical architectures of each of FIGS. 3*a-f*, 7*a-b* and 9*a-b*, it is worth reiterating that the control circuit 2000 may be implemented with a variety of forms of analog and/or digital circuitry, regardless of whether the control circuit 2000 analyzes signals from microphones (as in the case of the electrical architectures 2500*a-f*) or analyzes signals from accelerometers and/or gyroscopes (as in the case of the electrical architectures 2500*g-j*). More specifically, the control circuit 2000 may incorporate separate analog and/or digital components to implement the controller 950, each of the compensators, each of the adaptive filters and each of the analyzers. Alternatively, the control circuit 2000 may be based on a combination of a processing device and a storage that stores a sequence of instructions that when executing by the processing device, causes the processing device to perform the functions of one or more of the compensators, adaptive filters and/or analyzers, and then causes the processing device to determine an operating state, and then to take action in controlling one or more of the power source 3100, the ANR circuit 3200, the interface 330 and the audio controller 3400 and/or to cause entry into a power mode.

More specifically, and by way of example, where the control circuit 2000 is to carry out an analysis of sounds, such as a comparison of sounds detected by the inner microphone 120 and the outer microphone 130, or such as a comparison of sounds detected by the inner microphone 120 and sounds output by the acoustic driver 190, the control circuit 2000 may be implemented with a digital signal processor (DSP). Such a DSP may be of a relatively highly integrated nature such that it incorporates random access memory (RAM) and/or a variant of programmable or erasable read-only memory (ROM) in which is stored a sequence of instructions that when executed by a processing core of the DSP, causes that processing core to implement one or more of the compensators 210, 310 and 410, one or more of the adaptive filters 920 and 940, and/or the controller 950. Such a DSP may further incorporate one or more analog-to-digital converters (DACs) by which analog signals output by one or both of the inner microphone 120 and the outer microphone 130 are converted into digital data. Such a DSP may further incorporate one or more digital interfaces (e.g., digital serial interfaces) by which accelerometers and/or gyroscopes (e.g., one or more of the gyroscopes 170*a* and 170*b* and/or one or more of the accelerometers 180*a* and 180*b*) may provide signals to the DSP indicating detected movement. Such provision of digital inputs may be done to augment the provision of signals from microphones indicating detected sounds, or may be done in lieu of the provision of such signals from microphones.

By way of another example, where the control circuit is to carry out an analysis of indications of detected movement, such as indications of detected movement provided in signals received from one or more of the gyroscopes 170*a* and 170*b* and/or one or more of the accelerometers 180*a* and 180*b*, the control circuit 2000 may be implemented with a microcontroller. Such a microcontroller may incorporate RAM and/or a programmable/erasable form of ROM in which is stored a sequence of instructions that when executed by a processing core of the microcontroller, causes the processing core to implement one or more of the orientation adjusters 710 and 810; one or more of the differential mode detectors 730 and 830; the common mode detector 840; the extent analyzer 760; the speed analyzer 770; one or more of the acceleration analyzers 780, 860 and 880; one or more of the frequency analyzers 790, 870 and 890; and/or the controller 950. Such a microcontroller may further incorporate one or more digital interfaces (e.g., digital serial interfaces) by which accelerometers and/or gyroscopes (e.g., one or more of the gyroscopes 170*a* and 170*b* and/or one or more of the accelerometers 180*a* and 180*b*) may provide signals to the DSP indicating detected movement.

Other implementations are within the scope of the following claims and other claims to which the applicant may be entitled.

The invention claimed is:

1. A personal acoustic device comprising:

a first casing structured to be positioned adjacent an ear of a user;

a second casing structured to be positioned away from both ears of the user;

a first movement sensor disposed on a portion of the personal acoustic device that includes the first casing and that is structured to be worn on the user's head to enable the first movement sensor to detect movements of the user's head at a time when the personal acoustic device is in position on the user's head such that the first casing is adjacent an ear of the user;

a second movement sensor disposed on the second casing to provide a reference against which to compare movements detected by the first movement detector; and a control circuit coupled to the first and second movement sensors, and structured to:

receive a first signal from the first movement sensor indicating a detected movement of the portion;

receive a second signal from the second movement sensor indicating a detected movement of the second casing;

distinguish a differential mode movement between the detected movement of the portion and the detected movement of the second casing from a common mode movement;

analyze a characteristic of the differential mode movement to determine whether the differential mode movement indicates a movement of the user's head relative to the reference caused by the user; and determine that the personal acoustic device is in position on the user's head in response to determining that the differential mode movement indicates a movement of the user's head relative to the reference caused by the user;

further comprising a connector disposed on the second casing to couple the personal acoustic device to an intercom system of a vehicle such that the reference comprises the vehicle at times when the connector is coupled to the intercom system.

2. The personal acoustic device of claim 1, wherein the control circuit is further structured to determine that the personal acoustic device is not in position on the user's head in response to there being no differential mode movements determined to indicate a movement of the user's head relative to the reference caused by the user for a predetermined period of time.

3. The personal acoustic device of claim 1, further comprising a cable coupling the portion and the second casing, and conveying an audio signal between the portion and the second casing.

4. The personal acoustic device of claim 1, wherein the portion and the second casing are coupled through wireless linkage by which an audio signal is conveyed between the portion and the second casing.

5. A personal acoustic device comprising:

a first casing structured to be positioned adjacent an ear of a user;

a second casing structured to be positioned away from both ears of the user;

a first movement sensor disposed on a portion of the personal acoustic device that includes the first casing and that is structured to be worn on the user's head to enable the first movement sensor to detect movements of the user's head at a time when the personal acoustic device is in position on the user's head such that the first casing is adjacent an ear of the user;

a second movement sensor disposed on the second casing to provide a reference against which to compare movements detected by the first movement detector; and a control circuit coupled to the first and second movement sensors, and structured to:

receive a first signal from the first movement sensor indicating a detected movement of the portion;

receive a second signal from the second movement sensor indicating a detected movement of the second casing;

distinguish a differential mode movement between the detected movement of the portion and the detected movement of the second casing from a common mode movement;

analyze a characteristic of the differential mode movement to determine whether the differential mode movement indicates a movement of the user's head relative to the reference caused by the user; and determine that the personal acoustic device is in position on the user's head in response to determining that the differential mode movement indicates a movement of the user's head relative to the reference caused by the user;

further comprising:

a cable having a first end that is coupled to the first portion and along which the second casing is disposed; and a connector coupled to a second end of the cable to couple the personal acoustic device to an intercom system of a vehicle such that the reference comprises the location of the second casing along the length of the cable at times when the connector is coupled to the intercom system.

6. A personal acoustic device comprising:

a first casing structured to be positioned adjacent an ear of a user;

a second casing structured to be positioned away from both ears of the user;

a first movement sensor disposed on a portion of the personal acoustic device that includes the first casing and that is structured to be worn on the user's head to enable the first movement sensor to detect movements of the user's head at a time when the personal acoustic device is in position on the user's head such that the first casing is adjacent an ear of the user;

a second movement sensor disposed on the second casing to provide a reference against which to compare movements detected by the first movement detector; and a control circuit coupled to the first and second movement sensors, and structured to:

receive a first signal from the first movement sensor indicating a detected movement of the portion;

receive a second signal from the second movement sensor indicating a detected movement of the second casing;

distinguish a differential mode movement between the detected movement of the portion and the detected movement of the second casing from a common mode movement;

analyze a characteristic of the differential mode movement to determine whether the differential mode movement indicates a movement of the user's head relative to the reference caused by the user; and determine that the personal acoustic device is in position on the user's head in response to determining that the differential mode movement indicates a movement of the user's head relative to the reference caused by the user;

further comprising a connector disposed on the second casing to couple the personal acoustic device to an intercom system of a vehicle, wherein the control circuit is further structured to:

receive an indication of whether the connector is coupled to an intercom system of a vehicle; and alter a manner in which the control circuit determines that the personal acoustic device is in position on the user's head in response to the indication of whether the connector is coupled to an intercom system.

7. The personal acoustic device of claim 6, wherein the control circuit is further structured to:

analyze the detected movement of the portion and the detected movement of the second casing over a recurring interval of time to derive differences in orientation between the first and second movement sensors; and employ the derived differences in orientation between the first and second movement sensors to create a transform by which indications of detected movement of one of the portion and the second casing are altered to align the orientations of indications of detected movement of the portion and the second casing in preparation for other analysis.

8. The personal acoustic device of claim 7, wherein the control circuit is further structured to monitor the transform for an instance of a change in the transform arising from a change in an orientation in one of the first and second movement sensors to detect movement.

9. The personal acoustic device of claim 6, wherein:

the first movement sensor comprises a first gyroscope;

the second movement sensor comprises a second gyroscope;

the first signal indicates a first detected rotational movement of the portion; and the second signal indicates a second detected rotational movement of the second casing.

10. The personal acoustic device of claim 9, wherein the control circuit being structured to analyze a characteristic of the differential mode movement comprises the control circuit being structured to compare an extent of rotation of the differential mode movement to a predetermined minimum extent of rotation during a predetermined sampling period to determine whether the differential mode movement indicates a movement of the user's head relative to the reference caused by the user.

11. The personal acoustic device of claim 9, wherein:

the control circuit being structured to analyze a characteristic of the differential mode movement comprises the control circuit being structured to compare the characteristic of the differential mode movement to a predetermined maximum value for that characteristic to determine whether the differential mode movement indicates a movement of the user's head that is humanly possible such that the differential mode movement indicates a movement of the user's head relative to the reference caused by the user; and the characteristic is selected from a group consisting of an extent of rotation of the differential mode movement, a speed of rotation of the differential mode movement, an acceleration in rotation of the differential mode movement, a rate of change in acceleration in rotation of differential mode movement, and a frequency of repetition of the differential mode movement.

12. The personal acoustic device of claim 11, wherein the control circuit is further structured to immediately determine that the personal acoustic device is not in position on the user's head in response to the characteristic of the differential mode movement exceeding the predetermined maximum value for that characteristic.

13. The personal acoustic device of claim 6, wherein:

the first movement sensor comprises a first accelerometer;

the second movement sensor comprises a second accelerometer;

the first signal indicates a first detected acceleration of the portion;

the second signal indicates a second detected acceleration of the second casing; and the control circuit being structured to distinguish a differential mode movement between the detected movement of the portion and the detected movement of the second casing from a common mode movement comprises the control circuit being structured to distinguish a differential mode acceleration between the first and second detected accelerations from a common mode acceleration.

14. The personal acoustic device of claim 13, wherein:

the control circuit being structured to analyze a characteristic of the differential mode movement comprises the control circuit being structured to compare the characteristic of the differential mode acceleration to a predetermined maximum value for that characteristic to determine whether the differential mode acceleration indicates a movement of the user's head that is humanly possible such that the differential mode acceleration indicates a movement of the user's head relative to the reference caused by the user; and the characteristic is selected from a group consisting of a magnitude of the differential mode acceleration, a rate of change in the differential mode acceleration, and a frequency of repetition in the differential mode acceleration.

15. The personal acoustic device of claim 14, wherein the control circuit is further structured to immediately determine that the personal acoustic device is not in position on the user's head in response to the characteristic of the differential mode acceleration exceeding the predetermined maximum value for that characteristic.

16. The personal acoustic device of claim 13, wherein the control circuit is further structured to:

analyze a characteristic of the common mode movement by comparing a characteristic of the common mode acceleration to a predetermined maximum value for that characteristic, the characteristic being selected from a group consisting of a magnitude of the common mode acceleration, a rate of change in the common mode acceleration, and a frequency of repetition in the common mode acceleration; and immediately determine that the personal acoustic device is not in position on the user's head in response to the characteristic of the common mode acceleration exceeding the predetermined maximum value for that characteristic.

17. The personal acoustic device of claim 16, wherein the control circuit is further structured to immediately determine that the personal acoustic device is in position on the user's head in response to the characteristic of the common mode acceleration not exceeding the predetermined maximum value for that characteristic, wherein the characteristic is the frequency of repetition in the common mode acceleration, and wherein the frequency of repetition in the common mode acceleration is a frequency indicative of repetitive human muscle movement.

* * * * *